United States Patent
Leitner et al.

(10) Patent No.: US 11,926,286 B2
(45) Date of Patent: Mar. 12, 2024

(54) RETRACTABLE VEHICLE STEP

(71) Applicant: Lund Motion Products, Inc., Ann Arbor, MI (US)

(72) Inventors: Horst Leitner, Laguna Beach, CA (US); Anthony Smith, Huntington Beach, CA (US)

(73) Assignee: Lund Motion Products, Inc., Ann Arbor, MI (US)

( * ) Notice: Subject to any disclaimer, the term of this patent is extended or adjusted under 35 U.S.C. 154(b) by 754 days.

(21) Appl. No.: 16/890,562

(22) Filed: Jun. 2, 2020

(65) Prior Publication Data

US 2020/0361389 A1    Nov. 19, 2020

Related U.S. Application Data

(63) Continuation of application No. 15/953,214, filed on Apr. 13, 2018, now Pat. No. 10,676,031, which is a
(Continued)

(51) Int. Cl.
  *B60R 3/02*    (2006.01)
(52) U.S. Cl.
  CPC ..................... *B60R 3/02* (2013.01)
(58) Field of Classification Search
  CPC ............................................. B60R 3/02
  See application file for complete search history.

(56) References Cited

U.S. PATENT DOCUMENTS

| 7,591 A | 8/1850 | Burdett |
| 752,031 A | 2/1904 | Chadwick |

(Continued)

FOREIGN PATENT DOCUMENTS

| CA | 2 082 177 | 5/1994 |
| CA | 2 332 193 | 9/2001 |

(Continued)

OTHER PUBLICATIONS

One up Offroad Traction and Suspension Systems—http://www.oneupoffroad.com/ouoproducts/oneuprailstep.html; screenshot from Nov. 15, 2014 from https://archive.org/web.

(Continued)

*Primary Examiner* — Jason D Shanske
*Assistant Examiner* — James J Triggs
(74) *Attorney, Agent, or Firm* — KNOBBE, MARTENS, OLSON & BEAR, LLP

(57) ABSTRACT

A retractable vehicle step is attachable to a vehicle or truck. The vehicle step facilitates access to a cargo hold, interior, or roof of the vehicle. Advantageously, the vehicle step may provide clearance space relative to a tailgate of the vehicle by displacing a stepping member of the vehicle step in a generally lateral direction. The vehicle step desirably has a covered and protected biasing mechanism for transitioning between retracted and extended positions of the stepping member. Advantageously, the vehicle step may be pulled out from under the vehicle by the foot of a user. Another advantage is that the vehicle step is readily attachable to the vehicle using already existing connection members, thereby generally eliminating or mitigating the need for customized retrofitting and avoiding undesirable installation cost and time. Finally, the vehicle step may be configured into at least two different arrangements for attachment to a vehicle utilizing the same components.

18 Claims, 44 Drawing Sheets

Related U.S. Application Data continuation of application No. 15/159,496, filed on May 19, 2016, now Pat. No. 9,944,231, which is a continuation of application No. 14/479,147, filed on Sep. 5, 2014, now Pat. No. 9,346,405, which is a continuation of application No. 13/286,133, filed on Oct. 31, 2011, now Pat. No. 8,827,294.

(56) References Cited

U.S. PATENT DOCUMENTS

| | | |
|---|---|---|
| 955,658 A | 4/1910 | Mitchell et al. |
| 1,250,604 A | 12/1917 | Lorenc |
| 1,449,031 A | 3/1923 | Blake |
| 1,471,972 A | 10/1923 | Miller |
| 2,041,640 A | 5/1936 | Goss |
| 2,122,040 A | 6/1938 | Machovec |
| 2,125,085 A | 7/1938 | Pool |
| 2,436,961 A | 3/1948 | Gabriel |
| 2,487,921 A | 11/1949 | Culver |
| 2,492,068 A | 12/1949 | Schofield et al. |
| 2,566,401 A | 9/1951 | Bustin |
| 2,575,615 A | 11/1951 | Crump |
| 2,583,894 A | 1/1952 | Shuck |
| 2,645,504 A | 7/1953 | Branstrator et al. |
| 2,669,613 A | 2/1954 | Despard |
| 2,678,832 A | 5/1954 | Wright |
| 2,764,422 A | 9/1956 | McDonald |
| 2,925,876 A | 2/1960 | Wagner |
| 3,039,562 A | 6/1962 | Wagner |
| 3,095,216 A | 6/1963 | Browne |
| 3,172,499 A | 3/1965 | Stairs |
| 3,329,443 A | 7/1967 | Lowder et al. |
| 3,392,990 A | 7/1968 | Wolf |
| 3,488,066 A | 1/1970 | Hansen |
| 3,494,634 A | 2/1970 | De Paula |
| 3,522,396 A | 7/1970 | Norden |
| 3,528,574 A | 9/1970 | Denner et al. |
| 3,572,754 A | 3/1971 | Fowler |
| 3,608,957 A | 9/1971 | Maneck |
| 3,671,058 A | 6/1972 | Kent |
| 3,762,742 A | 10/1973 | Bucklen |
| 3,807,757 A | 4/1974 | Carpenter et al. |
| 3,833,240 A | 9/1974 | Weiler |
| 3,865,399 A | 2/1975 | Way |
| 3,887,217 A | 6/1975 | Thomas |
| 3,889,997 A | 6/1975 | Schoneck |
| 3,891,261 A | 6/1975 | Finneman |
| 3,957,284 A | 5/1976 | Wright |
| 3,961,809 A | 6/1976 | Clugston |
| 3,980,319 A | 9/1976 | Kirkpatrick |
| 3,981,515 A | 9/1976 | Rosborough |
| 4,020,920 A | 5/1977 | Abbott |
| 4,068,542 A | 1/1978 | Brand et al. |
| 4,073,502 A | 2/1978 | Frank et al. |
| 4,089,538 A | 5/1978 | Eastridge |
| 4,106,790 A | 8/1978 | Weiler |
| 4,110,673 A | 8/1978 | Nagy et al. |
| 4,116,457 A | 9/1978 | Nerem et al. |
| 4,164,292 A | 8/1979 | Karkau |
| 4,174,021 A | 11/1979 | Barlock |
| 4,180,143 A | 12/1979 | Clugston |
| 4,185,849 A | 1/1980 | Jaeger |
| 4,188,889 A | 2/1980 | Favrel |
| 4,231,583 A | 11/1980 | Learn |
| 4,312,515 A | 1/1982 | Allori |
| 4,424,751 A | 1/1984 | Blochlinger |
| 4,440,364 A | 4/1984 | Cone et al. |
| 4,462,486 A | 7/1984 | Dignan |
| 4,536,004 A | 8/1985 | Brynielsson et al. |
| 4,542,805 A | 9/1985 | Hamlin et al. |
| 4,570,962 A | 2/1986 | Chavira |
| 4,623,160 A | 11/1986 | Trudell |
| D287,001 S | 12/1986 | Jarvie et al. |
| 4,679,810 A | 7/1987 | Kimball |
| D292,904 S | 11/1987 | Bielby |
| 4,720,116 A | 1/1988 | Williams et al. |
| 4,733,752 A | 3/1988 | Sklar |
| 4,909,700 A | 3/1990 | Fontecchio et al. |
| 4,982,974 A | 1/1991 | Guidry |
| 5,005,667 A | 4/1991 | Anderson |
| 5,005,850 A | 4/1991 | Baughman |
| 5,039,119 A | 8/1991 | Baughman |
| 5,085,450 A | 2/1992 | DeHart, Sr. |
| 5,137,294 A | 8/1992 | Martin |
| 5,154,125 A | 10/1992 | Renner et al. |
| 5,195,609 A | 3/1993 | Ham et al. |
| 5,199,731 A | 4/1993 | Martin |
| 5,228,707 A | 7/1993 | Yoder |
| 5,228,761 A | 7/1993 | Huebschen et al. |
| 5,238,300 A | 8/1993 | Slivon et al. |
| D340,905 S | 11/1993 | Orth et al. |
| 5,257,847 A | 11/1993 | Yonehara |
| 5,284,349 A | 2/1994 | Bruns et al. |
| 5,286,049 A | 2/1994 | Khan |
| 5,342,073 A | 8/1994 | Poole |
| 5,358,268 A | 10/1994 | Hawkins |
| 5,375,864 A | 12/1994 | McDaniel |
| 5,423,463 A | 6/1995 | Weeks |
| 5,439,342 A | 8/1995 | Hall et al. |
| 5,462,302 A | 10/1995 | Leitner |
| 5,478,124 A | 12/1995 | Warrington |
| 5,498,012 A | 3/1996 | McDaniel et al. |
| 5,501,475 A | 3/1996 | Bundy |
| 5,505,476 A | 4/1996 | Maccabee |
| 5,513,866 A | 5/1996 | Sisson |
| 5,538,100 A | 7/1996 | Hedley |
| 5,538,265 A | 7/1996 | Chen et al. |
| 5,538,269 A | 7/1996 | McDaniel et al. |
| 5,547,040 A | 8/1996 | Hanser et al. |
| 5,584,493 A | 12/1996 | Demski et al. |
| 5,601,300 A | 2/1997 | Fink et al. |
| 5,697,623 A | 12/1997 | Bermes et al. |
| 5,697,626 A | 12/1997 | McDaniel |
| 5,727,840 A | 3/1998 | Ochiai et al. |
| 5,779,208 A | 7/1998 | McGraw |
| 5,842,709 A | 12/1998 | Maccabee |
| 5,897,125 A | 4/1999 | Bundy |
| 5,941,342 A | 8/1999 | Lee |
| 5,957,237 A | 9/1999 | Tigner |
| 6,042,052 A | 3/2000 | Smith et al. |
| 6,055,780 A | 5/2000 | Yamazaki |
| 6,082,751 A | 7/2000 | Hanes et al. |
| 6,112,152 A | 8/2000 | Tuttle |
| 6,149,172 A | 11/2000 | Pascoe et al. |
| 6,168,176 B1 | 1/2001 | Mueller |
| 6,179,312 B1 | 1/2001 | Paschke et al. |
| 6,203,040 B1 | 3/2001 | Hutchins |
| 6,213,486 B1 | 4/2001 | Kunz et al. |
| 6,264,222 B1 | 7/2001 | Johnston et al. |
| 6,270,099 B1 | 8/2001 | Farkash |
| 6,325,397 B1 | 12/2001 | Pascoe |
| 6,352,295 B1 | 3/2002 | Leitner |
| 6,375,207 B1 | 4/2002 | Dean et al. |
| 6,412,799 B1 | 7/2002 | Schrempf |
| 6,422,342 B1 | 7/2002 | Armstrong et al. |
| 6,425,572 B1 | 7/2002 | Lehr |
| 6,430,164 B1 | 8/2002 | Jones et al. |
| 6,435,534 B1 | 8/2002 | Stone |
| 6,439,342 B1 | 8/2002 | Boykin |
| 6,460,915 B1 | 10/2002 | Bedi et al. |
| 6,511,086 B2 | 1/2003 | Schlicht |
| 6,513,821 B1 | 2/2003 | Heil |
| 6,533,303 B1 | 3/2003 | Watson |
| 6,588,783 B2 | 7/2003 | Fichter |
| 6,641,158 B2 | 11/2003 | Leitner |
| 6,659,484 B2 | 12/2003 | Knodle et al. |
| 6,663,125 B1 | 12/2003 | Cheng |
| 6,746,033 B1 | 6/2004 | McDaniel |
| 6,769,704 B2 | 8/2004 | Cipolla |
| 6,810,995 B2 | 11/2004 | Warford |
| 6,812,466 B2 | 11/2004 | O'Connor et al. |
| 6,830,257 B2 | 12/2004 | Leitner |
| 6,834,875 B2 | 12/2004 | Leitner |
| 6,840,526 B2 | 1/2005 | Anderson et al. |

(56) References Cited

U.S. PATENT DOCUMENTS

| | | | |
|---|---|---|---|
| 6,874,801 B2 | 4/2005 | Fichter | |
| 6,880,843 B1 | 4/2005 | Greer, Jr. | |
| 6,912,912 B2 | 7/2005 | Reichinger et al. | |
| 6,918,624 B2 | 7/2005 | Miller et al. | |
| 6,926,295 B2 | 8/2005 | Berkebile et al. | |
| 6,938,909 B2 | 9/2005 | Leitner | |
| 6,942,233 B2 | 9/2005 | Leitner et al. | |
| 6,942,272 B2 | 9/2005 | Livingston | |
| 6,948,903 B2 | 9/2005 | Ablabutyan et al. | |
| 6,951,357 B2 | 10/2005 | Armstrong et al. | |
| 6,955,370 B2 | 10/2005 | Fabiano et al. | |
| 6,959,937 B2 | 11/2005 | Schneider et al. | |
| 6,966,597 B2 | 11/2005 | Tegtmeier | |
| 6,971,652 B2 | 12/2005 | Bobbert et al. | |
| 6,997,469 B2 | 2/2006 | Lanoue et al. | |
| 7,000,932 B2 | 2/2006 | Heil et al. | |
| 7,007,961 B2 | 3/2006 | Leitner | |
| 7,017,927 B2 | 3/2006 | Henderson et al. | |
| 7,055,839 B2 | 6/2006 | Leitner | |
| 7,070,194 B2 | 7/2006 | Garland et al. | |
| 7,086,656 B2 * | 8/2006 | Kolpasky | B60R 3/002 280/166 |
| 7,090,276 B1 | 8/2006 | Bruford et al. | |
| 7,111,858 B2 | 9/2006 | Manser et al. | |
| 7,111,859 B2 | 9/2006 | Kim et al. | |
| 7,118,120 B2 | 10/2006 | Lee et al. | |
| 7,118,150 B2 | 10/2006 | Bruford et al. | |
| 7,163,221 B2 | 1/2007 | Leitner | |
| 7,168,722 B1 * | 1/2007 | Piotrowski | B60R 3/02 280/166 |
| 7,185,904 B1 | 3/2007 | Jones | |
| 7,219,911 B2 | 5/2007 | Sukonthapanich et al. | |
| 7,258,386 B2 | 8/2007 | Leitner | |
| 7,287,770 B2 | 10/2007 | Drabant et al. | |
| 7,287,771 B2 | 10/2007 | Lee et al. | |
| 7,311,320 B2 | 12/2007 | Kuntze et al. | |
| 7,318,596 B2 | 1/2008 | Scheuring, III et al. | |
| 7,360,779 B2 | 4/2008 | Crandall | |
| 7,367,574 B2 | 5/2008 | Leitner | |
| 7,377,531 B2 | 5/2008 | Fabiano et al. | |
| 7,380,807 B2 | 6/2008 | Leitner | |
| 7,398,985 B2 | 7/2008 | Leitner et al. | |
| 7,413,204 B2 | 8/2008 | Leitner | |
| 7,413,205 B2 | 8/2008 | Watson | |
| 7,413,233 B1 | 8/2008 | Jung | |
| 7,416,202 B2 | 8/2008 | Fichter | |
| 7,434,825 B2 | 10/2008 | Williams | |
| 7,438,305 B2 | 10/2008 | Schulz | |
| 7,441,790 B2 | 10/2008 | Lechkun | |
| 7,445,221 B2 | 11/2008 | Kobayashi | |
| 7,469,916 B2 | 12/2008 | Watson | |
| 7,487,986 B2 | 2/2009 | Leither et al. | |
| 7,513,520 B2 | 4/2009 | Okuyama | |
| 7,513,565 B2 | 4/2009 | Watson | |
| 7,516,703 B2 | 4/2009 | Tazreiter | |
| 7,530,619 B1 | 5/2009 | Bruford et al. | |
| 7,566,064 B2 | 7/2009 | Leitner et al. | |
| 7,584,975 B2 | 9/2009 | Leitner | |
| 7,585,033 B2 | 9/2009 | Holt | |
| 7,594,672 B2 | 9/2009 | Piotrowski | |
| 7,621,546 B2 | 11/2009 | Ross et al. | |
| 7,635,247 B2 | 12/2009 | Collins | |
| 7,637,519 B2 | 12/2009 | Leitner et al. | |
| 7,673,892 B2 | 3/2010 | Kuntze et al. | |
| 7,703,784 B2 | 4/2010 | Plavetich | |
| 7,712,755 B2 | 5/2010 | Yang et al. | |
| 7,717,444 B2 | 5/2010 | Fichter | |
| D618,148 S | 6/2010 | Hoppert | |
| 7,731,212 B2 | 6/2010 | Storer | |
| 7,740,260 B2 | 6/2010 | VanBelle et al. | |
| 7,740,261 B2 | 6/2010 | Leitner et al. | |
| 7,766,357 B2 | 8/2010 | Arvanites | |
| 7,775,536 B2 | 8/2010 | Shumway | |
| 7,793,596 B2 | 9/2010 | Hirtenlehner | |
| 7,823,896 B2 | 11/2010 | VanBelle | |
| 7,874,565 B2 | 1/2011 | Duncan | |
| D634,687 S | 3/2011 | Vukel | |
| 7,900,944 B2 | 3/2011 | Watson | |
| 7,909,344 B1 | 3/2011 | Bundy | |
| 7,934,737 B2 | 5/2011 | Okada | |
| 7,976,042 B2 | 7/2011 | Watson et al. | |
| 8,038,164 B2 | 10/2011 | Stahl et al. | |
| 8,042,821 B2 | 10/2011 | Yang | |
| D649,100 S | 11/2011 | Cheng | |
| 8,052,162 B2 | 11/2011 | Yang et al. | |
| 8,056,913 B2 * | 11/2011 | Kuntze | B60R 3/002 280/166 |
| 8,070,173 B2 | 12/2011 | Watson | |
| 8,136,826 B2 | 3/2012 | Watson | |
| 8,157,277 B2 | 4/2012 | Leitner et al. | |
| 8,177,247 B1 | 5/2012 | Carr | |
| 8,205,901 B2 | 6/2012 | Yang et al. | |
| D665,713 S | 8/2012 | Pochurek et al. | |
| 8,262,113 B1 | 9/2012 | Chafey et al. | |
| 8,297,635 B2 | 10/2012 | Agoncillo et al. | |
| D671,874 S | 12/2012 | Kekich et al. | |
| 8,342,550 B2 | 1/2013 | Stickles et al. | |
| 8,342,551 B2 | 1/2013 | Watson et al. | |
| 8,360,455 B2 | 1/2013 | Leitner et al. | |
| D676,368 S | 2/2013 | Cover | |
| 8,366,129 B2 | 2/2013 | Salmon | |
| 8,382,132 B2 | 2/2013 | Kowalski | |
| 8,408,571 B2 | 4/2013 | Leitner et al. | |
| 8,419,034 B2 | 4/2013 | Leitner et al. | |
| 8,448,967 B2 | 5/2013 | Storer | |
| 8,448,968 B1 | 5/2013 | Grote et al. | |
| 8,463,953 B2 | 6/2013 | Davis et al. | |
| 8,469,380 B2 | 6/2013 | Yang et al. | |
| 8,602,431 B1 | 12/2013 | May | |
| 8,641,068 B1 | 2/2014 | Bundy | |
| 8,662,512 B2 | 3/2014 | May | |
| 8,668,217 B2 | 3/2014 | Ziaylek | |
| 8,696,005 B2 | 4/2014 | Kim | |
| 8,720,924 B2 | 5/2014 | Ruehl | |
| 8,827,293 B1 | 9/2014 | Bundy | |
| 8,827,294 B1 | 9/2014 | Leitner et al. | |
| 8,833,781 B2 | 9/2014 | Hayes | |
| 8,833,782 B2 | 9/2014 | Huotari | |
| 8,844,957 B2 | 9/2014 | Leitner et al. | |
| D720,674 S | 1/2015 | Stanesic et al. | |
| 8,936,266 B2 | 1/2015 | Leitner et al. | |
| 8,944,451 B2 | 2/2015 | Leitner et al. | |
| 8,985,606 B2 | 3/2015 | Fichter | |
| 9,156,406 B2 | 10/2015 | Stanesic et al. | |
| 9,272,667 B2 | 3/2016 | Smith | |
| 9,302,626 B2 | 4/2016 | Leitner et al. | |
| 9,308,870 B2 | 4/2016 | Yang | |
| 9,346,404 B1 | 5/2016 | Bundy | |
| 9,346,405 B2 | 5/2016 | Leitner et al. | |
| 9,434,317 B2 | 9/2016 | Nania | |
| 9,452,713 B2 | 9/2016 | Stickles | |
| 9,499,093 B1 | 11/2016 | Salter et al. | |
| 9,499,094 B1 | 11/2016 | Dellock et al. | |
| 9,511,717 B2 | 12/2016 | Smith | |
| 9,522,634 B1 | 12/2016 | Smith | |
| 9,527,449 B2 | 12/2016 | Smith | |
| 9,550,458 B2 | 1/2017 | Smith et al. | |
| 9,561,751 B2 | 2/2017 | Leitner et al. | |
| 9,656,609 B2 | 5/2017 | Du et al. | |
| 9,669,766 B2 | 6/2017 | Du et al. | |
| 9,669,767 B2 | 6/2017 | Du et al. | |
| 9,688,205 B2 | 6/2017 | Du et al. | |
| 9,701,249 B2 | 7/2017 | Leitner et al. | |
| 9,809,172 B2 | 11/2017 | Stanesic et al. | |
| 9,834,147 B2 | 12/2017 | Smith | |
| 9,902,328 B1 | 2/2018 | Mazur | |
| 9,944,231 B2 | 4/2018 | Leitner et al. | |
| 9,963,076 B1 | 5/2018 | Bender et al. | |
| 9,975,490 B1 | 5/2018 | Ozog et al. | |
| 9,994,168 B1 | 6/2018 | Jensen et al. | |
| 10,053,017 B2 | 8/2018 | Leitner et al. | |
| 10,065,486 B2 | 9/2018 | Smith et al. | |
| 10,077,016 B2 | 9/2018 | Smith et al. | |
| 10,081,302 B1 | 9/2018 | Frederick et al. | |

(56) References Cited

U.S. PATENT DOCUMENTS

| | | |
|---|---|---|
| 10,106,069 B2 | 10/2018 | Rasekhi |
| 10,106,086 B1 | 10/2018 | Eckstein et al. |
| 10,106,087 B2 | 10/2018 | Stojkovic et al. |
| 10,106,088 B2 | 10/2018 | Smith |
| 10,118,557 B2 | 11/2018 | Pribisic |
| 10,124,839 B2 | 11/2018 | Povinelli et al. |
| 10,144,345 B2 | 12/2018 | Stinson et al. |
| 10,150,419 B2 | 12/2018 | Derbis et al. |
| 10,155,474 B2 | 12/2018 | Salter et al. |
| 10,173,595 B1 | 1/2019 | Ulrich |
| 10,183,623 B2 | 1/2019 | Kirshnan et al. |
| 10,183,624 B2 | 1/2019 | Leitner et al. |
| 10,189,517 B2 | 1/2019 | Povinelli et al. |
| 10,195,997 B2 | 2/2019 | Smith |
| 10,207,598 B2 | 2/2019 | Reynolds et al. |
| 10,214,963 B2 | 2/2019 | Simula et al. |
| 10,246,019 B1 | 4/2019 | Carr |
| 10,246,137 B2 | 4/2019 | Ngo |
| 10,272,841 B1 | 4/2019 | Wymore |
| 10,272,842 B2 | 4/2019 | Du et al. |
| 10,322,677 B1 | 6/2019 | Leitner et al. |
| 10,336,260 B1 | 7/2019 | Salter et al. |
| 10,336,378 B2 | 7/2019 | Marchlewski et al. |
| 10,343,610 B2 | 7/2019 | Long et al. |
| 10,351,182 B2 | 7/2019 | Zielinski et al. |
| 10,384,614 B1 | 8/2019 | Du et al. |
| 10,391,944 B2 | 8/2019 | Stanesic et al. |
| 10,493,920 B2 | 12/2019 | Leitner et al. |
| 10,596,971 B2 | 3/2020 | Leitner et al. |
| 10,604,077 B2 | 3/2020 | Stanesic et al. |
| 10,618,472 B2 | 4/2020 | Du et al. |
| 10,676,031 B2 | 6/2020 | Leitner et al. |
| 10,676,033 B1 | 6/2020 | Carr et al. |
| 10,759,349 B2 | 9/2020 | Leitner |
| 10,773,670 B2 | 9/2020 | Smith et al. |
| 10,821,903 B2 | 11/2020 | Stanesic et al. |
| 11,173,845 B2 | 11/2021 | Leitner et al. |
| 11,180,100 B2 | 11/2021 | Smith et al. |
| 11,260,798 B2 | 3/2022 | Smith |
| 11,279,290 B2 | 3/2022 | Leitner |
| 11,713,012 B2 | 8/2023 | Smith et al. |
| 2002/0109446 A1 | 8/2002 | Arnold |
| 2002/0130531 A1 | 9/2002 | Leitner |
| 2002/0153201 A1 | 10/2002 | Warford |
| 2003/0011164 A1 | 1/2003 | Cipolla |
| 2003/0038446 A1 | 2/2003 | Anderson et al. |
| 2003/0090081 A1 | 5/2003 | Oakley |
| 2003/0094781 A1 | 5/2003 | Jaramillo et al. |
| 2003/0132595 A1 | 7/2003 | Fabiano |
| 2003/0200700 A1 | 10/2003 | Leitner |
| 2004/0100063 A1 | 5/2004 | Henderson et al. |
| 2004/0108678 A1 | 6/2004 | Berkebile et al. |
| 2004/0135339 A1 | 7/2004 | Kim |
| 2004/0164580 A1 | 8/2004 | Armstrong et al. |
| 2004/0207224 A1 | 10/2004 | Miller et al. |
| 2005/0006870 A1 | 1/2005 | Williams |
| 2005/0035568 A1 | 2/2005 | Lee et al. |
| 2005/0104318 A1 | 5/2005 | Lee et al. |
| 2005/0117969 A1 | 6/2005 | Byrne |
| 2005/0146157 A1 | 7/2005 | Leitner |
| 2005/0167941 A1 | 8/2005 | Garland et al. |
| 2005/0258616 A1 | 11/2005 | Scheuring, III et al. |
| 2005/0263974 A1 | 12/2005 | Mulder |
| 2005/0280242 A1 | 12/2005 | Fabiano et al. |
| 2006/0082096 A1 | 4/2006 | Sukonthapanich et al. |
| 2006/0163836 A1 | 7/2006 | Kobayashi |
| 2006/0208449 A1 | 9/2006 | Kuo et al. |
| 2006/0214386 A1 | 9/2006 | Watson |
| 2006/0284440 A1 | 12/2006 | Leitner |
| 2007/0012498 A1 | 1/2007 | Schulz |
| 2007/0017743 A1 | 1/2007 | Yeh |
| 2008/0034552 A1 | 2/2008 | Nguyen |
| 2008/0042396 A1 | 2/2008 | Watson et al. |
| 2008/0054586 A1 | 3/2008 | Lechkun |
| 2008/0084045 A1 | 4/2008 | Filias et al. |
| 2008/0224438 A1 | 9/2008 | Okada |
| 2009/0008894 A1 | 1/2009 | Kuntze et al. |
| 2009/0072507 A1 | 3/2009 | Storer |
| 2009/0203247 A1 | 8/2009 | Fifelski et al. |
| 2009/0308688 A1 | 12/2009 | Tayar |
| 2010/0176607 A1 | 7/2010 | Hardy et al. |
| 2010/0194070 A1 | 8/2010 | Stauffer et al. |
| 2011/0115187 A1 | 5/2011 | Leitner et al. |
| 2012/0025485 A1 | 2/2012 | Yang et al. |
| 2013/0154230 A1 | 6/2013 | Ziaylek et al. |
| 2013/0221632 A1 | 8/2013 | Higgs et al. |
| 2014/0008889 A1 | 1/2014 | Leitner et al. |
| 2015/0137473 A1 | 5/2015 | Leitner et al. |
| 2015/0321612 A1 | 11/2015 | Leitner et al. |
| 2015/0321613 A1 | 11/2015 | Leitner et al. |
| 2016/0039346 A1 | 2/2016 | Yang |
| 2016/0193964 A1 | 7/2016 | Stanesic et al. |
| 2016/0288718 A1 | 10/2016 | Hayes et al. |
| 2017/0008459 A1 | 1/2017 | Leitner et al. |
| 2017/0021781 A1 | 1/2017 | Du et al. |
| 2017/0036607 A1 | 2/2017 | Du et al. |
| 2017/0144606 A1 | 5/2017 | Smith |
| 2017/0190308 A1 | 6/2017 | Smith |
| 2017/0246993 A1 | 8/2017 | Smith |
| 2017/0267182 A1 | 9/2017 | Leitner |
| 2017/0298675 A1 | 10/2017 | Dimig et al. |
| 2017/0355315 A1 | 12/2017 | Leitner |
| 2018/0201194 A1 | 7/2018 | Stanesic |
| 2018/0281687 A1 | 10/2018 | Derbis et al. |
| 2019/0009725 A1 | 1/2019 | Stojkovic et al. |
| 2019/0047477 A1 | 2/2019 | Crandall |
| 2019/0071021 A1 | 3/2019 | Pribisic |
| 2019/0071042 A1 | 3/2019 | Smith |
| 2019/0084482 A1 | 3/2019 | Long et al. |
| 2019/0084628 A1 | 3/2019 | Povinelli et al. |
| 2019/0118720 A1 | 4/2019 | Otacioglu et al. |
| 2019/0118750 A1 | 4/2019 | Bosco |
| 2019/0126832 A1 | 5/2019 | Knichel |
| 2019/0126870 A1 | 5/2019 | Rife et al. |
| 2019/0152542 A1 | 5/2019 | Povinelli et al. |
| 2019/0176709 A1 | 6/2019 | Leitner |
| 2019/0193639 A1 | 6/2019 | Smith |
| 2020/0094745 A1 | 3/2020 | Leitner |
| 2020/0148122 A1 | 5/2020 | Leitner |
| 2020/0189473 A1 | 6/2020 | Norris |
| 2020/0282913 A1 | 9/2020 | Qing et al. |
| 2020/0331396 A1 | 10/2020 | Du et al. |
| 2021/0347303 A1 | 11/2021 | Qing et al. |
| 2021/0347304 A1 | 11/2021 | Qing et al. |
| 2022/0063502 A1 | 3/2022 | Leitner et al. |
| 2022/0153197 A1 | 5/2022 | Smith |
| 2022/0219633 A1 | 7/2022 | Smith et al. |
| 2022/0332254 A1 | 10/2022 | Smith |

FOREIGN PATENT DOCUMENTS

| | | |
|---|---|---|
| CA | 2 370 618 | 1/2007 |
| CN | 2174368 Y | 8/1994 |
| CN | 2737608 | 11/2005 |
| CN | 101020435 | 8/2007 |
| CN | 201280106 | 7/2009 |
| CN | 202758405 | 2/2013 |
| CN | 202847566 | 4/2013 |
| CN | 2801557 | 6/2013 |
| CN | 103149915 | 6/2013 |
| CN | 104385989 | 3/2015 |
| CN | 108791086 | 11/2018 |
| CN | 208232903 U | 12/2018 |
| CN | 208325054 U | 1/2019 |
| CN | 208344082 U | 1/2019 |
| CN | 109318812 | 2/2019 |
| CN | 109318813 | 2/2019 |
| CN | 109383384 | 2/2019 |
| CN | 109383386 | 2/2019 |
| CN | 109383388 | 2/2019 |
| CN | 109383390 | 2/2019 |
| CN | 109383392 | 2/2019 |
| CN | 208452901 | 2/2019 |
| CN | 208559193 | 3/2019 |

(56) References Cited

FOREIGN PATENT DOCUMENTS

| | | |
|---|---|---|
| CN | 208731206 | 4/2019 |
| CN | 109795418 | 5/2019 |
| CN | 208896972 | 5/2019 |
| DE | 31 51 621 | 7/1983 |
| DE | 39 32 142 | 4/1990 |
| DE | 89 10 933 U1 | 10/1990 |
| EP | 0 066 493 | 12/1982 |
| EP | 1 116 840 | 7/2001 |
| EP | 3 002 157 | 4/2016 |
| EP | 3 176 038 | 1/2019 |
| EP | 3 237 254 | 2/2019 |
| EP | 3 461 713 | 4/2019 |
| FR | 1 350 593 A | 12/1963 |
| FR | 2 225 612 A | 8/1974 |
| GB | 934387 | 8/1963 |
| GB | 936846 | 9/1963 |
| GB | 2 045 699 | 11/1980 |
| GB | 2 129 378 | 5/1984 |
| GB | 2 201 511 | 9/1988 |
| GB | 2 288 014 | 10/1994 |
| IN | 201741011829 | 10/2018 |
| IN | 201737025141 | 3/2019 |
| IN | 201741038321 | 5/2019 |
| JP | 63-255144 | 10/1988 |
| JP | 04-339040 | 11/1992 |
| JP | 04-342629 A1 | 11/1992 |
| JP | 05-310061 | 11/1993 |
| JP | 05-310081 | 11/1993 |
| JP | 8-132967 | 5/1996 |
| JP | 2018-177089 A | 11/2018 |
| JP | 2019-001222 | 1/2019 |
| JP | 6509607 | 4/2019 |
| JP | 2019-069634 | 5/2019 |
| MX | 2017001699 | 6/2018 |
| MX | 2017001700 | 6/2018 |
| MX | 2017006328 | 6/2018 |
| MX | 2017008032 | 9/2018 |
| MX | 2017010183 | 9/2018 |
| MX | 2018000509 | 11/2018 |
| SU | 403594 | 11/1972 |
| TW | M296187 | 8/2006 |
| TW | M318551 | 9/2007 |
| WO | WO 2001/000441 | 1/2001 |
| WO | WO 2002/085670 | 10/2002 |
| WO | WO 2003/039910 | 5/2003 |
| WO | WO 2003/039920 | 5/2003 |
| WO | WO 2003/066380 | 8/2003 |
| WO | WO 2003/069294 | 8/2003 |
| WO | WO 2006/050297 | 5/2006 |
| WO | WO 2009/103163 | 8/2009 |
| WO | WO 2017/020527 | 2/2017 |
| WO | WO 2017/140081 | 8/2017 |
| WO | WO 2017/176226 | 10/2017 |
| WO | WO 2018/148643 | 8/2018 |
| WO | WO 2018/197393 | 11/2018 |
| WO | WO 2019/009131 | 1/2019 |
| WO | WO 2019/034493 | 2/2019 |

OTHER PUBLICATIONS

One Up Offroad—One Up Step Installation, Introducing the New Patent Pending One Up Step dated Nov. 30, 2007.
One Up Offroad—One Up Step Installation, Instructions Part 2, Power Step Installation to One Up Step dated Nov. 30, 2007.
One Up Offroad—New Product Release, Introducing the New Patent Pending Design—One up Step dated Jan. 24, 2008.
Complaint for Patent and Copyright Infringement; United States District Court—Central District of California; Case No. 8:17-cv-01914; *Lund Motion Products, Inc.* v. *T-Max (Hangzhou) Technology Co., Ltd., et al.*; filed Oct. 31, 2017.
Final Consent Judgment and Permanent Injunction; United States District Court—Central District of California; Case No. 8:08-cv-00323; 89908 Inc., d/b/a *AMP Research* v. *T-Max, LLC et al.*; filed Dec. 23, 2008.
Complaint for Patent Infringement; United States District Court—Central District of California; Case No. 5:17-cv-00883; *Lund Motion Products, Inc.* v. *Rev Wheel LLC*; filed May 8, 2017.
Complaint for Patent and Copyright Infringement; U.S. District Court Middle District of Georgia; Case No. 3:17-cv-00155; *Lund Motion Products, Inc.* v. *Rocky Ridge Inc., et al.*; filed: Nov. 1, 2017.
Complaint for Patent Infringement; United States District Court—Western District of Texas; Case No. 5:17-cv-01250; *Lund Motion Products, Inc.* v. *Prestige Off Roads, LLC*; filed Dec. 11, 2017.
Defendants T-Max (Hangzhou) Technology Co., Ltd.'s and T-Max Industrial (H.K.) Co., Ltd.'s Answer, Affirmative Defenses, and Counterclaims; United States District Court—Central District of California; Case No. 8:17-cv-01914; *Lund Motion Products, Inc.* v. *T-Max (Hangzhou) Technology Co., Ltd., et al.*; filed Dec. 21, 2017.
Answer of Defendants Rocky Ridge, Inc., Rocky Ridge Transport, LLC & A.L.C. Manufacturing, Inc.; U.S. District Court Middle District of Georgia; Case No. 3:17-cv-00155; *Lund Motion Products, Inc.* v. *Rocky Ridge Inc., et al.*; filed: Dec. 27, 2017.
Defendant's Original Answer; United States District Court—Western District of Texas; Case No. 5:17-cv-01250; *Lund Motion Products, Inc.* v. *Prestige Off Roads, LLC*; filed Feb. 26, 2018.
Memorandum in Support of Plaintiff's Motion to Dismiss Defendants' Inequitable Conduct Counterclaim and to Strike Related Affirmative Defenses; United States District Court—Central District of California; Case No. 8:17-cv-01914; *Lund Motion Products, Inc.* v. *T-Max (Hangzhou) Technology Co., Ltd., et al.*; filed Feb. 28, 2018.
Defendants T-Max (Hangzhou) Technology Co., Ltd.'s and T-Max Industrial (H.K.) Co., Ltd.'s Opposition to Lund Motion Products, Inc.'s Motion to Dismiss Inequitable Conduct Counterclaim and Motion to Strike Related Affirmative Defenses; United States District Court—Central District of California; Case No. 8:17-cv-01914; *Lund Motion Products, Inc.* v. *T-Max (Hangzhou) Technology Co., Ltd., et al.*; filed Mar. 12, 2018.
Reply Memorandum in Support of Plaintiff's Motion to Dismiss Defendants' Inequitable Conduct Counterclaim and to Strike Related Affirmative Defenses; United States District Court—Central District of California; Case No. 8:17-cv-01914; *Lund Motion Products, Inc.* v. *T-Max (Hangzhou) Technology Co., Ltd., et al.*; filed Mar. 19, 2018.
Order Granting Motion to Dismiss Counterclaim With Fourteen Days' Leave to Amend and Denying Without Prejudice Motion to Strike Related Affirmative Defenses; United States District Court—Central District of California; Case No. 8:17-cv-01914; *Lund Motion Products, Inc.* v. *T-Max (Hangzhou) Technology Co., Ltd., et al.*; filed Apr. 3, 2018.
Defendants T-Max (Hangzhou) Technology Co., Ltd.'s and T-Max Industrial (H.K.) Co., Ltd.'s Second Amended Answer, Affirmative Defenses, and Counterclaims to Plaintiff Lund Motion Products, Inc.'s Complaint for Patent and Copyright Infringement; United States District Court—Central District of California; Case No. 8:17-cv-01914; *Lund Motion Products, Inc.* v. *T-Max (Hangzhou) Technology Co., Ltd., et al.*; filed Apr. 17, 2018.
Memorandum in Support of Plaintiff's Renewed Motion to Dismiss Defendants' Inequitable Conduct Counterclaim and to Strike Related Affirmative Defenses; United States District Court—Central District of California; Case No. 8:17-cv-01914; *Lund Motion Products, Inc.* v. *T-Max (Hangzhou) Technology Co., Ltd., et al.*; filed May 8, 2018.

* cited by examiner

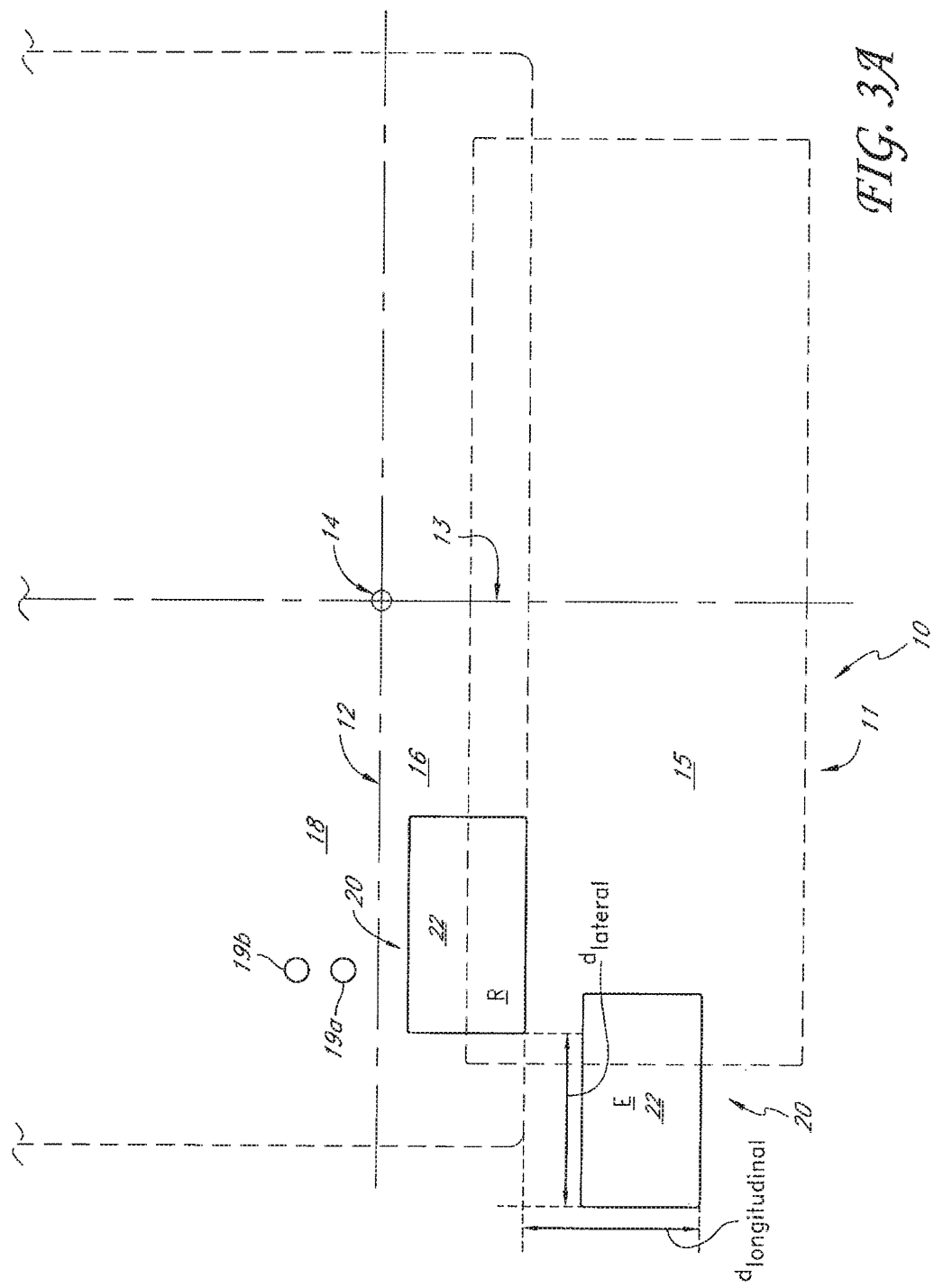

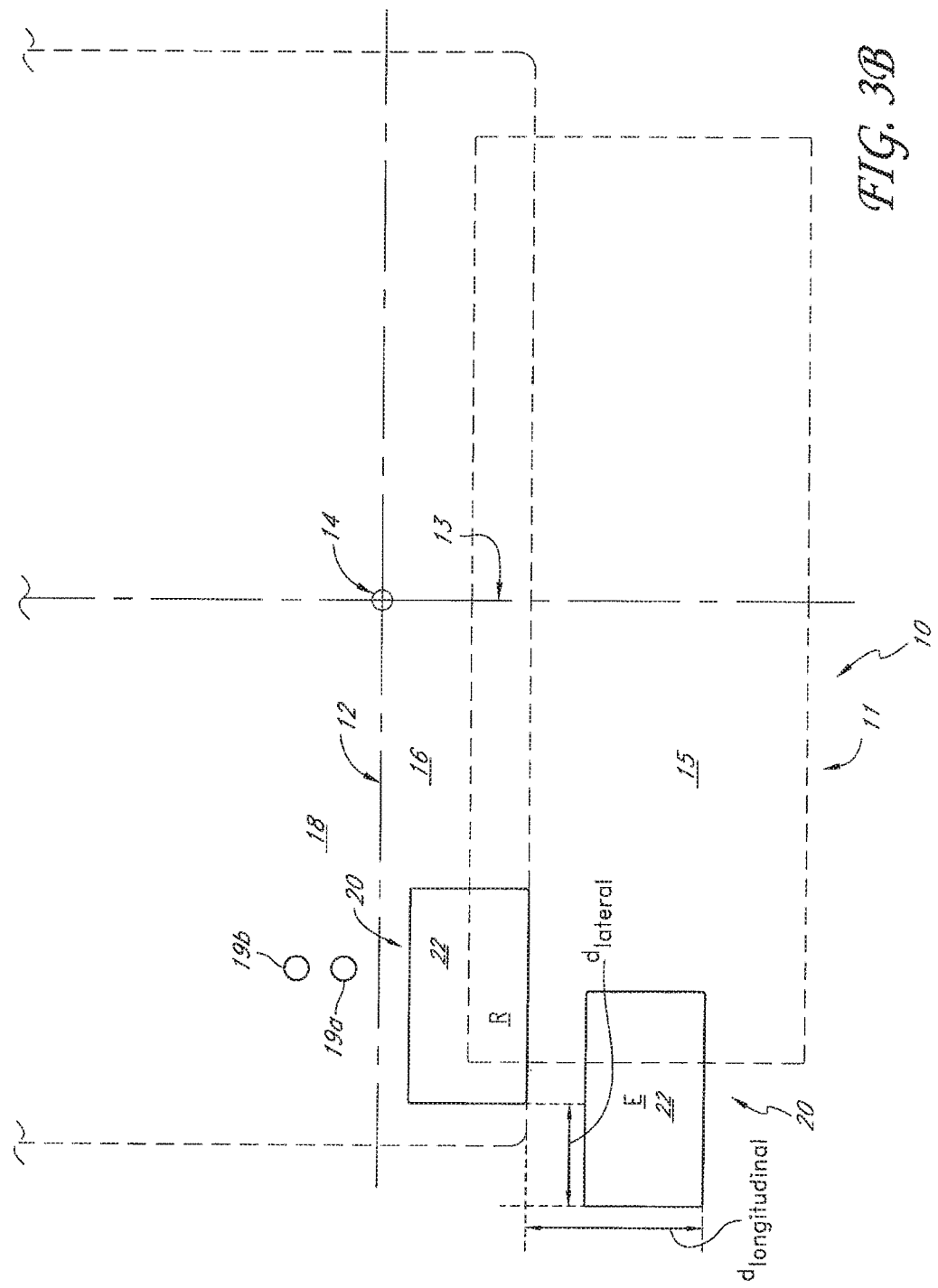

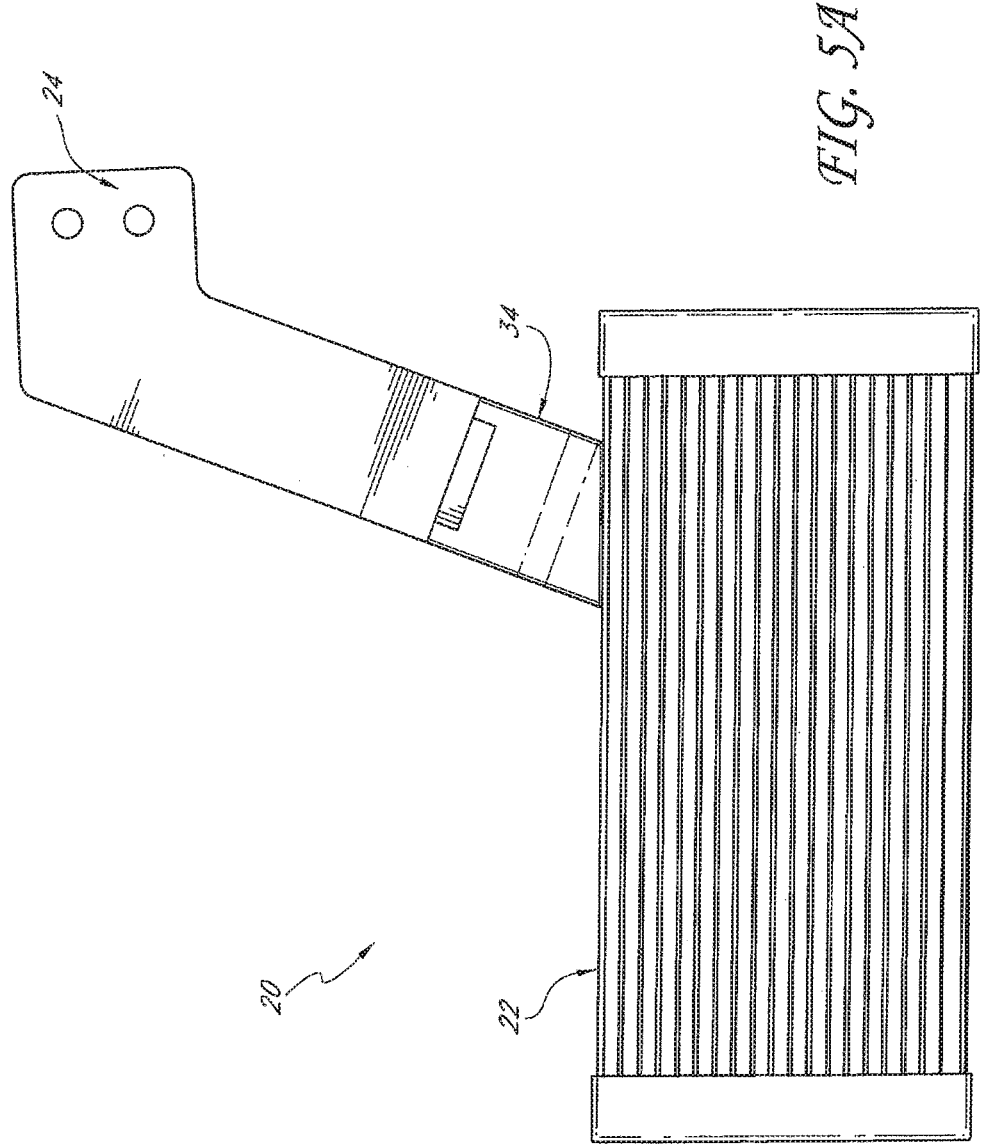

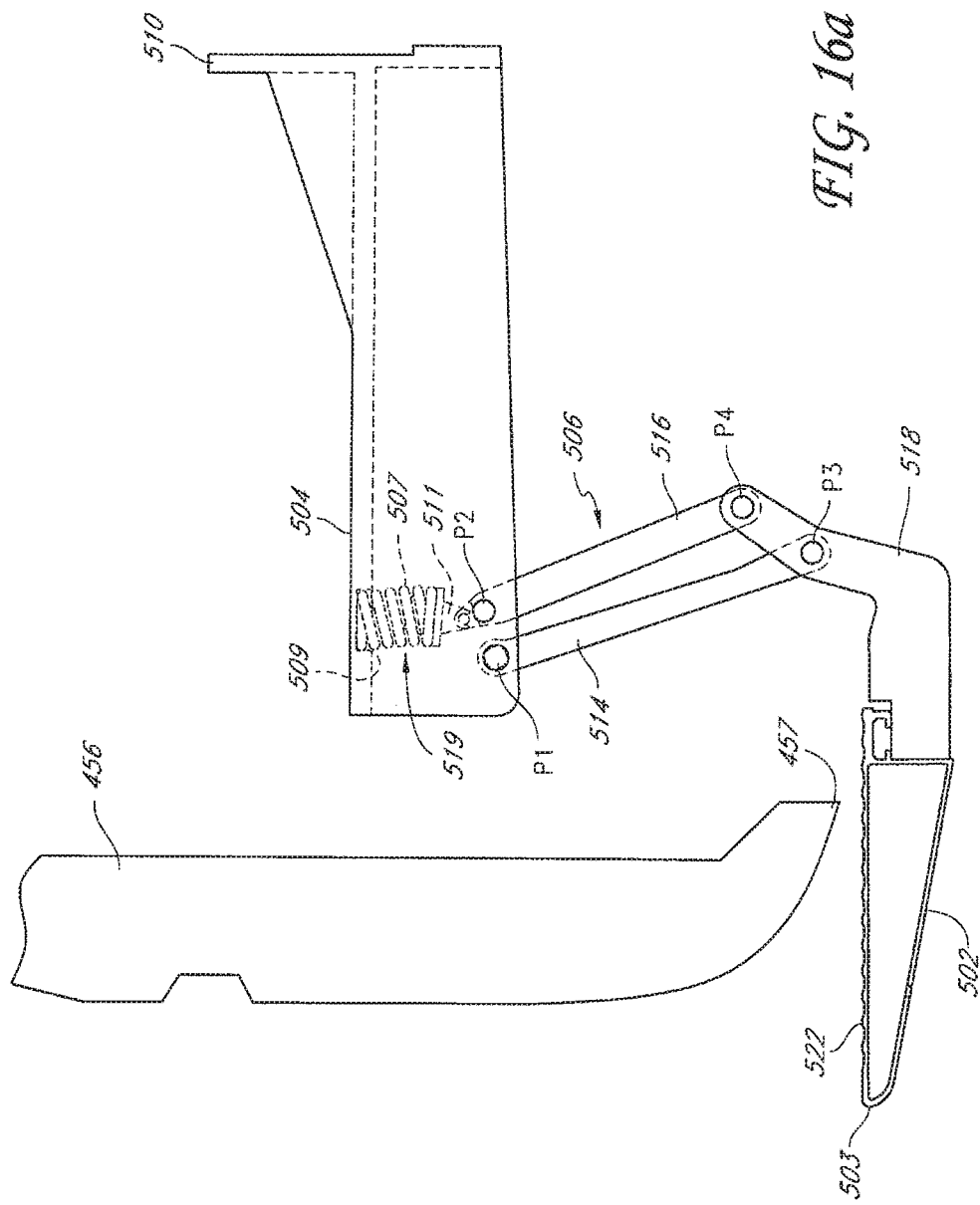

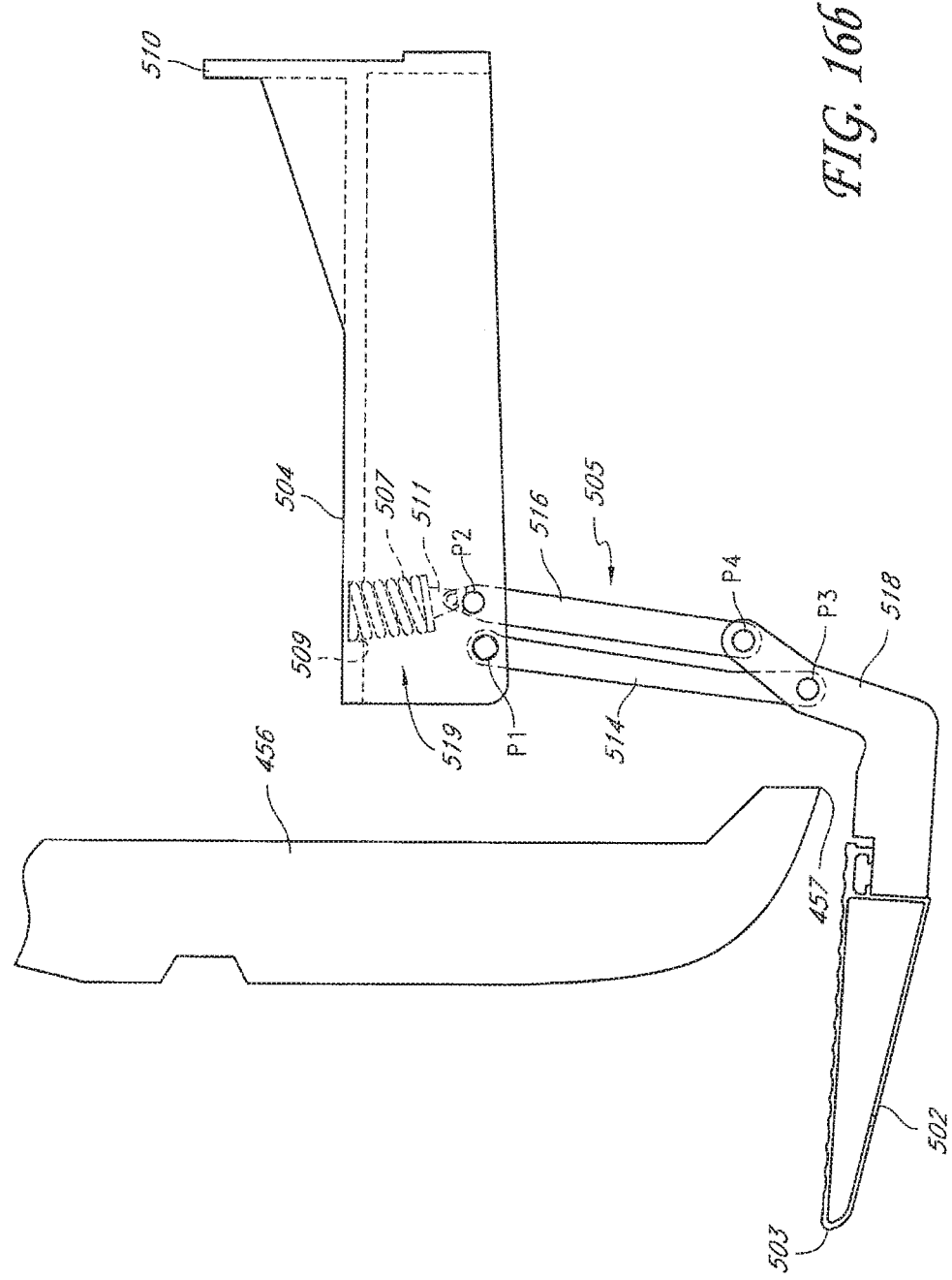

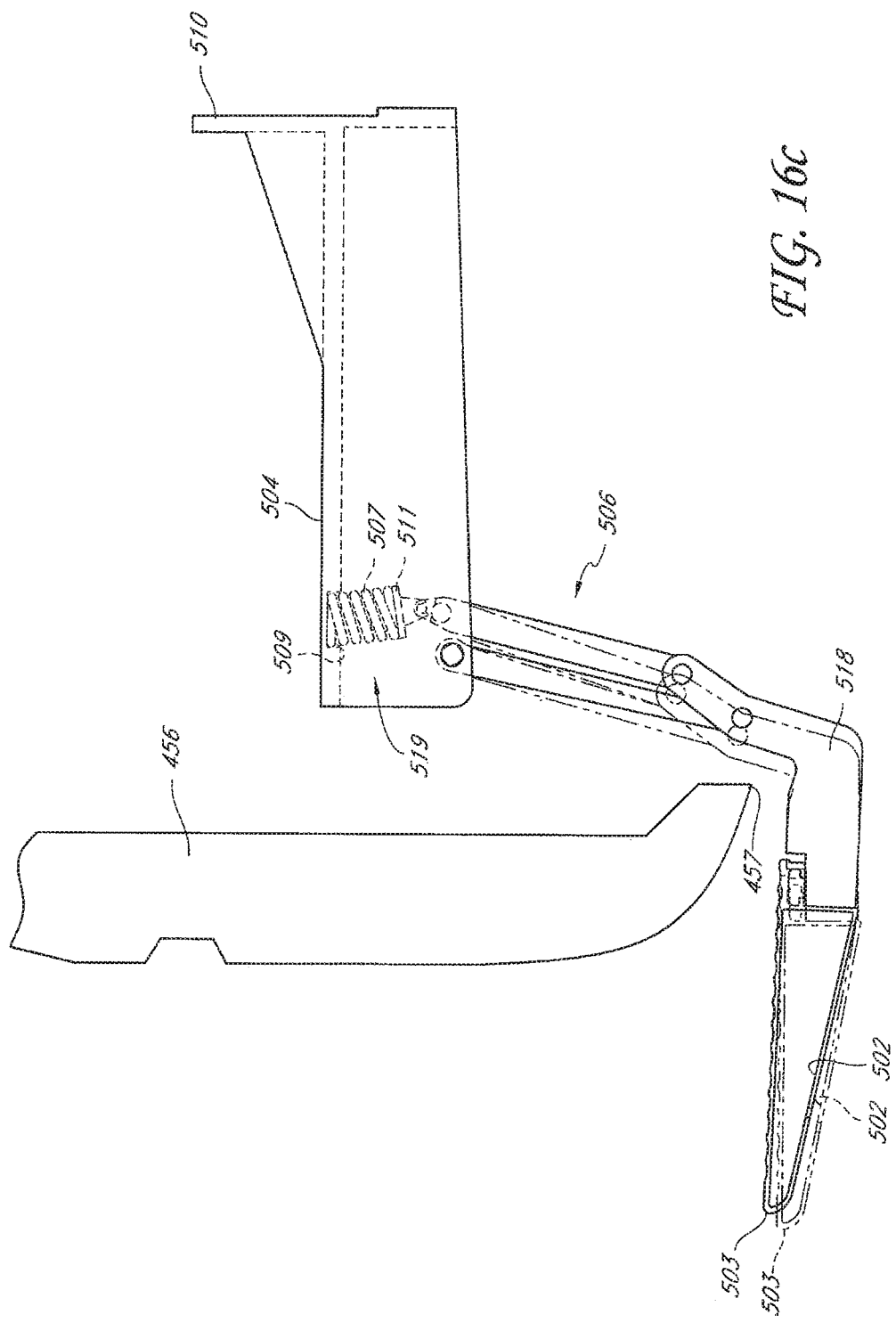

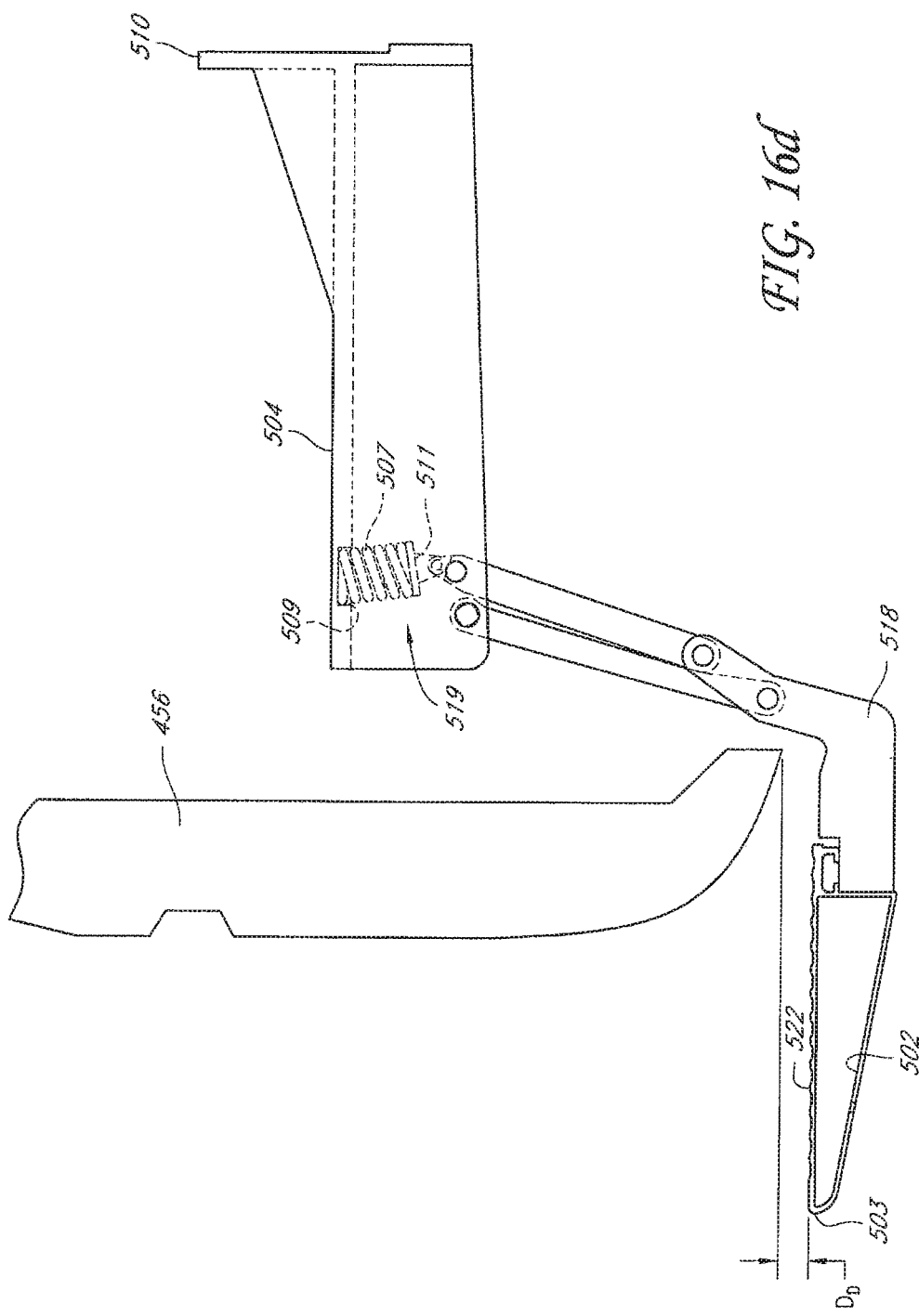

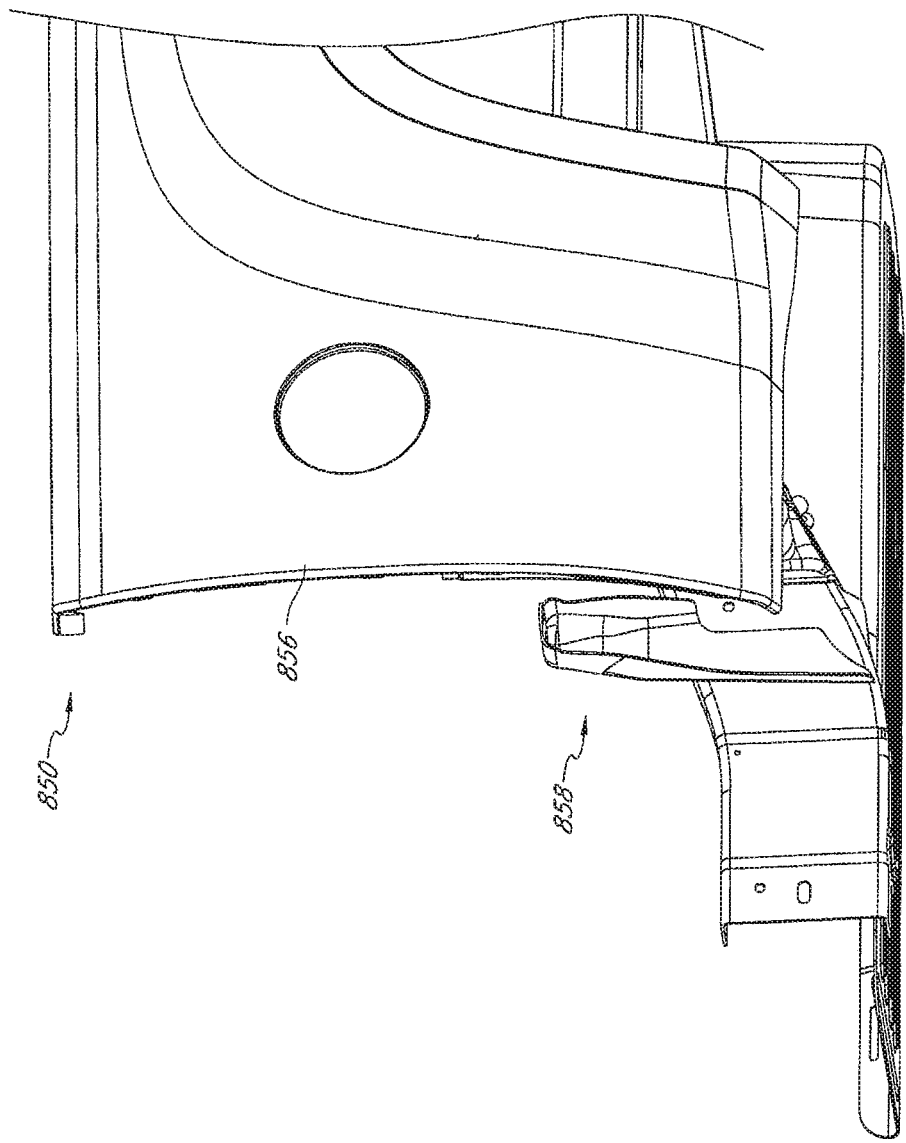

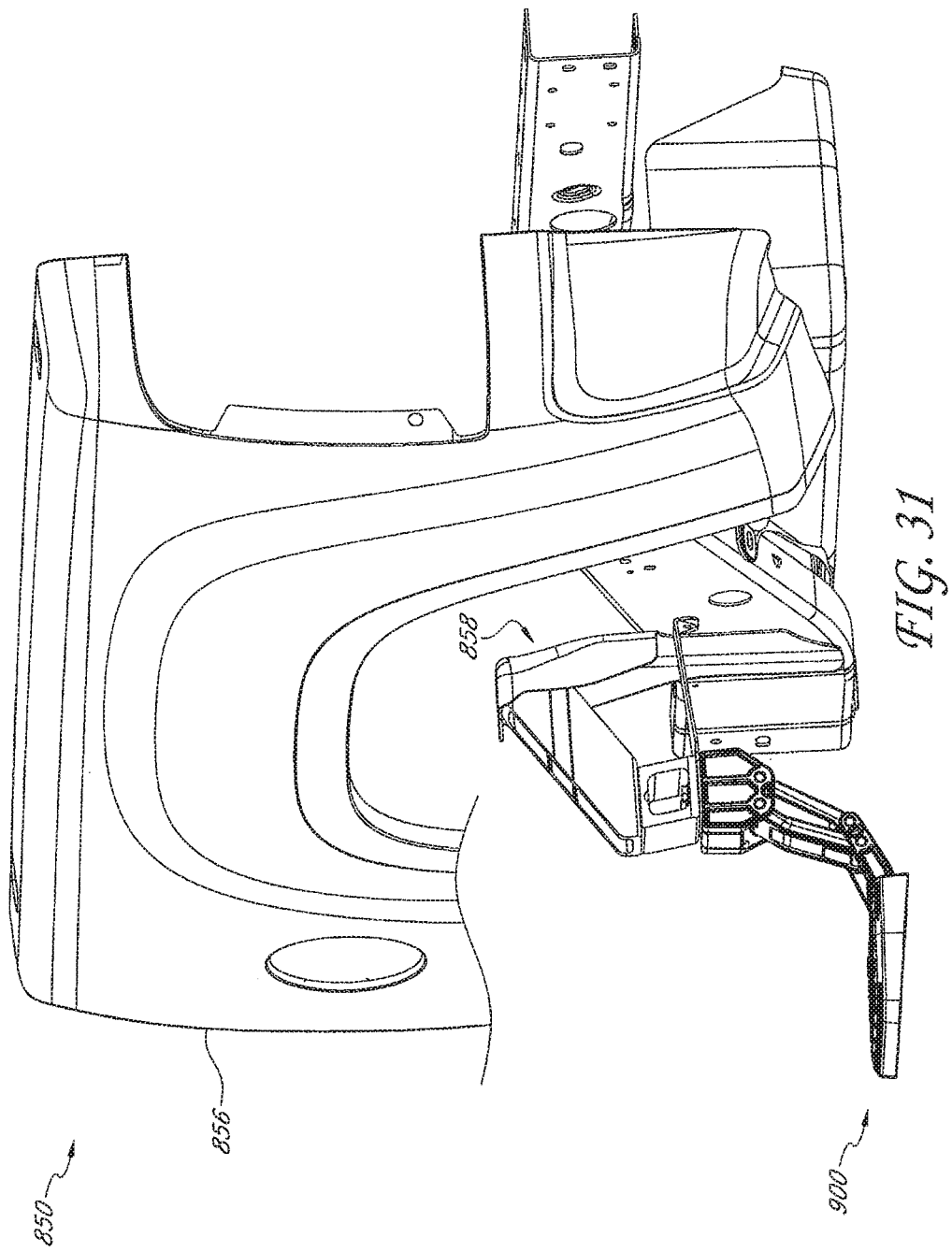

RETRACTABLE VEHICLE STEP

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The invention relates generally to a stepping assist for vehicles. In particular, certain embodiments of the invention relate to a retractable vehicle step which is moveable between a retracted or storage position and an extended position in which it functions as a step assist to facilitate access to a tailgate, roof, cargo area, interior or other area of a vehicle such as a truck. In some embodiments, the stepping assist allows access to a cargo bed while advantageously providing tailgate clearance.

Description of the Related Art

Many vehicles such as trucks provide a fixed position stepping assist to allow access to the cargo bed of the truck.

There are also retractable stepping assists which are meant to provide truck cargo bed access.

SUMMARY OF THE INVENTION

Certain embodiments of the invention provide a retractable vehicle step that is attachable to a portion of a vehicle or truck. The vehicle step facilitates access to a cargo hold of the vehicle or other areas including the roof and interior. Advantageously, the vehicle step may provide clearance space relative to a tailgate of the vehicle by displacing a stepping member of the vehicle step in a generally lateral direction. The vehicle step desirably has a covered and protected biasing mechanism for transitioning between retracted and extended positions of the stepping member. Another advantage is that the vehicle step may be readily attachable to the vehicle using already existing connection members, thereby generally eliminating or mitigating the need for customized retrofitting and minimizing or avoiding undesirable installation cost and time.

Some embodiments provide a retractable vehicle step. The retractable vehicle step generally comprises a stepping member and a biasing mechanism. The stepping member is moveable between a retracted position and an extended position. The biasing mechanism is operably coupled to the stepping member. In some embodiments, the biasing member generally comprises a moveable retaining surface and a cam surface such that in the retracted position the cam surface contacts the retaining surface and urges the stepping member toward the retracted position. In some embodiments, the stepping member is substantially laterally displaced by a predetermined distance when transitioning between the retracted position and the extended position. In some embodiments, the retractable vehicle step is manually operable by the foot or other appendage of a user.

Some embodiments provide a retractable vehicle side step. The retractable vehicle side step generally comprises a stepping member and a biasing mechanism. The stepping member is moveable between a retracted position and an extended position. The biasing mechanism is operably coupled to the stepping member. In some embodiments, the biasing member urges the stepping member toward the retracted position. In some embodiments, the retractable vehicle step is manually operable by the foot or other appendage of a user.

In some embodiments, there is disclosed a retractable step assist designed to be mounted to a vehicle having a side panel. The step assist desirably includes a first support arm, a second support arm and a step member. The step member desirably includes an upper stepping surface defining a support plane, the first support arm and the second support arm connected to the step member so that the first support arm and the second support arm are pivotable with respect to the step member about a third axis and a fourth axis, respectively. The first support arm and the second support arm allowing the step member to move between a retracted position and a deployed position outward from the retracted position. In some embodiments, the first support arm and the second support arm are configured to allow the step member to move between a retracted position wherein at least a portion of the step member is above a lower edge of the vehicle side panel and a deployed position outward from the retracted position wherein at least a portion of the step member extends outward from the vehicle side panel.

In some embodiments, when the step member is in the deployed position, the arms and step member act to self-energize the step assist. In some embodiments, the step assist is not self-energized when in the retracted position, but may be held in place by a biasing member or cam assembly.

In some embodiments, the step member is angled with respect to the horizontal when in a retracted position. In some embodiments, the step member is angled downward in an outboard direction when the step assist is in a retracted position. In some embodiments, the outboard end of the stepping surface is vertically spaced no more than ½ inch, no more than 1 inch, no more than 2 inches, no more than 3 inches, or no more than 4 inches below the bottom edge of the side panel when the step assist is in a retracted position. In some embodiments, the top of stepping surface is vertically spaced no more than ½ inch, no more than 1 inch, no more than 2 inches, no more than 3 inches, or no more than 4 inches below the panel of the vehicle when in a deployed position.

In some embodiments, the arms of the step assist contact each other when the step assist is in a deployed position. In some embodiments, a biasing member serves to hold the step assist in a retracted position and upon movement of the step assist from the retracted position, the biasing member helps to deploy the step assist.

In some embodiments, a retractable vehicle step is disclosed that may be attached to a vehicle in at least two arrangements using the same components. In some embodiments, a retractable vehicle step may be configured in at least two arrangements so that the retractable vehicle step may be attached to at least two different locations that are on opposite sides of a vehicle. As one example, a retractable vehicle step may be configured in a first arrangement to allow the retractable vehicle step to be attached to a first location on one side of a vehicle. In a second arrangement, the retractable vehicle step may be configured to be attached to a second location on a second side of a vehicle that is opposite of the first side of the vehicle. In some embodiments, the two arrangements the retractable vehicle step may be configured into are mirror images of each other. Advantageously, in some embodiments this may allow retailers, wholesalers, or other sellers to use only one stock-keeping unit (SKU) for the at least two arrangements of the retractable vehicle step. In some embodiments, the retractable vehicle step includes multiple components to facilitate the attachment of the vehicle step to one or more different vehicles or vehicle locations.

For purposes of summarizing the invention, certain aspects, advantages and novel features of embodiments of the invention have been described herein above. Of course, it is to be understood that not necessarily all such advantages may be achieved in accordance with any particular embodiment of the invention. Thus, the invention may be embodied or carried out in a manner that achieves or optimizes one advantage or group of advantages as taught or suggested herein without necessarily achieving other advantages as may be taught or suggested herein. It is possible that even all of the specified advantages will not be present. Rather, the scope of the claims is not limited by these advantages unless expressly so stated.

All of these embodiments are intended to be within the scope of the invention herein disclosed. These and other embodiments of the invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and some of its features and advantages, certain preferred embodiments and modifications thereof will become apparent to those skilled in the art from the detailed description herein having reference to the figures that follow, of which:

FIG. 3A is a simplified schematic top view of a retractable vehicle step in both retracted and extended states showing its clearance features relative to a vehicle on which it is mounted illustrating features and advantages in accordance with some embodiments of the invention.

FIG. 3B is a simplified schematic top view of a retractable vehicle step in both retracted and extended states showing its clearance features relative to a vehicle on which it is mounted illustrating features and advantages in accordance with some embodiments of the invention.

FIG. 5A is a top view of the retractable vehicle step of FIG. 5 in an extended state illustrating features and advantages in accordance with some embodiments of the invention.

FIG. 16-FIG. 16d are side views of the retractable vehicle step of FIG. 13 shown moving from a retracted position to an extended position.

FIG. 30 is a partial side view of a vehicle location with existing connection members where the retractable vehicle step of FIG. 22 may be attached illustrating features and advantages in accordance with some embodiments of the invention.

FIG. 31 is a partial side view of the retractable vehicle step of FIG. 22 attached to the vehicle at the existing connection members shown in FIG. 30 illustrating features and advantages in accordance with some embodiments of the invention.

DETAILED DESCRIPTION OF THE PREFERRED EMBODIMENT

The preferred embodiments of the invention described herein relate generally to a stepping assist for vehicles and, in particular, to a retractable vehicle step which is moveable between a retracted or storage position and an extended position in which it functions as a movable support platform to facilitate access to a cargo bed, interior, roof or other area of a vehicle such as a truck. The retractable vehicle step may be configured into at least two different arrangements using the same components and be attached to the vehicle using already existing connection members on the vehicle.

While the description sets forth various embodiment specific details, it will be appreciated that the description is illustrative only and should not be construed in any way as limiting the invention. Furthermore, various applications of the invention, and modifications thereto, which may occur to those who are skilled in the art, are also encompassed by the general concepts described herein.

Figure 1:
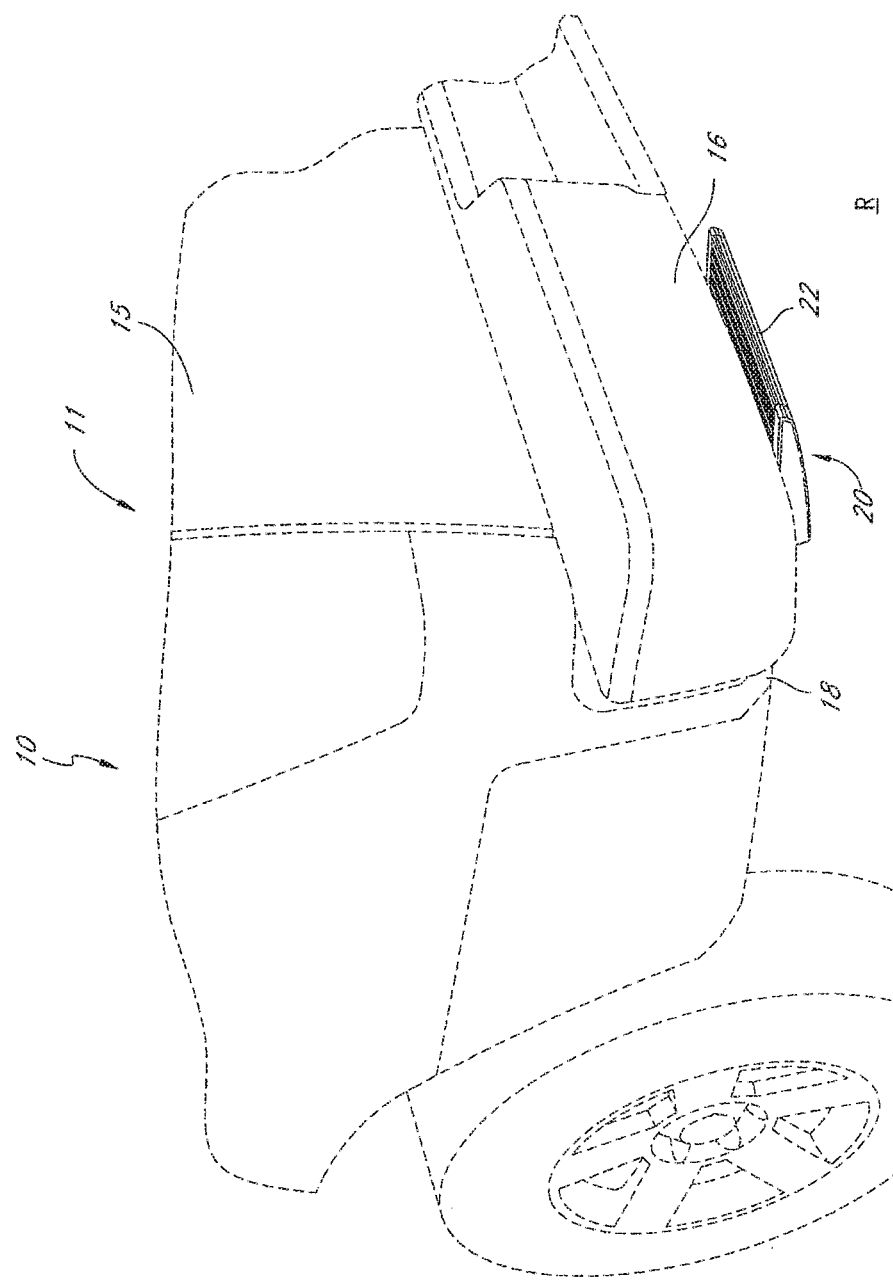
FIG. 1 is a simplified perspective view of a retractable vehicle step in a retracted or storage state mounted on a vehicle illustrating features and advantages in accordance with some embodiments of the invention.
Figure 2:
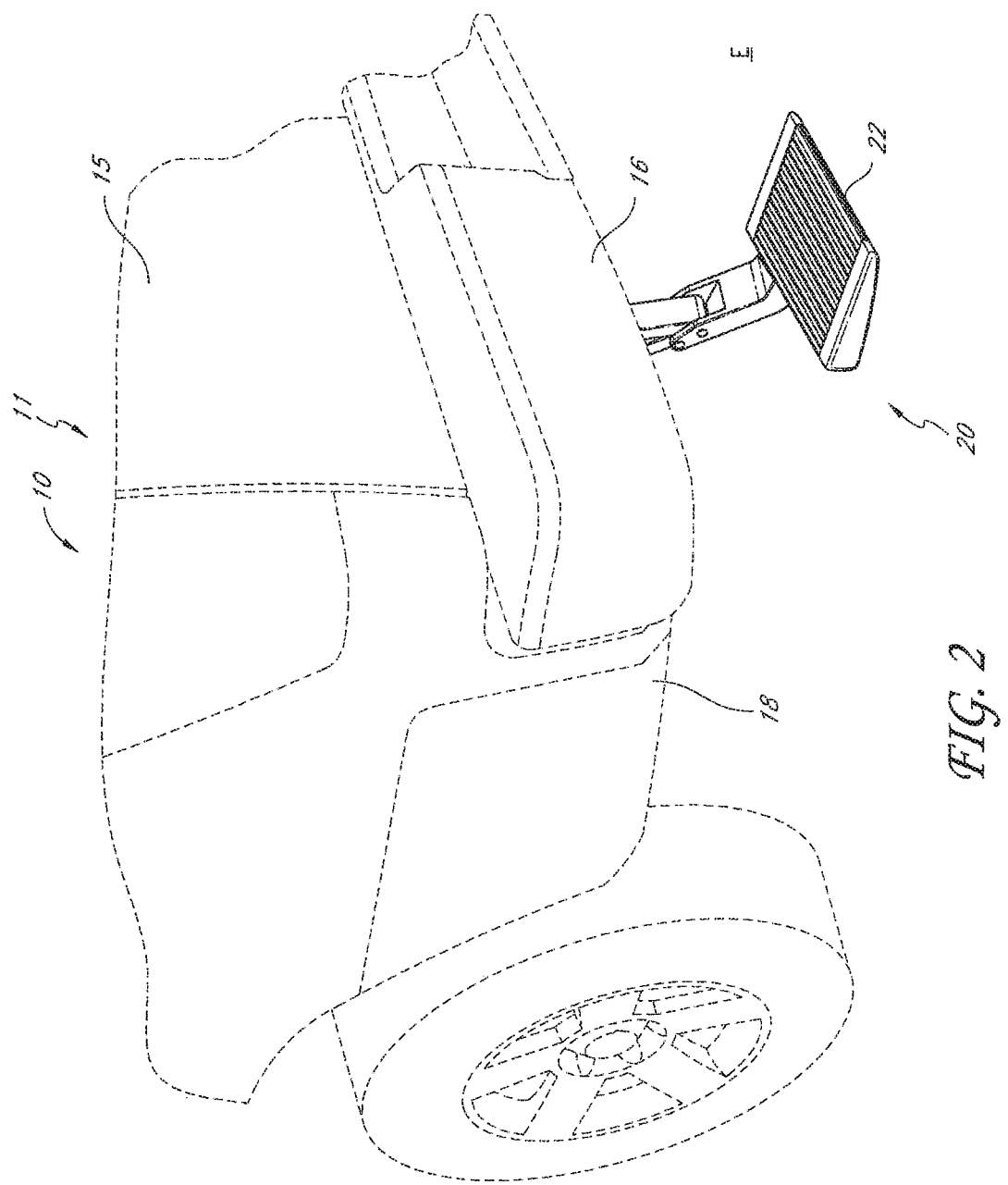
FIG. 2 is a simplified perspective view of the retractable vehicle step of FIG. 1 in an extended state mounted on a vehicle illustrating features and advantages in accordance with some embodiments of the invention.
Figure 3:
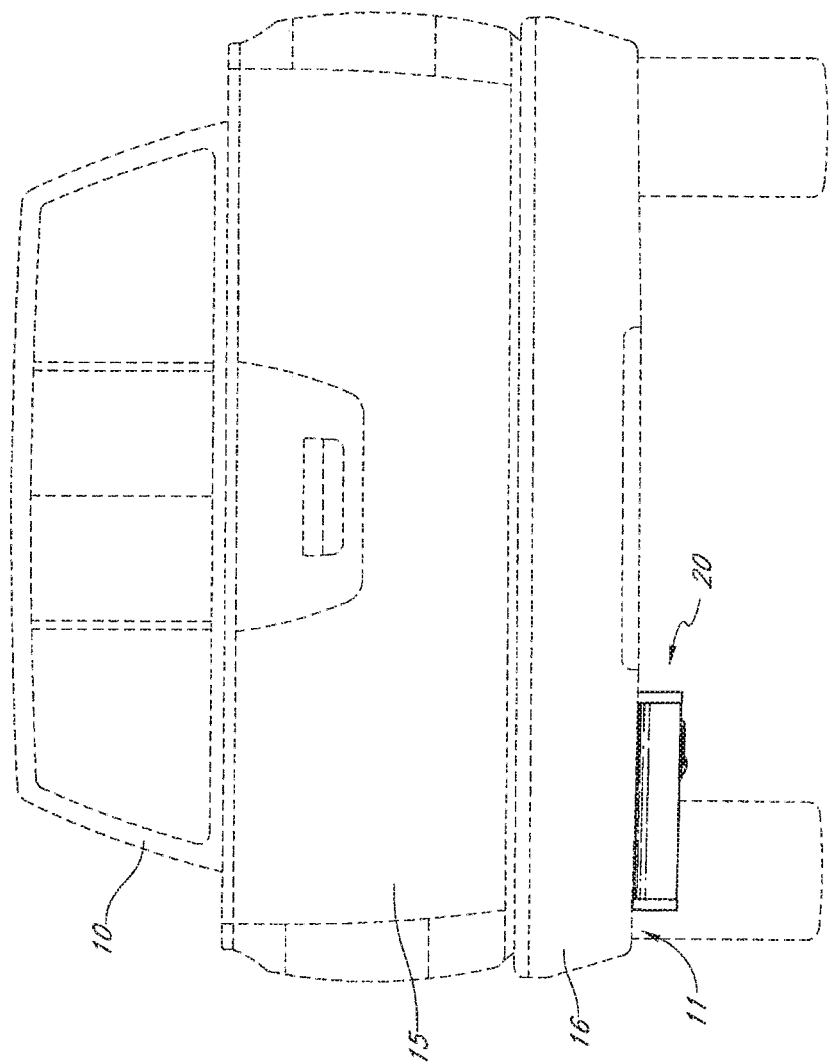
FIG. 3 is a simplified rear view of the retractable vehicle step of FIG. 2 in a retracted state mounted on a vehicle illustrating features and advantages in accordance with some embodiments of the invention.

FIGS. 1-3 show different views and positions of certain embodiments of a retractable vehicle step or tailgate step assembly 20 mounted on or attached to a vehicle or truck 10. As discussed further herein, one advantage of certain embodiments of the retractable vehicle step 20 is that it desirably provides tailgate clearance.

The vehicle 10 comprises a generally rear portion or end 11 at which location the retractable vehicle step 20 is positioned. For convenience and reference, the schematic drawing of FIG. 3A shows a top view of the vehicle 10 as having a lateral axis 12, a longitudinal or long axis 13 and a generally vertical axis 14. These axes can be considered to be respective X-, Y- and Z-axes of a three dimensional Cartesian coordinate system.

The vehicle rear portion 11 includes a tailgate 15 and a bumper 16. As discussed in more detail later herein, the retractable vehicle step 20 is attached to a rear underbody, chassis or frame 18 of the vehicle 10 using, in certain embodiments, already existing connection members (e.g., trailer hitch bolts 19a, 19b or the like) on the vehicle 10. The retractable vehicle step 20 comprises, among other components as discussed in further detail below, a stepping member 22.

FIG. 1 shows the retractable vehicle step 20 in a retracted or storage position or state generally denoted by "R." In the retracted position, the stepping member 22 is generally positioned below and within the projection of the horizontal perimeter of the bumper 16.

FIG. 2 shows the retractable vehicle step 20 in an extended or operational position or state generally denoted by "E." In transitioning from the retracted position to the extended position, the stepping member 22 exits the rear portion 11 of the vehicle 10 from below the bumper 16 and advantageously provides a stepping assist, with tailgate and/or bumper clearance, for a user to access the cargo bed of the vehicle 10. During this motion of the stepping member 22, in certain embodiments, it is displaced laterally, longitudinally and vertically.

FIG. 3 shows the retractable vehicle step 20 in a retracted position R. In some embodiments, in the retraced position R, the vehicle step 20 is generally positioned below the tailgate 15 of the vehicle 10.

FIG. 3A shows the lateral and longitudinal displacements of the stepping member 22 when transitioning between the retracted and extended positions as $d_{lateral}$ and $d_{longitudinal}$. Stated differently, the stepping member 22 extends in an angular manner from the retracted position to the extended position. In other words, the desirable and predetermined lateral displacement advantageously creates an increased effective step width which provides clearance from the tailgate 15 (and/or bumper 16) even when the tailgate 15 is in the open position (as shown schematically in FIG. 3) and allows convenient use. FIG. 3B also shows a stepping member 22 transitioning between the retracted and extended positions. In this illustrated embodiment, in the retracted position the outer edge of the stepping member 22 is positioned closer to the side of the vehicle 10. In this embodiment, the lateral movement $d_{lateral}$ of the stepping member 22 as it transitions between the retracted and extended positions is small than the lateral movement $d_{lateral}$ of the stepping member 22 shown in FIG. 3A that is positioned further towards the midline of the vehicle 10 when in the retracted position.

In some embodiments, the lateral displacement ($d_{lateral}$) is about 6.4 cm (2.5 inches). In another embodiment, the lateral displacement ($d_{lateral}$) is in the range from about 5.1 cm (2 inches) to about 7.6 cm (3 inches), including all values and sub-ranges therebetween. In yet another embodiment, the lateral displacement ($d_{lateral}$) is in the range from about 2.5 cm (1 inch) to about 12.7 cm (5 inches), including all values and sub-ranges therebetween. In another embodiment, the lateral displacement $d_{lateral}$ may be at least 2 inches, at least 2.5 inches, at least 3 inches, at least 3.5 inches, or at least 4 inches. In modified embodiments, the lateral displacement may efficaciously be more or less, as needed or desired.

Figure 4:
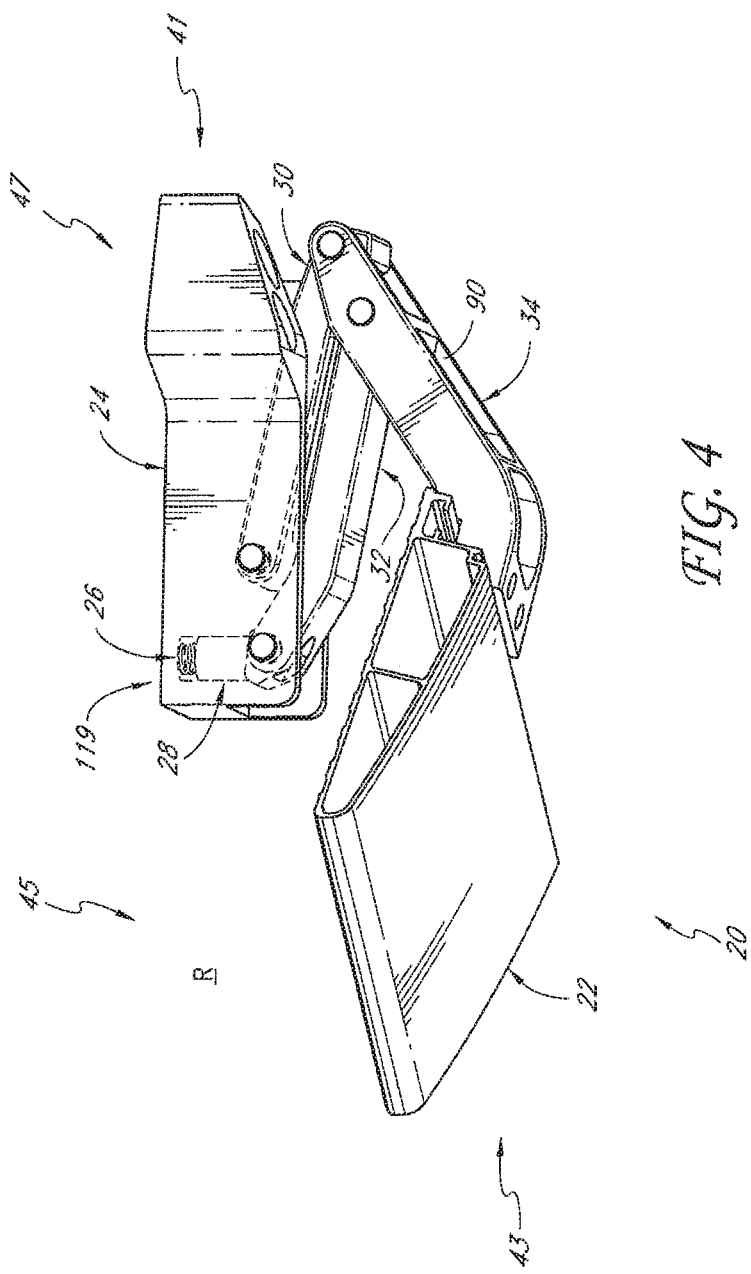
FIG. 4 is a simplified perspective of a retractable vehicle step in a retracted or storage state illustrating features and advantages in accordance with some embodiments of the invention.
Figure 4A:
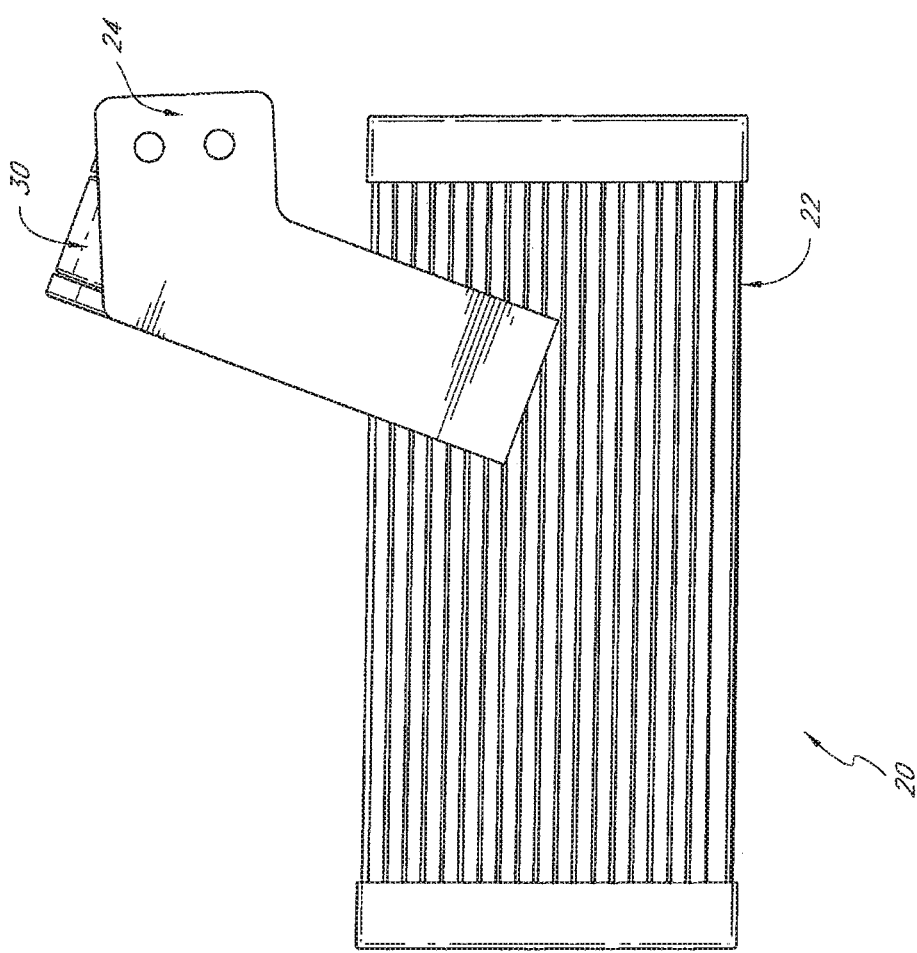
FIG. 4A is a top view of the retractable vehicle step of FIG. 4 in a retracted or storage state illustrating features and advantages in accordance with some embodiments of the invention.

As shown in FIG. 4, and discussed further below, in certain embodiments the retractable vehicle step 20 includes an upper end 41, a lower end 43, a front end 45, and a back end 47. The upper end 41 of the retractable vehicle step 20 may be configured to readily be attachable to the vehicle 10 using industry standard trailer hitch bolts 19a, 19b which are provided on virtually all trucks and the like by manufacturers. Advantageously, this permits the retractable vehicle step 20 of certain embodiments to be mountable to a vehicle using already existing connection members without the undesirable need for extra components or custom installation. However, in modified embodiments, the retractable vehicle step 20 may be constructed to permit custom installation, as needed or desired to various parts of the vehicle 10, for example the frame 18 or bumper 16. For example, a plurality of designs may be provided with each suitable for a particular vehicle type.

The retractable vehicle step 20, in certain embodiments, generally comprises an upper mount 24, a biasing member or spring 26, a moveable plunger or piston 28, a medial inner or first arm 30, a medial outer or second arm 32, a lower mount 34, and the stepping member 22 at a lower, frontmost position. A plurality of clevis pins, pivot pins, screws or the like, as described further below, connect the various components of the retractable vehicle step to form an assembly.

In certain embodiments, the upper mount 24 is angular or generally L-shaped with a substantially hollow interior or channel which desirably provides for a light weight device while maintaining structural integrity. The upper mount 24 is desirably rigidly mountable to the vehicle 10 and comprises a back portion or end 36 which includes a pair of spaced through holes or passages 38a, 38b. In certain embodiments, the through holes or passages 38a, 38b are desirably configured and dimensioned to receive connection members or elements, such as the already existing respective vehicular trailer hitch bolts 19a, 19b (see FIG. 3A), to facilitate connection or attachment to the vehicle 10 without the undesirable need for extra components or custom installation. The through holes 38a, 38b can include two portions with different diameters to accommodate the bolts heads and their shanks, as needed or desired.

Figure 6:
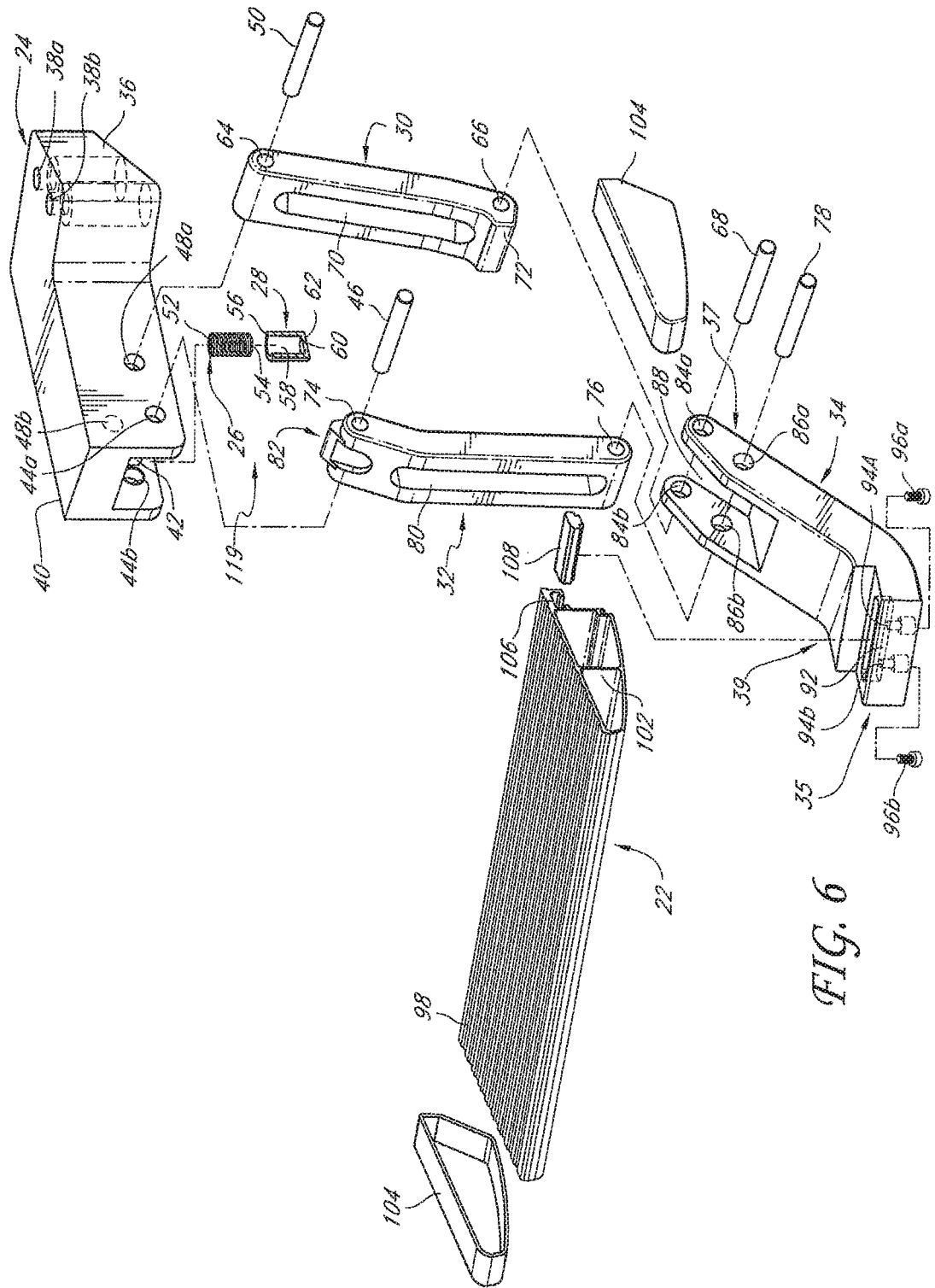
FIG. 6 is a simplified exploded perspective of the retractable vehicle step of FIG. 4 illustrating features and advantages in accordance with some embodiments of the invention.

Referring to FIG. 6, the upper mount 24 further comprises a front portion or end 40 which includes a socket or opening 42 that receives at least a portion of the spring 26 and plunger 28. The front portion 40 comprises a first pair of front aligned mount holes 44a, 44b which are also generally aligned with and below the socket 42. The holes 44a, 44b receive a clevis pin, pivot pin, or axle 46 or the like to pivotally couple or connect the upper mount 24 to the medial outer arm 32.

The front portion 40 further comprises a second pair of front aligned mount holes 48a, 48b offset further toward the front of upper mount 24 from the first pair of aligned holes 44a, 44b. The holes 48a, 48b receive a clevis pin, axle or pivot pin 50 or the like to pivotally couple or connect the upper mount 24 to the medial inner arm 30.

The upper mount 24 desirably comprises a structurally strong and/or light weight material. In certain embodiments, the upper mount 24 comprises a fiber reinforced composite material such as a carbon fiber reinforced plastic or thermoplastic with, for example, a polymer matrix or resin. In modified embodiments, the upper mount 24 can comprise other suitable composites, plastics, thermoplastics, metals, alloys, ceramics, among others, with efficacy, as needed or desired.

Figure 5:
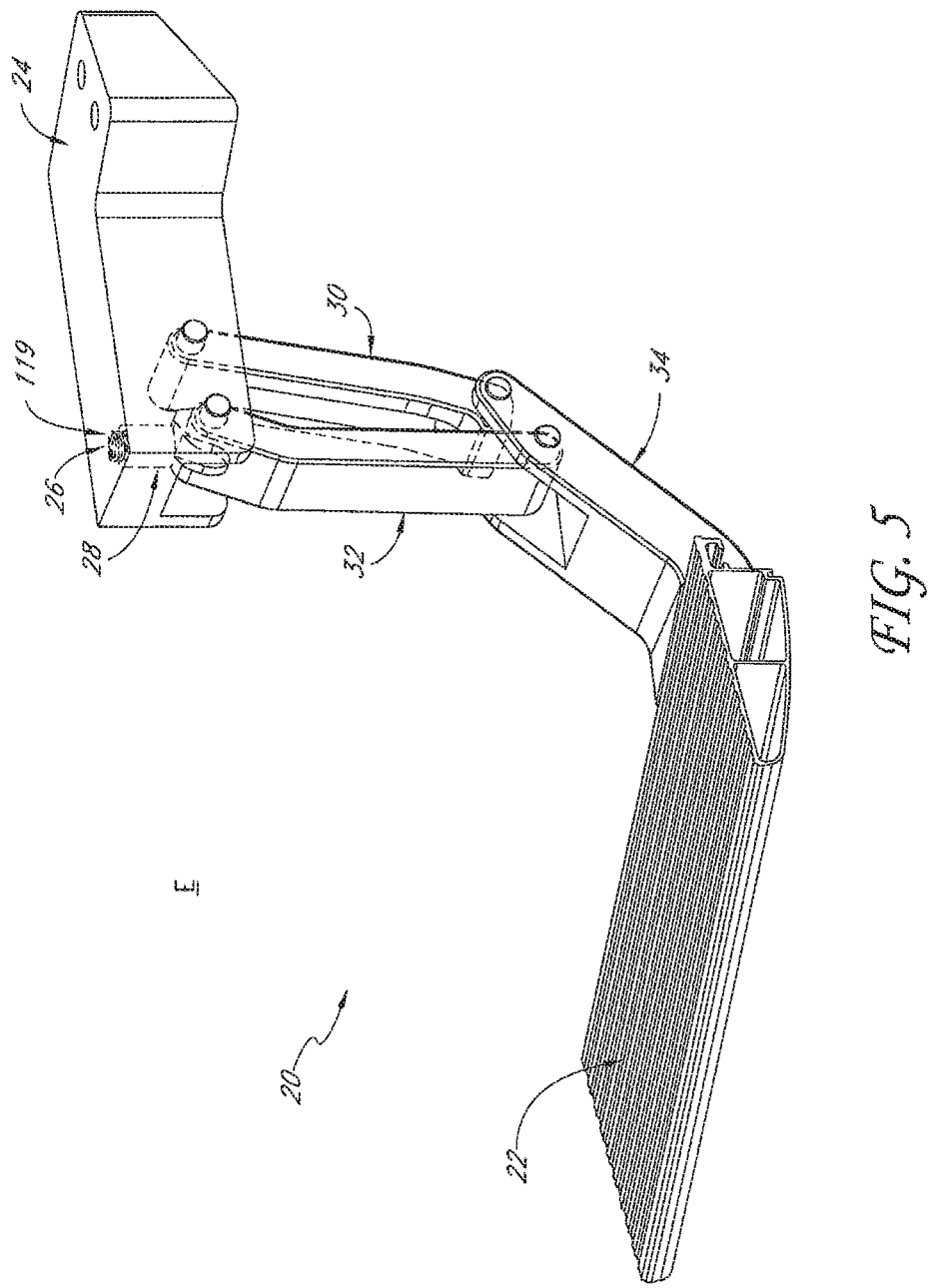
FIG. 5 is a simplified perspective of the retractable vehicle step of FIG. 4 in an extended state illustrating features and advantages in accordance with some embodiments of the invention.

In certain embodiments, as shown for example in FIG. 5 and in greater detail in FIG. 6, the biasing member 26, which is part of an internal biasing mechanism or system 119 to provide for controlled energy storage and release, comprises an internal spring. The spring 26, in certain embodiments, is a compression spring with an upper or top portion or end 52 which is received within the socket 42 and a lower or bottom portion or end 54 which is received within the plunger 28. Advantageously, the compression spring 26 provides a compact component which is durable and desirably has a high fatigue life. In modified embodiments, the biasing spring 26 can comprise other resilient energy storage and release means such as an arched or leaf spring or a V-shaped or angled spring with efficacy, as needed or desired.

Advantageously, in certain embodiments, the internal biasing spring 26 is covered and/or protected (i.e., not exposed to the ambient environment) by the socket 42 and the plunger 28. This desirably prevents or mitigates breakage, failure, malfunction and/or fouling of the internal biasing spring 26, especially when the vehicle 10 is operated in rough terrains such as during off road operation, and provides a durable and long-lasting vehicle step 20.

The biasing spring 26 desirably comprises a structurally strong and/or light weight material. In certain embodiments, the spring 26 comprises a metal or alloy such as stainless steel or aluminum. In modified embodiments, the spring 26 can comprise other suitable metals, alloys, composites, plastics, thermoplastics, ceramics, among others, with efficacy, as needed or desired.

Continuing to refer to FIG. 6, in certain embodiments, the plunger or piston 28 is moveable in a direction generally aligned with or parallel to the vertical axis 14 to provide an internal biasing mechanism that, along with the spring 26, controls the retraction and extension of the vehicle step 20. The upper portion 52 of the spring 26 extends into the socket 42. An opening or cavity 58 of the plunger receives the spring 26 with the lower spring end 54 in contact with a surface 60 of the plunger cavity 58. The spring 26 extends out of the open upper end 56 of the plunger 28.

The plunger or piston 28 comprises a lower or bottom surface 62 which forms a retaining or bearing surface that, as described in further detail below, desirably engages a specially contoured cam portion or surface 82 of the medial outer arm 32. Advantageously, in certain embodiments, the combination of the plunger retaining surface 62, the spring 26 and the contoured cam portion or surface 82 of the medial outer arm 32 provides an internal and protected biasing mechanism or system that urges the vehicle step 20 towards the retracted and extended positions while facilitating transition between the retracted and extended positions. Moreover, as noted above and discussed further below, these embodiments of the internal biasing mechanism prevent or mitigate breakage, fracture, malfunction, and/or fouling, especially in off road terrains and the like.

The plunger 28 desirably comprises a structurally strong and/or light weight material. In certain embodiments, the plunger 28 comprises a metal or alloy such as stainless steel or aluminum. In modified embodiments, the plunger 28 can comprise other suitable metals, alloys, composites, plastics, thermoplastics, ceramics, among others, with efficacy, as needed or desired.

The medial inner first arm 30 is pivotally coupled or connected to and positioned between the upper mount 24 and the lower mount 34. The medial inner arm 30 comprises an upper or top through hole or passage 64 aligned with the second pair of upper aligned mount holes 48a, 48b which receive the clevis pin, axle, or pivot pin 50 or the like. The medial inner arm 30 further comprises a lower or bottom through hole or passage 66 aligned with a second pair of lower aligned mount holes 84a, 84b which receive a clevis pin, axle or pivot pin 68 or the like to pivotally couple or connect the medial inner arm 30 and the lower mount 34.

In certain embodiments, the medial inner first arm 30 comprises a slot or through hole 70. This is advantageously configured to reduce device weight while maintaining structural integrity and overall strength.

The medial inner first arm 30, in certain embodiments, further comprises a mechanical stop, protrusion, lip or extension 72 proximate the passage 66. The mechanical stop 72 advantageously controls the maximum extension (generally position "E") by contacting or abutting the medial outer arm 32. In certain embodiments, the final retraction (generally position "R") is controlled when the inner surfaces of both medial arms 30, 32 contact or abut at the step retracted position to stop further retraction.

The medial inner arm 30 desirably comprises a structurally strong and/or light weight material. In certain embodiments, the medial inner arm 30 comprises a fiber reinforced composite material such as a carbon fiber reinforced plastic or thermoplastic with, for example, a polymer matrix or resin. In modified embodiments, the medial arm 30 can comprise other suitable composites, plastics, thermoplastics, metals, alloys, ceramics, among others, with efficacy, as needed or desired.

The medial outer second arm 32 is pivotally coupled or connected to and positioned between the upper mount 24 and the lower mount 34. The medial outer arm 32 comprises an upper or top through hole or passage 74 aligned with the first pair of upper aligned mount holes 44a, 44b which receive the clevis pin, pivot pin or axle 46 or the like. The medial outer arm 32 further comprises a lower or bottom through hole or passage 76 aligned with a first pair of lower aligned mount holes 86a, 86b which receive a clevis pin, axle or pivot pin 78 or the like to pivotally couple or connect the medial outer arm 32 and the lower mount 34.

In certain embodiments, the medial outer second arm 32 comprises a slot or through hole 80. This is advantageously configured to reduce device weight while maintaining structural integrity and overall strength.

The medial outer arm 32, in certain embodiments, comprises a specially contoured cam portion or surface 82 adjacent the passage 74. As discussed in further detail below in connection with FIGS. 6-9, the cam portion or surface 82 desirably abuts the plunger retaining surface 62 and desirably provides a biasing force to the stepping member 22 in the retracted and extended positions and facilitates transition between the retracted and extended positions.

The medial outer arm 32 desirably comprises a structurally strong and/or light weight material. In certain embodiments, the medial outer arm 32 comprises a fiber reinforced composite material such as a carbon fiber reinforced plastic or thermoplastic with, for example, a polymer matrix or resin. In modified embodiments, the medial arm 32 can comprise other suitable composites, plastics, thermoplastics, metals, alloys, ceramics, among others, with efficacy, as needed or desired.

In certain embodiments, the lower mount 34 is angular or generally L-shaped. The lower mount 34 generally comprises a front portion or end 35 and a back portion or end 37 and is positioned between the medial arms 30, 32 and the stepping member 22. The front portion 35 of the lower mount 34 is pivotally coupled or connected to the medial arms 30, 32 and the back portion 37 of the lower mount 34 is substantially rigidly coupled or connected to the stepping member 22.

The lower mount 34 comprises a second pair of top or upper spaced and aligned holes 84a, 84b which are aligned with the lower passage 66 of the inner arm 30 and receive the clevis or pivot pin 68 to pivotally couple or connect the lower mount 34 and the inner arm 30. The lower mount 34 further comprises a first pair of top or upper spaced and aligned holes 86a, 86b which are displaced toward the front relative to the holes 84a, 84b. The holes 86a, 86b are aligned with the lower passage 76 of the outer arm 32 and receive the clevis or pivot pin 78 to pivotally couple or connect the lower mount 34 and the outer arm 32. Clearance space 88 is desirably provided to receive lower portions of the inner and outer arms 30, 32.

In certain embodiments, the lower mount 34 comprises one or more slots or through holes 90 (see, e.g., FIG. 4). These are advantageously configured to reduce device weight while maintaining structural integrity and overall strength.

The lower mount 34, in certain embodiments, proximate its distal end comprises a slot 92 generally aligned with a pair of passages or through holes 94a, 94b. As discussed below, the slot 92 is configured to facilitate connection to the stepping member 22. Screws 96a, 96b or the like extend through respective holes 94a, 94b to desirably rigidly connect the distal mount 34 and the stepping member 22.

As shown for example in FIG. 6, in some embodiments, the front end 35 of the lower mount 34 further includes an angled portion 39. In some embodiments, the lateral displacement $d_{lateral}$ of the stepping member 22 as it moves from the retracted position R to the extended position E may be accomplished by attaching the vehicle step 20 to the vehicle 10 at an angle to the longitudinal axis 13 of the vehicle 10. The angle of attachment may be changed to conveniently increase or decrease the amount of lateral displacement $d_{lateral}$. Angled portion 39 of the lower mount 34 may be provided such that the outermost edge of stepping member 22 extends substantially parallel to the bumper 16 of the vehicle 10 in the extended position E. In the illustrated embodiment, the stepping member extends to the left of the tailgate 15 (see, e.g., FIG. 3) in the extend position E. In some embodiments, the vehicle step 20 may be configured such that it extends to the right of the tailgate 15. The angled portion 39 may be appropriately configured to position the outer edge of the stepping member 22 in a substantially parallel arrangement to the bumper 16. Alternatively, the angled portion 39 may be configured such that the outer edge of the stepping member 22 extends substantially perpendicular to the bumper 16 to, for example, facilitate entrance into or exit from the cargo bed via the side of the tailgate 15 when it is open. In some embodiments, the vehicle step 20 is arranged on the vehicle 10 such that the outer edge of the stepping member 22 is angled with respect to the lateral axis 12 of the vehicle 10 to the same degree in both the retracted and extended position. In some embodiments, this angle is between approximately 0 and 10, 0 and 20, or 0 and 45 degrees from the lateral axis 12.

The lower mount 34 desirably comprises a structurally strong and/or light weight material. In certain embodiments, the lower mount 34 comprises a fiber reinforced composite material such as a carbon fiber reinforced plastic or thermoplastic with, for example, a polymer matrix or resin. In modified embodiments, the lower mount 34 can comprise other suitable composites, plastics, thermoplastics, metals, alloys, ceramics, among others, with efficacy, as needed or desired.

The stepping member or T-nut step extrusion 22 desirably comprises a stepping deck 98. In certain embodiments, the stepping deck 98 comprises a ridged surface with ridges and valleys to provide stepping traction. In modified embodiments, the stepping deck 98 can efficaciously comprise other ridged or textured surfaces such corrugated, grooved, ribbed, dimpled, and the like, among others, as needed or desired. Various surface coatings, finishes or the like may be used with efficacy to provide enhanced traction, as needed or desired.

In certain embodiments, the stepping member 22 is substantially hollow to desirably provide a light weight component while maintaining structural integrity. In some embodiments, the stepping member 22 has a generally V-shaped configuration and comprises one or more support ribs 102 or the like.

As shown, for example, in FIG. 6, in certain embodiments one or more sides of the stepping member 22 are covered with a side cap 104 or the like for user protection. The side cap 104 can comprise any one of suitable materials such as, but not limited, to a generally rigid plastic or the like.

The stepping member 22 is configured to connect to the lower mount 34. In certain embodiments, the stepping member 22 comprises a slot 106 adjacent the lower mount 34 which is configured to receive a T-nut 108 or the like. The screws 96a, 96b engage the T-nut 108 to substantially rigidly connect or couple the stepping member 22 and the lower mount 34.

The stepping member 22 desirably comprises a structurally strong and/or light weight material. In certain embodiments, stepping member 22 comprises a metal or alloy such as aluminum or steel. In modified embodiments, the stepping member 22 can comprise other suitable metals, alloys, composites, plastics, thermoplastics, ceramics, among others, with efficacy, as needed or desired.

In some embodiments, the stepping member 22 (and/or the stepping deck 98) has a width (as measured generally along the direction of the lateral axis 12) of about 30.5 cm (12 inches) and a length (as measured generally along the direction of the longitudinal axis 13) of about 15.2 cm (6 inches). In modified embodiments, the stepping member 22 (and/or the stepping deck 98) may be dimensioned in other manners with efficacy, as needed or desired. For example, the stepping member 22 may have a width of at least 4 inches, at least 6 inches, at least 8 inches, or at least 10 inches. Similarly, the stepping member 22 may have a depth (as measured generally along the direction of the vertical axis 14) of at least 2 inches, at least 3 inches, at least 4 inches, at least 5 inches, or at least 6 inches.

The pins 46, 50, 68, 78, screws 96a, 96b and the T-nut 108 desirably comprise a structurally strong and/or light weight materials. In certain embodiments, a metal or alloy such as aluminum or steel is utilized. In modified embodiments, other suitable metals, alloys, composites, plastics, thermoplastics, ceramics, among others, can be utilized with efficacy, as needed or desired.

The retractable vehicle step, in accordance with embodiments of the invention, and its various components can be fabricated or created using a wide variety of manufacturing methods, techniques and procedures. These include, but are not limited to, casting, molding, machining, laser processing, milling, stamping, laminating, bonding, welding, adhesively fixing, and the like, among others.

Figure 7:
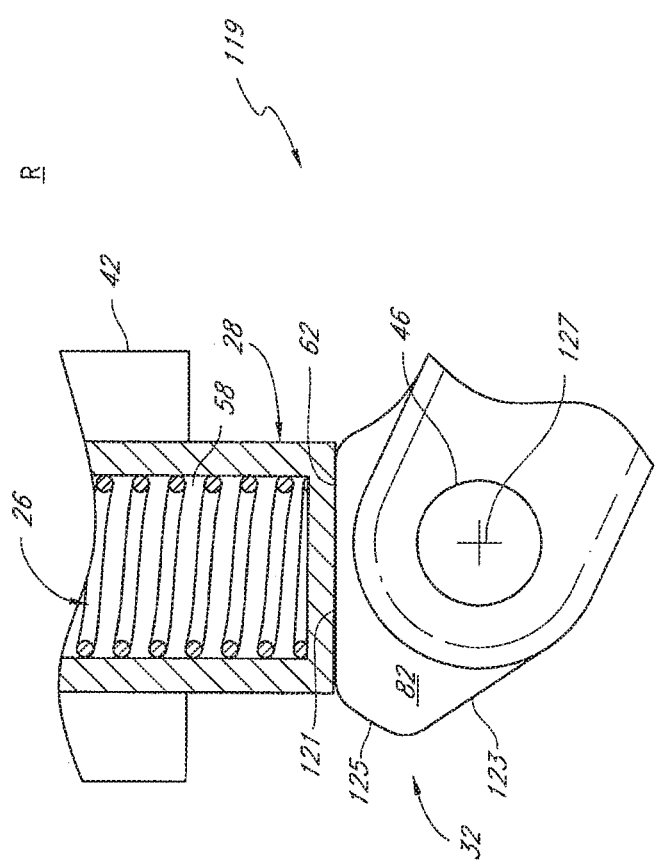
FIG. 7 is a partial sectional view of the retractable vehicle step in a retracted or storage state illustrating features and advantages in accordance with some embodiments of the invention.
Figure 8:
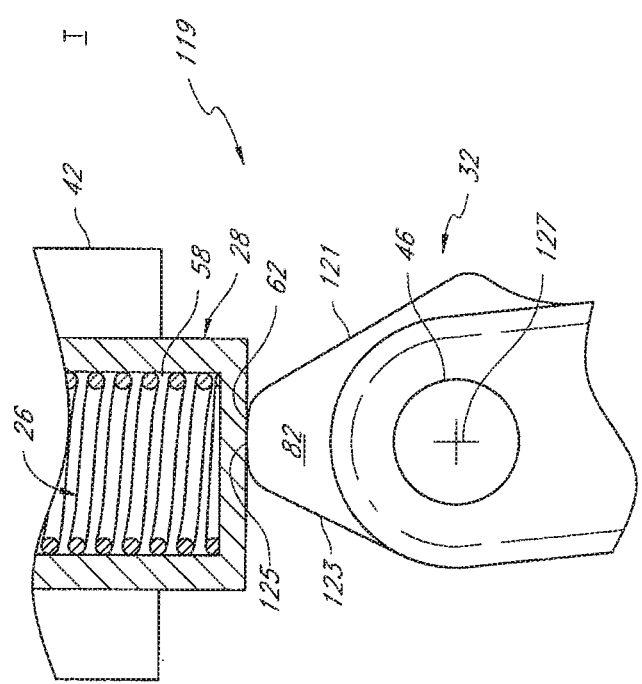
FIG. 8 is a partial sectional view of the retractable vehicle step in a transition state illustrating features and advantages in accordance with some embodiments of the invention.
Figure 9:
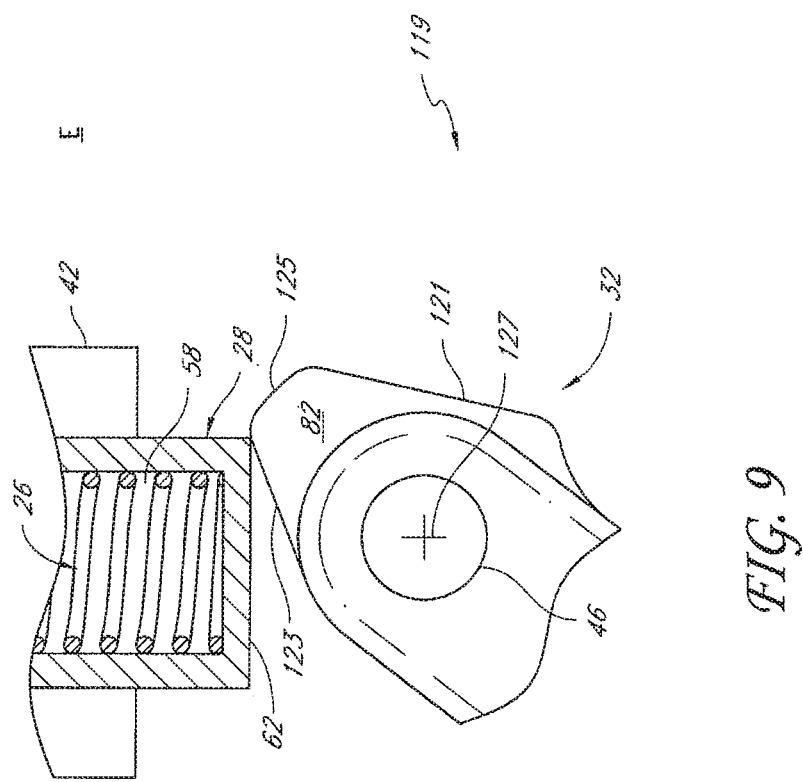
FIG. 9 is a partial sectional view of the retractable vehicle step in an extended state illustrating features and advantages in accordance with some embodiments of the invention.

FIGS. 7-9 illustrate certain embodiments of the operation of a biasing or urging mechanism 119 generally including the compression spring 26, the plunger 28 and the contoured cam portion 82 of the outer arm 32. FIG. 7 depicts the step retracted position or state "R," FIG. 8 depicts a step transition position or state "T," and FIG. 9 depicts the step extended position or state "E." The step transition position or state "T" is a position as the step member 22 transitions between the retracted and extended positions.

The outer arm contoured cam portion 82 comprises a first cam surface or portion 121, a second cam surface or portion 123, and an intermediate cam surface or portion 125. An axis of rotation or rotation or pivot axis 127 is generally defined by the pin or axle 46.

Referring in particular to FIG. 7, in the step retracted position, the moveable plunger retaining surface 62 abuts or contacts the moveable first cam surface 121 and these two surfaces are in substantially flush engagement. In the step retracted position, the plunger 28 has a generally maximum extension out of the socket 42 and the spring 26 has a generally maximum tension force to provide a biasing or urging force towards the rotation axis 127. In other words, the retaining surface 62 is biased towards the rotation axis 127 to maintain the vehicle step 20 (and/or the stepping member 22 and/or the stepping deck 98) in the retracted position, but desirably without locking out the step in the retracted position.

Referring in particular to FIG. 8, in the step transition position or stage, the moveable plunger retaining surface 62 abuts or contacts the moveable intermediate surface 125 and these two surfaces are in substantially flush engagement. In the step transition position, the plunger 28 has a generally minimum extension out of the socket 42 and the spring 26 has a generally minimum tension (or maximum compression) force. In other words, though the retaining surface 62 is biased in the direction of the rotation axis 127, the spring compression force facilitates in the transition between the retracted and extended positions.

Referring in particular to FIG. 9, in the step extended position, the moveable plunger retaining surface 62 abuts or contacts the moveable second cam surface 123 and these two surfaces are not in substantially flush engagement. In the step extended position, the plunger 28 has a generally intermediate extension out of the socket 42 and the spring 26 has a generally intermediate tension force to provide a biasing or urging force towards the rotation axis 127. In other words, the retaining surface 62 is biased towards the rotation axis 127 to maintain the vehicle step 20 (and/or the stepping member 22 and/or the stepping deck 98) in the extended position, but desirably without locking out the step in the extended position.

Stated differently, the tensioned spring 26 provides an urging or biasing force in the retracted and extended positions to maintain the vehicle step 20 (and/or the stepping member 22 and/or the stepping deck 98) in the respective retracted and extended positions, while in the transition position the compressed spring 26 facilitates in the transition between the retracted and extended positions.

As noted above, in certain embodiments, the final retraction ("R") is controlled when the inner surfaces of both medial arms 30, 32 contact or abut at the step retracted position to stop further retraction. Also as noted above, the medial inner arm stop 66 advantageously, in certain embodiments, controls the maximum extension ("E") by contacting or abutting the medial outer arm 32.

The methods which are described and illustrated herein are not limited to the sequence of acts described, nor are they necessarily limited to the practice of all of the acts set forth. Other sequences of acts, or less than all of the acts, or simultaneous occurrence of the acts, may be utilized in practicing embodiments of the invention.

Figure 10:
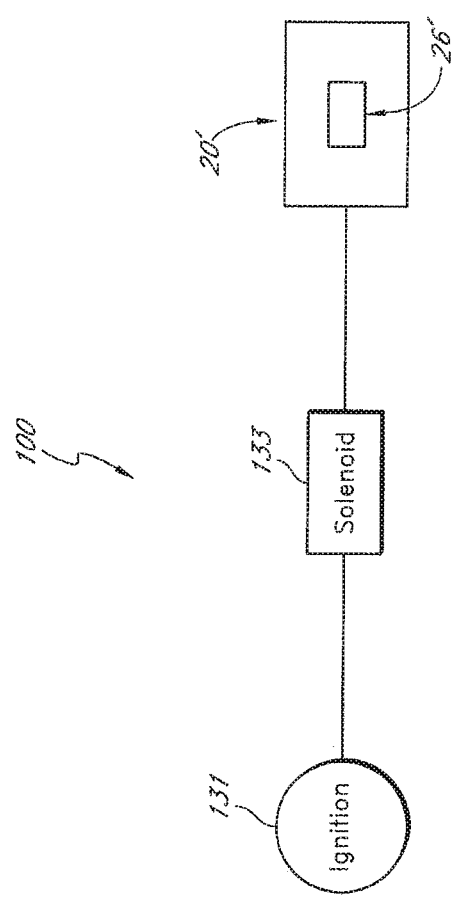
FIG. 10 is a simplified schematic view of a powered retractable vehicle step system illustrating features and advantages in accordance with some other embodiments of the invention.

FIG. 10 schematically shows a powered retractable vehicle step system 100 in accordance with some embodiments. The system 100 comprises a retractable vehicle step 20' which is substantially the same as embodiments of the vehicle step 20 except that it has a biasing member that comprises an electronically operable gas spring 26'.

In certain embodiments, when the vehicle 10 is turned on by its ignition 131, the ignition 131 actuates a solenoid actuator, motor or device 133 to retract the vehicle step 20' by operation of the gas spring 26'. This is convenient, for example, if the user forgets to retract the vehicle step 20' after use, the ignition 131 automatically retracts the vehicle step 20', thereby desirably protecting it from potential damage.

Figure 11:
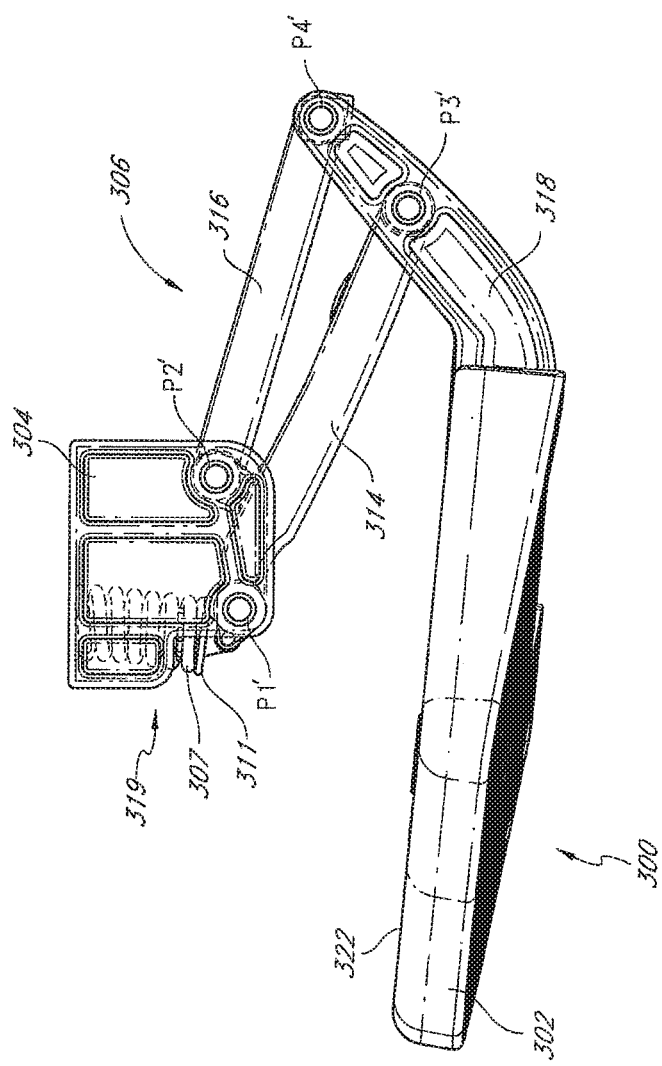
FIG. 11 is a side view of another embodiment of a retractable vehicle step in a retracted position.
Figure 12:
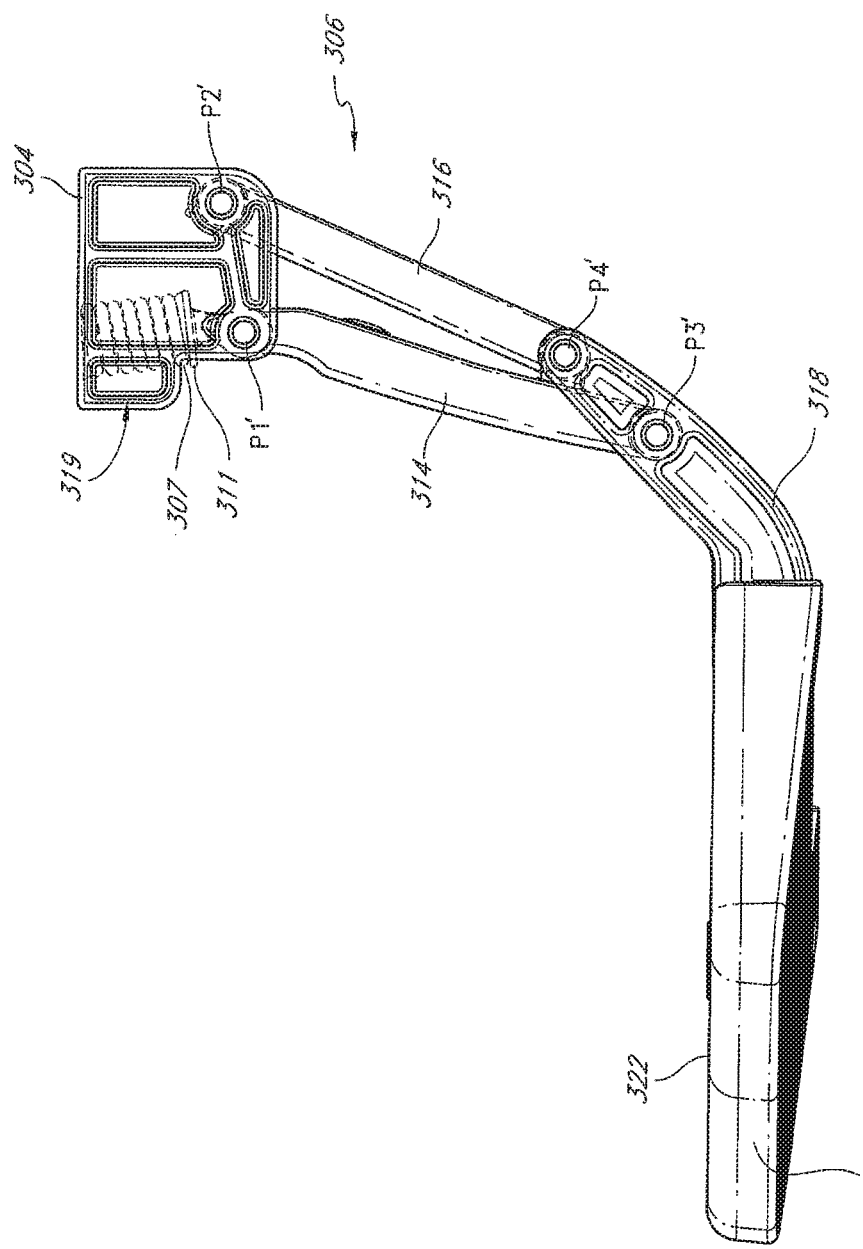
FIG. 12 is a side view of the retractable vehicle step of FIG. 11 in an extended position.

With reference to FIGS. 11 and 12 another embodiment of a retractable vehicle step is illustrated. The retractable vehicle step 300 is configured to be mounted to a vehicle (not shown). The retractable vehicle step 300 is further configured to have a first position and a second position. The first position comprises the vehicle step 300 in a retracted position and the second position comprises the vehicle step 300 to be in an extended position. In the retracted position, the retractable vehicle step 300 is preferably located in a substantially in-board position relative to the rear of a vehicle and, in the extended position, the retractable vehicle step 300 is in a substantially outboard position relative to the rear of a vehicle.

In some embodiments, the retractable vehicle step 300 preferably includes an upper mount 304, a stepping member 302 and connecting arms 306. Furthermore, the retractable vehicle step 300 preferably includes a biasing mechanism 319 including a biasing member 307, which in some embodiments may be substantially similar to the biasing member 26 of the embodiment of the retractable vehicle step 20 shown in FIG. 4.

The upper mount 304 may include one or more additional mounting portions (not shown) to facilitate securing the vehicle step 300 to a vehicle. In the particular embodiment of the retractable vehicle step 300 shown in FIGS. 11 and 12, the upper mount 304 is preferably a U-shaped mount which comprises pivotal connections P1' and P2'. The pivotal connections P1' and P2' are preferably configured to pivotally connect the arms 306 to the upper mount 304. The upper mount 304 in some embodiments may further include certain electronic or mechanic actuation components which may be configured to actuate the retraction or extension of the retractable vehicle step 300. Such components may be substantially similar to those described above with reference to previous embodiments of a retractable vehicle step.

With continued reference to FIGS. 11 and 12, the retractable vehicle step 300 further includes arms 306. The arms 306 further include a first arm 314 and a second arm 316. The arm 314 is preferably secured by pivotal connection P1' to the upper mount 304 and is secured to a step bracket 318 at pivotal mount P3'. The arm 316 is preferably secured to the upper mount 304 at pivotal mount P2' and is secured to the step bracket 318 at pivotal connection P4'. The lengths and mounting positions of the connecting arms 306 are preferably sized and shaped so as to move the stepping member 302 downwards and outboard when the retractable vehicle step 300 is moved from a retracted position to an extended position.

Figure 11A:
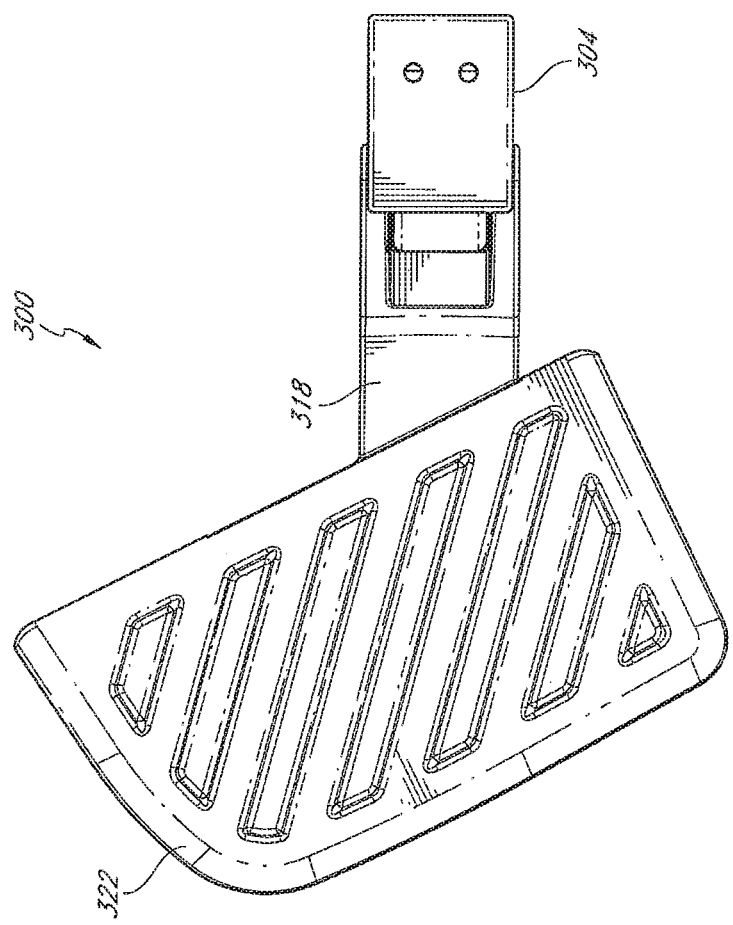
FIG. 11A is a top view of the retractable vehicle step of FIG. 11.

In some embodiments, it is advantageous to configure the vehicle step 300 such that in the retracted position, the stepping surface 322 of the stepping member 302 is at an angle to the horizontal. As shown in FIG. 11A, the stepping member 302 need not be symmetrical. In some embodiments, the outer edge corner of the stepping member 302 may be rounded or otherwise shaped to minimize the amount of stepping member 302 that extends beyond the bumper if the vehicle step 300 is mounted in close proximity to the outer edge of the bumper of the vehicle. In some embodiments, the outer corner of the stepping member 302 is shaped to correspond to the rounded features of the bumper to present an aesthetically pleasing appearance when mounted and in the retracted position.

With continued reference to FIGS. 11 and 12, the step bracket 318 is preferably connected to the arms 306 at pivotal mount P4' and pivotal mount P3'. The step bracket 318 is further configured to receive a stepping member 302. The stepping member 302 and the step bracket 318 in some embodiments may be secured to one another by fasteners so as to create a connection that may support the weight of a person stepping on the retractable vehicle step 300. In addition, it may be operated by the foot or other appendage of a user as described in greater detail below.

Though not shown, when mounted on the rear of a vehicle, it may be advantageous in some embodiments to mount the vehicle step 300 such that the stepping member 302 is displaced laterally a distance $ch_{ar}$' to provide clearance for, for example, an open tailgate. In some embodiments, this may be accomplished as described above with respect to vehicle step 20. FIG. 11A shows the vehicle step 300 from a top view, illustrating an angle formed between the arms 306 and the stepping member 302 according to some embodiments. As the stepping member 302 moves from the retracted to the extended positions, the angle between the arms 306 and the stepping member 302 preferable remains constant. In some embodiments, the stepping member 302 is positioned on the vehicle such that the outer edge of the stepping member 302 is substantially parallel to the bumper of the vehicle in both the retracted and extended positions. As described above with respect to the other embodiments, the stepping member 302 may alternatively be at an angle to the bumper of the vehicle.

In some embodiments, the retractable vehicle step is advantageously configured to permit manually operated retraction and extension. Manual operation may minimize the expense of manufacture and/or installation. In some embodiments, the retractable step is particularly configured to be moved between its retracted and extended positions by foot operation of a user. Advantageously, the vehicle step includes a mechanism to facilitate this operation. For example, in the embodiment shown in FIGS. 11 and 12, the vehicle step 300 includes biasing member 307, for example a spring. In the retracted position, shown in FIG. 11, biasing member 307 biases the stepping member 302 in the retracted position. The biasing member 307 compresses as the stepping member 302 is pulled outwards toward the extended position, thereby providing resistance to the movement outwards. As the stepping member 302 continues to move outwards, the biasing member 307 passes its inflection point and begins to expand rather than compress. The expansion of the biasing member 307 assists the continued extension of the stepping member 302. In the extended position, the vehicle step 300 may be self-energized or locked to prevent accidental retraction when weight is applied to the extended step, e.g., when a person steps on the stepping member 302 the vehicle step does not load in such a way to bias the vehicle step 300 in a retracted position. Described in another way, by stepping on the stepping member 302 the vehicle step will be substantially locked by the arms 306 so as to bias the vehicle step 300 to an open position. Self-energized features may be provided on any of the vehicle steps described herein.

To return a self-energized step to the retracted position, the stepping member 302 is partially lifted when in the extended position and pushed toward the vehicle and into the retracted position. The biasing member 307 again resists this movement inwards, for example, by compressing as the stepping member 302 moves inwards. If the vehicle step 300 is not self-energized, step may be moved toward the retracted position simply by pushing the step toward the retracted position. The resistance of the biasing member 307 to this movement helps resist unintended movement of the step 300 toward the retracted position when in use.

When the biasing member 307 passes its inflection point, it assists in the movement inwards and biases the stepping member 302 into the retracted position. In some embodiments, the biasing forces of the biasing member 307 are advantageously configured to allow the vehicle step 300 to be retracted and extended by the foot of a user, rather than a hand operated handle or lever or an automated system. In some embodiments, the vehicle step 300 is moved to the extended position by a user who hooks her foot onto the stepping member 302 and pulls it outwards toward the extended position. In some embodiments, an engagement portion may be provided on the step to facilitate the hooking of the foot. For example, a cavity on the underside of the step may be provided.

In some embodiments, biasing member or spring 307 engages a lower portion of upper mount 304 and is held in place at least at the end engaging the upper mount 304. For example, the spring 307 may rest in a cavity formed in upper mount 304 such that an upper portion of spring 307 is enclosed within the cavity and a lower portion of the spring 307 is outside of the cavity. The upper portion of the spring 307 is substantially prevented from moving along the X and Y directions as the stepping member 302 is moved from the retracted to the extended positions. The lower portion of the spring 307 outside of the cavity is not directly restrained by the cavity and is thereby allowed to move along the X and Y directions as the stepping member 302 moves from the retracted position to the extended portion. The lower portion of the sprint 302 may engage a spring mount 311 to facilitate attachment to the arms 306 and to permit movement of the lower portion of the spring 307 with respect to the upper portion of the spring 307 and the arms 306. In some embodiments, the cavity encloses the entire spring 307 with an upper-most portion configured to restrain an upper portion of the spring 307 from moving while a lower portion of the cavity allows movement of a lower portion of the spring 307. In some embodiments, some or all of the spring 307 may be engaged with a cylinder extending downward from a lower portion of the upper mount 304. The cylinder may function in a similar manner as the cavity described above, preventing a portion of the spring 307 from moving in the X and Y directions while allowing another portion to move in those directions as the stepping member 302 is moved from the retracted to the extended positions.

Figure 13:
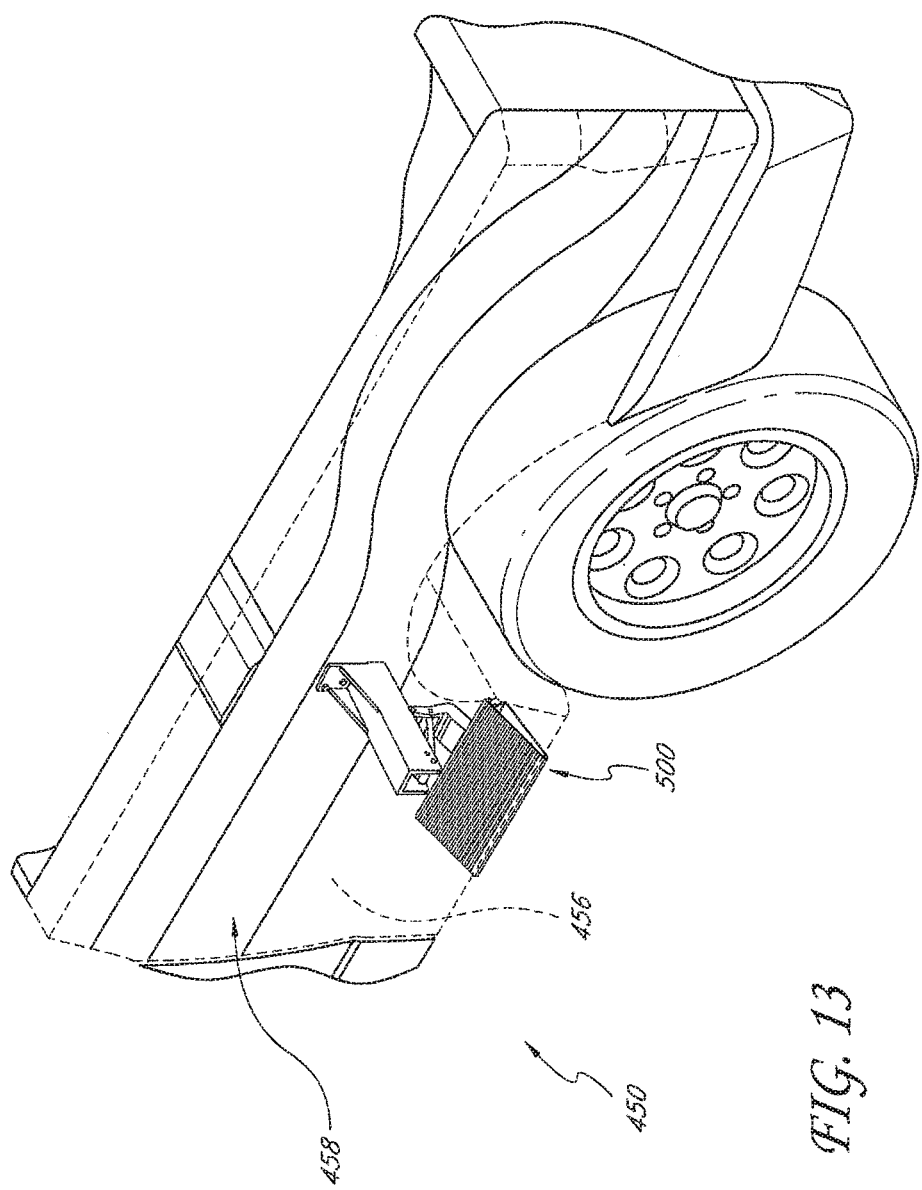
FIG. 13 is an embodiment of a retractable vehicle step mounted to a vehicle in a retracted position.
Figure 14:
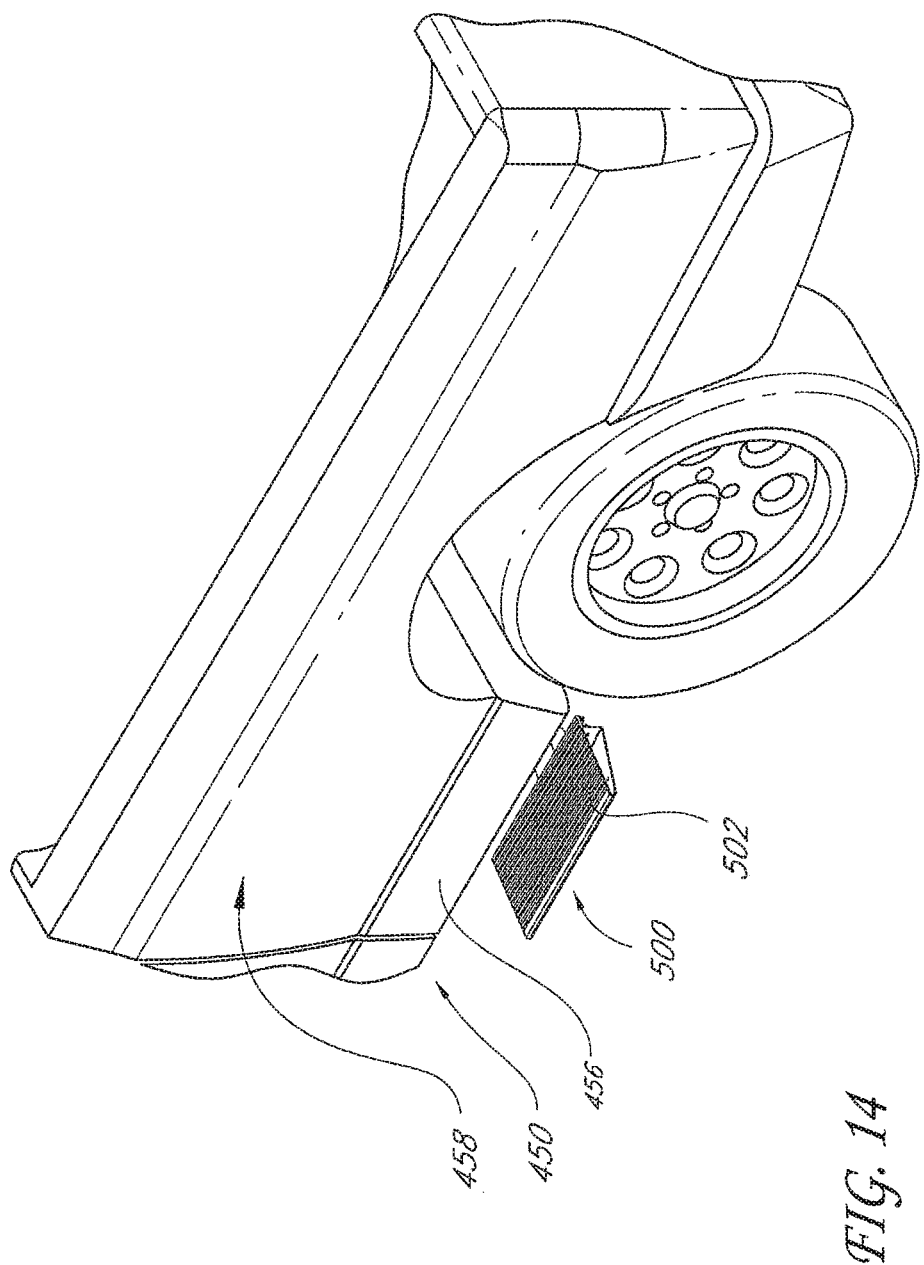
FIG. 14 is the retractable vehicle step of FIG. 13 mounted on a vehicle in an extended position.
Figure 15:
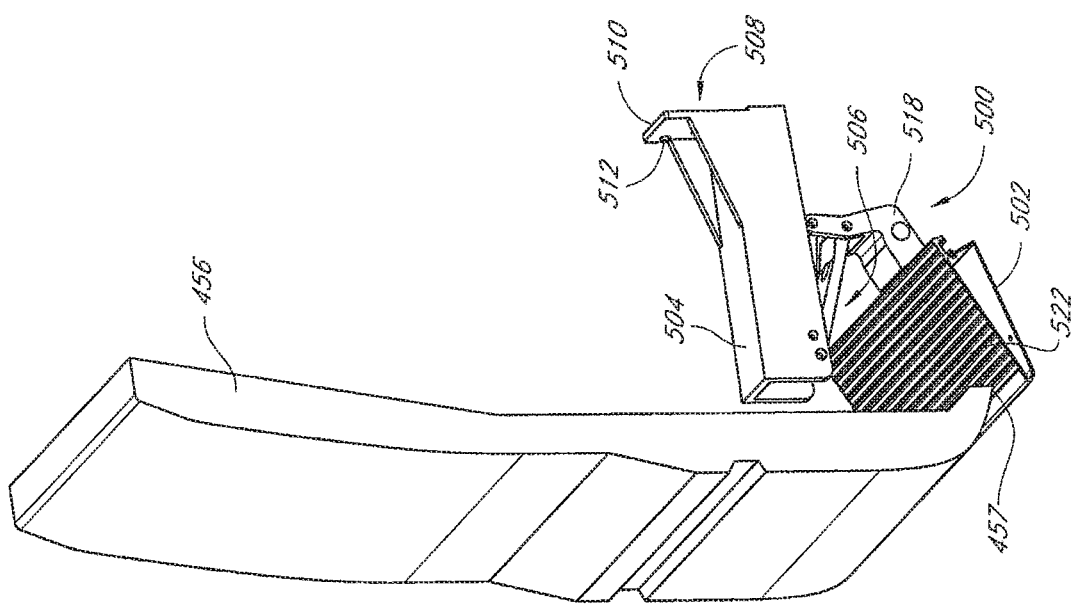
FIG. 15 is a perspective view of the retractable vehicle step of FIG. 13.

With reference to FIGS. 13-19, another embodiment of a retractable vehicle step is illustrated. The retractable vehicle step 500 is configured to be mounted to a vehicle such as the truck 450 shown in FIGS. 13 and 14. The retractable vehicle step 500 is further configured to have a first position and a second position. The first position comprises the vehicle step 500 in a retracted position and the second position comprises the vehicle step 500 to be in an extended position. In the retracted position as shown in FIG. 13 the retractable vehicle step 500 is preferably located in an in-board position relative to the side of the vehicle 450 and, in the extended position, as shown in FIG. 14 the retractable vehicle step 500 is in a substantially outboard position relative to the side of vehicle 450.

In some embodiments, the retractable vehicle step 500 can be positioned so that in a retracted position the vehicle step 500 resides substantially behind a portion of a vehicle body 456. That is the retractable vehicle step 500 is configured to retract behind the vehicle body 456 when in a retracted position so as to be unobtrusive.

Figure 16:
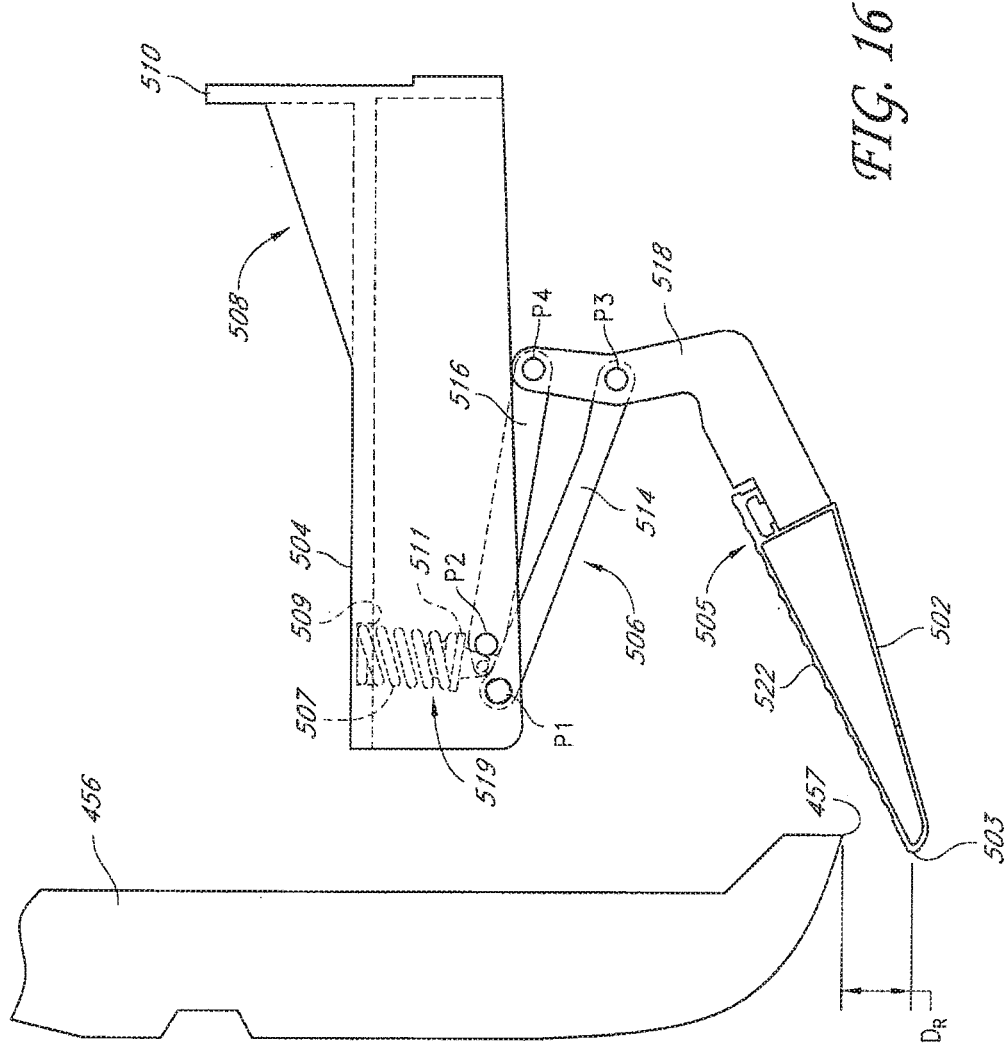
Figure 17:
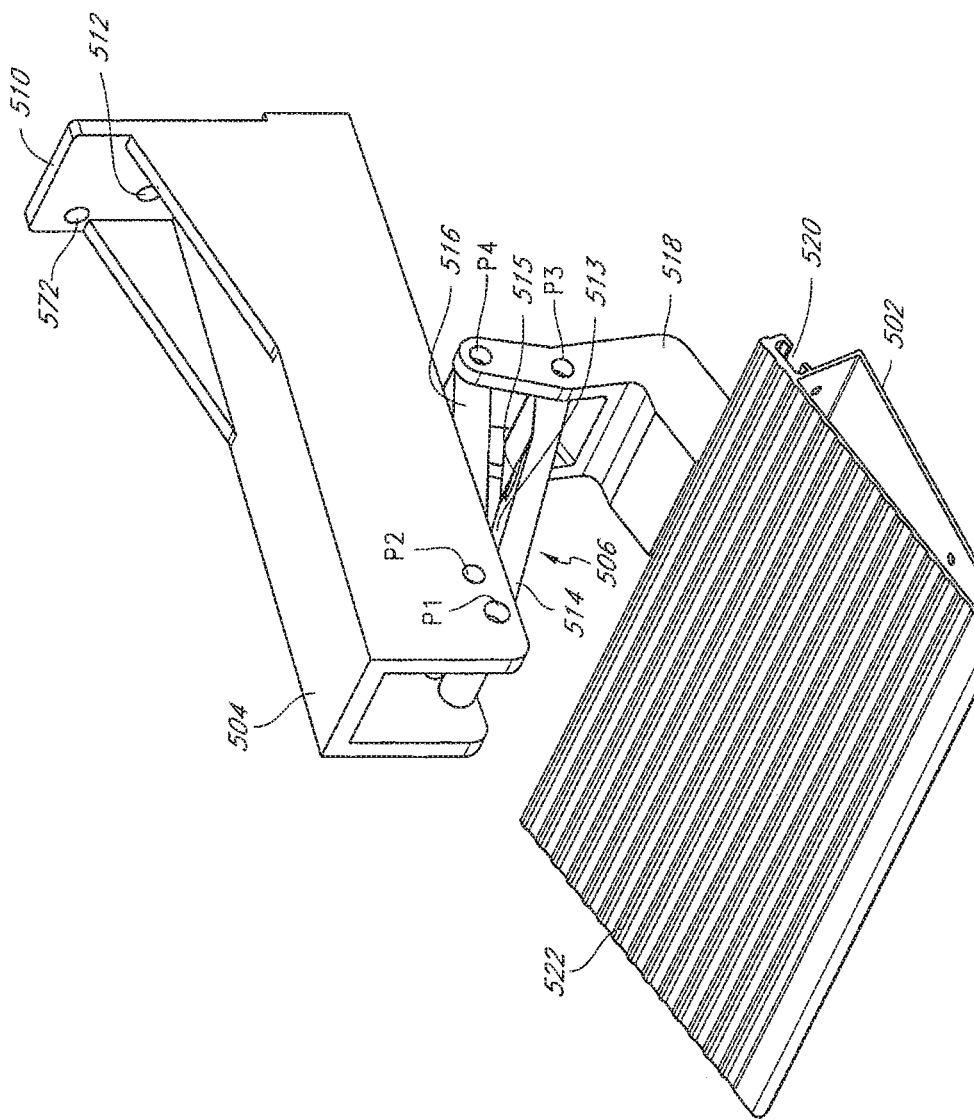
FIG. 17 is an upper perspective view of the retractable vehicle step of FIG. 13 shown in a retracted position.
Figure 18:
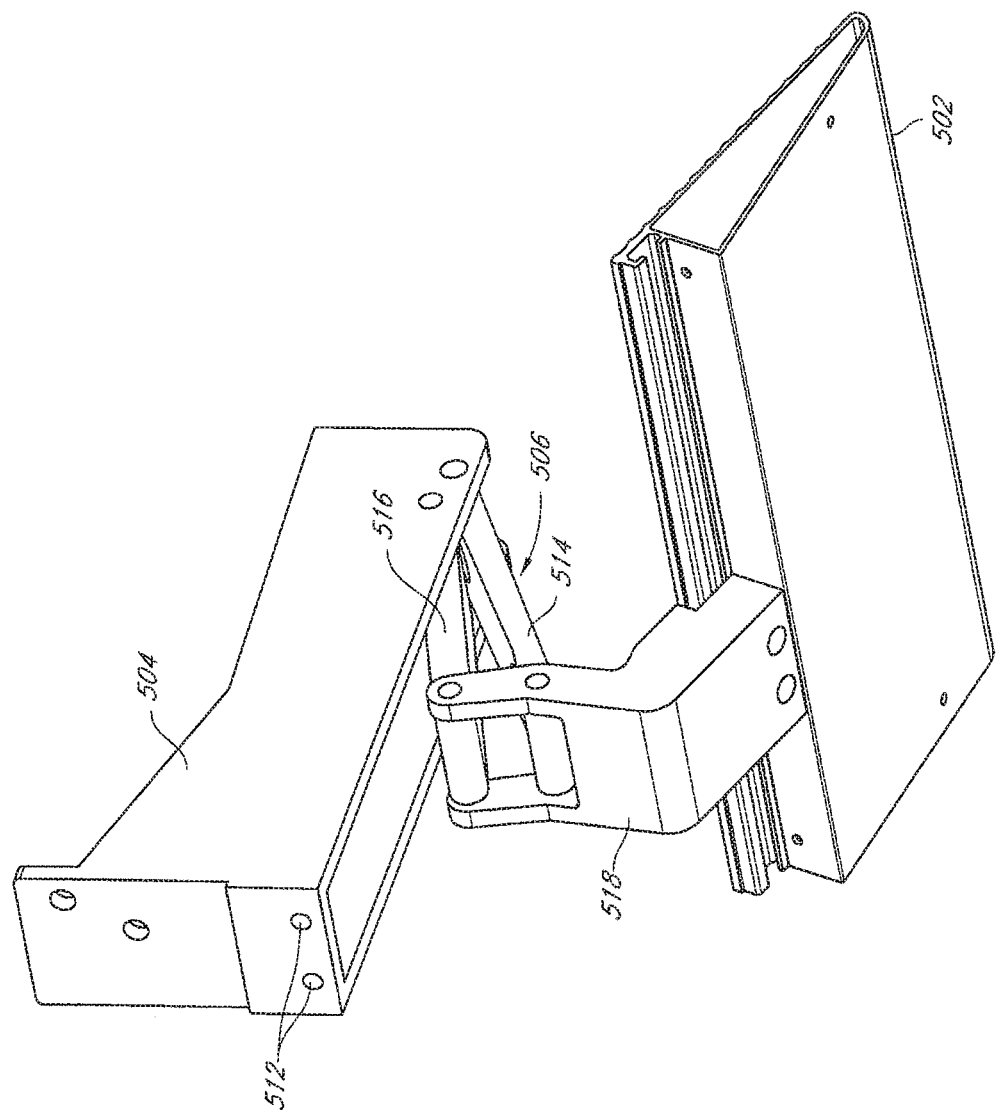
FIG. 18 is a bottom perspective view of the retractable vehicle step of FIG. 13 shown in a retracted position.
Figure 19:
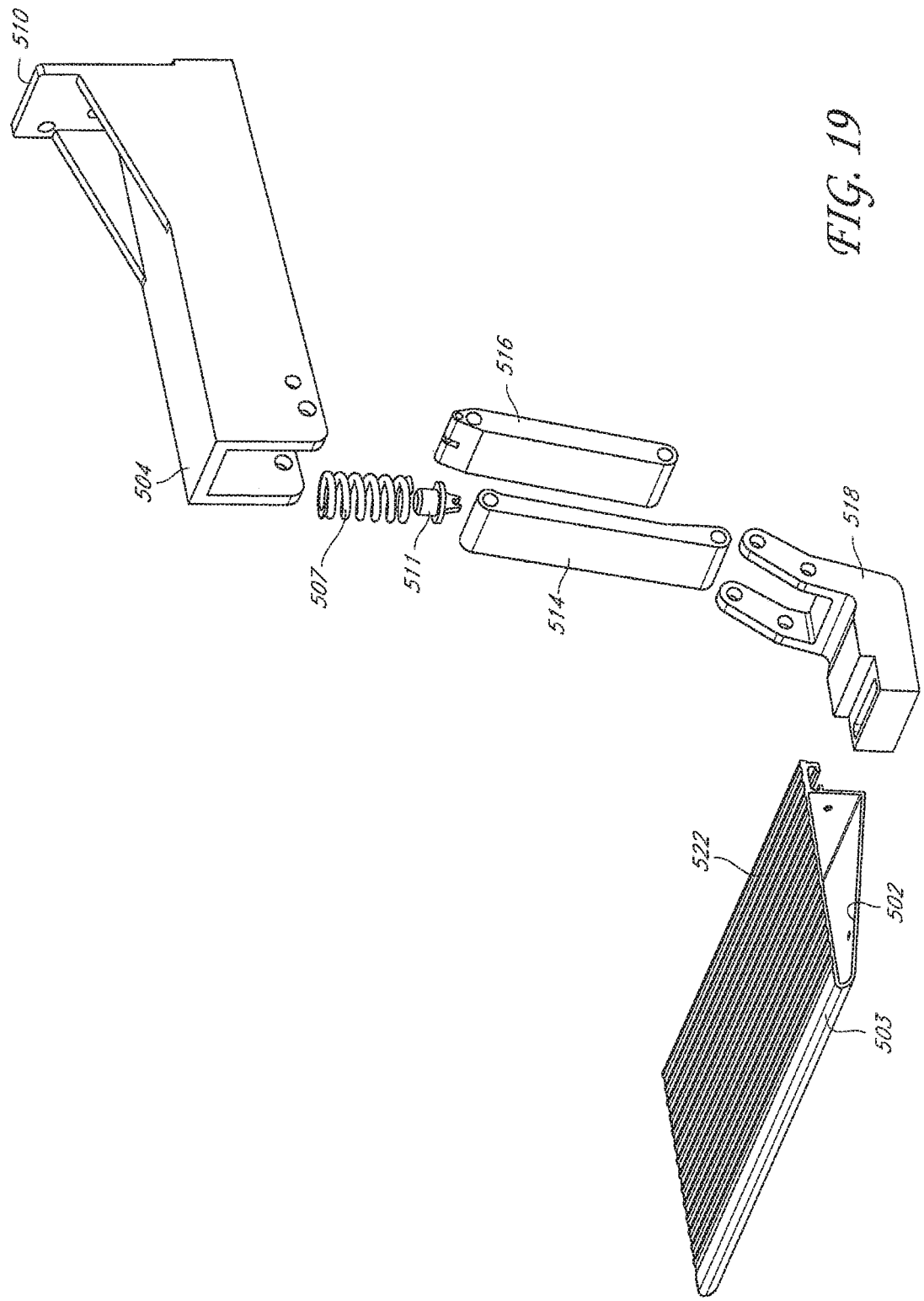
FIG. 19 is an exploded perspective assembly view of the retractable vehicle step of FIG. 13.

With reference to FIGS. 16-16d, the retractable vehicle step 500 is illustrated in a retracted position shown in FIG. 16 and an extended position shown in FIG. 16d. When the retractable vehicle step 500 transitions from a retracted position as shown in FIG. 16 to an extended position as shown in FIG. 16d, in some embodiments the stepping member 502 of the retractable vehicle step 500 moves such that a portion of the stepping member 502 moves from a lower position to a raised position. Furthermore, the position of the stepping member 502 transfers from a substantially in-board position to a substantially outboard position as shown from FIG. 16 to FIG. 16d when the retractable vehicle step 500 is moved from a retracted position to an extended position. In some embodiments, the greater portion of the vehicle step 500 transitions from a raised position to a lower position as the step 500 moves from the retracted position to the extended position.

With reference to FIGS. 13-19, an embodiment of a retractable vehicle step 500 preferably includes an upper mount 504, a stepping member 502 and connecting arms 506. Furthermore, the retractable vehicle step 500 preferably includes a biasing mechanism 519 which may include a biasing member 507. In some embodiments, the biasing member 507 assists in providing for controlled energy storage and release and comprises an internal spring. The spring 507, in certain embodiments, is a compression spring. Advantageously, the compression spring 507 provides a compact component which is durable and desirably has a high fatigue life. In modified embodiments, the biasing spring 507 can comprise other resilient energy storage and release means such as an arched or leaf spring or a V-shaped or angled spring with efficacy, as needed or desired.

The upper mount 504 is configured to preferably include a mounting portion 508 which is configured to secure the vehicle step 500 to a vehicle. In the particular embodiment of the retractable vehicle step 500 shown in FIGS. 13-19, the upper mount 504 is preferably a U-shaped mount which comprises pivotal connections P1 and P2. The pivotal connections P1 and P2 are preferably configured to pivotally connect the arms 506 to the upper mount 504. The upper mount 504 further includes a backing member 510 which is configured to include a plurality of mounting holes 512 which may be sized and shaped to receive fasteners to secure the upper mount 504 to a vehicle.

In some embodiments, biasing member or spring 507 engages a lower portion of upper mount 504 and is held in place at least at the end engaging the upper mount 504. For example, the spring 507 may rest in a cavity 509 formed in upper mount 504 such that an upper portion of spring 507 is enclosed within the cavity 509 and a lower portion of the spring 507 is outside of the cavity 509. The upper portion of the spring 507 is substantially prevented from moving along the X and Y directions as the stepping member 502 is moved from the retracted to the extended positions. The lower portion of the spring 507 outside of the cavity is not directly restrained by the cavity 509 and is thereby allowed to move along the X and Y directions as the stepping member 502 moves from the retracted position to the extended portion. The lower portion of the spring 507 may engage a spring mount 511 to facilitate rotational attachment to the arms 506 as described in greater detail below. Spring mount 511 permits the lower portion of the spring 507 to move with respect to the upper portion of the spring 507 and the arms 506. In some embodiments, the cavity may be configured to enclose the entire spring 507 with an upper-most portion of the cavity configured to restrain an upper portion of the spring 507 from moving while a lower portion of the cavity allows movement of a lower portion of the spring 507. In some embodiments, some or all of the spring 507 may be engaged with a cylinder extending downward from a lower portion of the upper mount 504. The cylinder may function in a similar manner as the cavity described above, preventing a portion of the spring 507 from moving in the X and Y directions while allowing another portion to move in those directions as the stepping member 502 is moved from the retracted to the extended positions.

Although the embodiment of the retractable vehicle step shown in FIGS. 13-19 has been shown with an upper mount 504 which is configured to be mountable to a vehicle, other embodiments of the retractable vehicle step may mount differently to a vehicle. One such example is that the connecting arms 506 of the retractable vehicle step 500 may be directly mounted to a vehicle frame member or members so as to eliminate the need for a separate mounting member 504. Another alternate mounting method may include a sub frame to be mounted to a vehicle frame and the upper mount may then mount to the sub frame. One such subframe may include the upper mount 504 to be made of multiple pieces of which one or more of the pieces may be configured to be an adapter to mount the upper mount to a variety of various frames of different vehicles.

With continued reference to FIGS. 13-19, the retractable vehicle step 500 further includes arms 506. The arms 506 further include a first arm 514 and a second arm 516. The arm 514 is preferably secured by pivotal connection P1 to the upper mount 504 and is secured to a step bracket 518 at pivotal mount P3. The arm 516 is preferably secured to the upper mount 504 at pivotal mount P2 and is secured to the step bracket 518 at pivotal connection P4. The arms 514 and 516 are preferably configured to rotate in a substantially clockwise direction relative to FIGS. 16 and 16d so as to move the stepping member 502 from a retracted position to an extended position. Oppositely, the arms 514 and 516 are configured to move in a substantially counterclockwise direction relative to FIGS. 16 and 16d when the retractable vehicle step moves form an extended to a retracted position. The lengths and mounting positions of the connecting arms 506 are preferably sized and shaped so as to move the stepping member 502 upwards and outboard when the retractable vehicle step 500 is moved from a retracted position to an extended position.

With continued reference to FIGS. 13-19, the connecting arm 514 may further include two recesses 513 and 515 which are configured to receive biasing members (not shown). The biasing members (not shown) are preferably configured to cushion the potential contact between the arms 514 and 516 when the vehicle step 500 in retracted or extended position. The biasing member (not shown) to be located in the recess 513 is configured to cushion the potential contact between the arms 514 and 516 when the vehicle step 500 is in a retracted position and the biasing member (not shown) to be located in the recess 515 is configured to cushion the potential contact between the arms 514 and 516 when the vehicle step 500 is in an extended position. Furthermore, the biasing members may assist the biasing member 507 when the retractable vehicle step 500 is moved from a retracted position shown in FIG. 16 to an extended position shown in FIG. 16d.

With continued reference to FIGS. 13-19, the step bracket 518 is preferably connected to the arms 506 at pivotal mount P4 and pivotal mount P3. The step bracket 518 is further configured to receive a stepping member 502. The stepping member 502 and the step bracket 518 in some embodiments may be secured to one another by fasteners so as to create a connection that may support the weight of a person stepping on the retractable vehicle step 500. With continued reference to FIGS. 13-19 the stepping member 502 in some embodiments is a substantially planar member which is configured to provide sufficient space for a person to place at least one foot on the stepping member 502. Although in FIGS. 13-19 the stepping member 502 is a substantially planar member which may support an entire foot, in some embodiments the retractable vehicle step 500 may include a stepping member 502 which is substantially smaller such as a foot peg or bar. In the particular embodiment shown in FIGS. 13-19, the stepping member 502 is an extruded metallic member with a groove 520 which is configured to facilitate mounting of the stepping member 502 to the step bracket 518. Furthermore the stepping member 502 in some embodiments may include gripping ridges 522 which are configured to provide a substantially slip resistant stepping surface.

With reference to the motion of the retractable vehicle step 500 as shown from FIG. 16 to FIG. 16d, the motion preferably operates as follows. When in the retracted position as shown in FIG. 16, the stepping member 502 is an elevated position so that the stepping member is retracted inboard and at least partially above a lower edge 457 of the body panel 456. In this position, a biasing mechanism 519 including a biasing member 507, assists in biasing the stepping member 502 to the retracted position. Furthermore, in the retracted position shown in FIG. 16, the stepping member is positioned such that a distal tip 503 is preferably located below a rearward end 505 of the stepping member 502. One advantage of the retracted position shown in FIG. 16 is that the stepping member 502 is tilted at such an angle that likelihood of debris build up such as rain, dirt, or mud is reduced. That is downward titling angle of the stepping member 502 assists in reducing debris build up.

In the position shown in FIG. 16a, an actuator (not shown) has moved the connecting arms 506 in a clockwise direction so the stepping member 502 has moved to a lower position relative to the retracted position. In this position the biasing member is still biasing the retractable vehicle step to a retracted position and the actuator (not shown) is continuing to move the stepping member 502 outboard of the body panel 456.

In the position shown in FIG. 16b, the actuator has continued to move the arms 506 in a clockwise direction and the stepping member 502 is at least partially outboard of the body panel 456. In the position shown in FIG. 16b, in some embodiments the biasing member 507 has preferably passed an inflection point, in which the biasing member 507 is typically in its maximum position of compression, and the biasing member 507 now assists the vehicle step 500 towards an extended position.

In the two positions shown in FIG. 16c, the vehicle step 500 is shown in a fully extended position in phantom line and in a position just before being fully extended in solid line. In both positions shown in FIG. 16c, the stepping member 502 is substantially outboard of the body panel 456 so as to provide access to a user for stepping. Also, in the positions show in FIG. 16c, in some embodiments the biasing member 507 is assisting in placing the vehicle step 500 into an extended position. From the position shown in solid line to the final extended position shown in phantom line, the stepping member 502 is moved by the connecting arms 506 in such a way as to move the distal tip 503 of the stepping member 502 downward.

In the position shown in FIG. 16d, the vehicle step 500 is in a self-energized position so that when a person steps on the stepping member 502 the vehicle step does not load in such a way to bias the vehicle step 500 in a retracted position. That is, by stepping on the stepping member 502 the vehicle step will be substantially locked by the arms 506 so as to bias the vehicle step 500 to an open position.

With returning reference to FIGS. 13-19, the retractable vehicle step 500 in some embodiments may be used adjacent to a forward side panel 456 of the vehicle 450. The retractable vehicle step 500 is preferably configured to move to an extended position as shown in FIG. 14 and FIG. 16a so as to provide a stepping surface for a person to step on to gain an elevational advantage to access an item in the bed 458 of the truck 450. That is, the retractable vehicle step 500 is configured to move from a lowered position to a heightened position so that a person may step up and reach into the bed 458 of the truck 450.

With continued reference to FIGS. 13-19, when the retractable vehicle step 500 moves from a retracted position to an extended position the stepping member 502 of the retractable vehicle step 500 is advantageous in that it may allow a person to step onto the stepping member 502 so as to substantially raise one's body to easily access items which may reside in the cargo bed 458 of the truck 450. Furthermore the extended position of the stepping member 502 of the retractable vehicle step 500 allows a user to step up and to place oneself in an advantageous position so as to lift items up and out of the cargo bed 458 of the truck 450. Although the embodiment of the retractable vehicle step 500 shown in FIGS. 13-19 illustrates a retractable vehicle step to be mounted to a forward portion 456 of a vehicle cargo bed 458, the retractable vehicle step 500 may be used in other locations or vehicle applications which may benefit from providing an elevated stepping position to a person. Such other mounting configurations of the retractable vehicle step 500 may include the retractable vehicle step 500 being mounted on a cargo van so as to provide a substantially elevated stepping position for a person to access items on the roof of a cargo van. Another example of a suitable application for the retractable vehicle step 500 is to mount the retractable vehicle step 500 to a utility truck with an elevated utility rack in which a user may benefit from having an elevated stepping position to access items in a raised utility rack.

With reference to the actuation of the retractable vehicle step 500, any suitable actuation method may be used. One such suitable actuation method may be to couple the actuation of the retractable vehicle step 500 to the opening and closing of a vehicle door. In such a configuration, the retractable vehicle step may reside in a retracted position when the vehicle door is closed and may extend to an extended position when the vehicle door is opened. Furthermore, another suitable actuation method may include a switch or lever being mounted to the outside or inside of a vehicle so that a user may actuate a switch when the user desires to extend the retractable vehicle step 500. Such a lever or actuation switch may be mounted to a body panel of a vehicle in the passenger space of a vehicle or in the cargo space of a vehicle. As described in greater detail below with respect to FIGS. 20 and 21, the vehicle step 500 may be configured to be operated by the foot or other appendage of a user.

Figure 20:
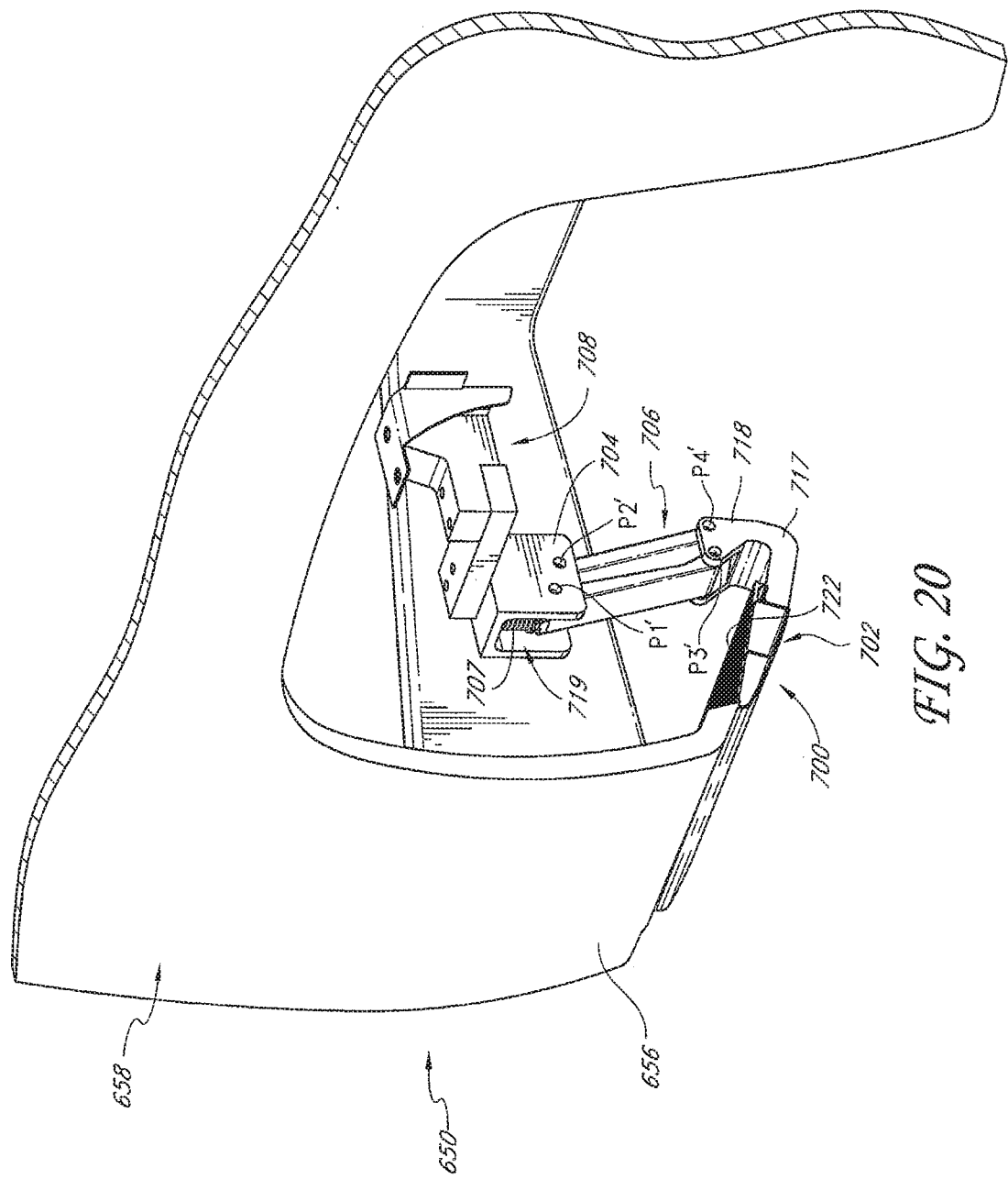
FIG. 20 is a perspective view of another embodiment of a retractable vehicle step mounted to a vehicle in a retracted position.
Figure 21:
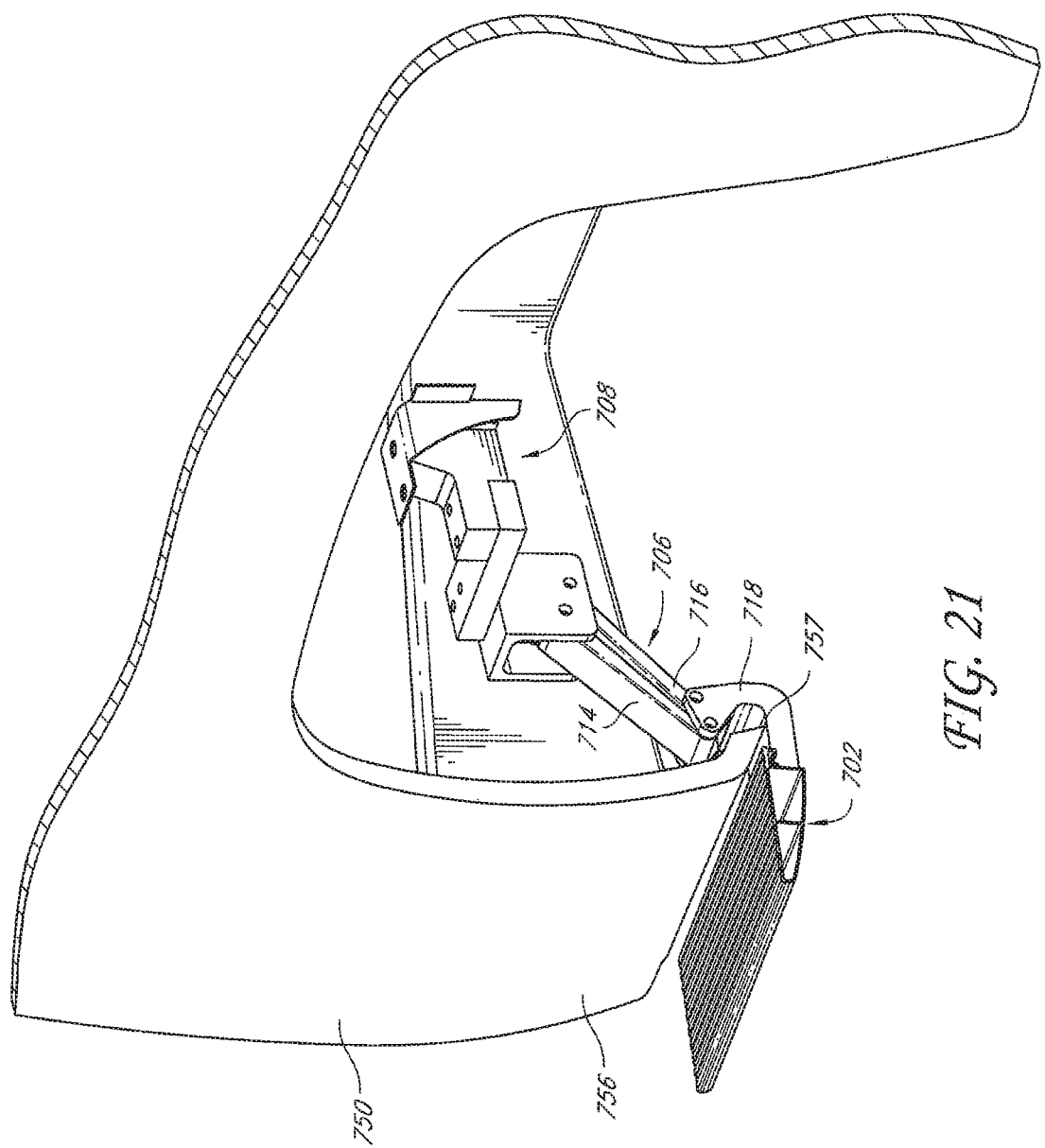
FIG. 21 is a perspective view of the retractable vehicle step of FIG. 20 mounted on a vehicle in an extended position.
Figure 22:
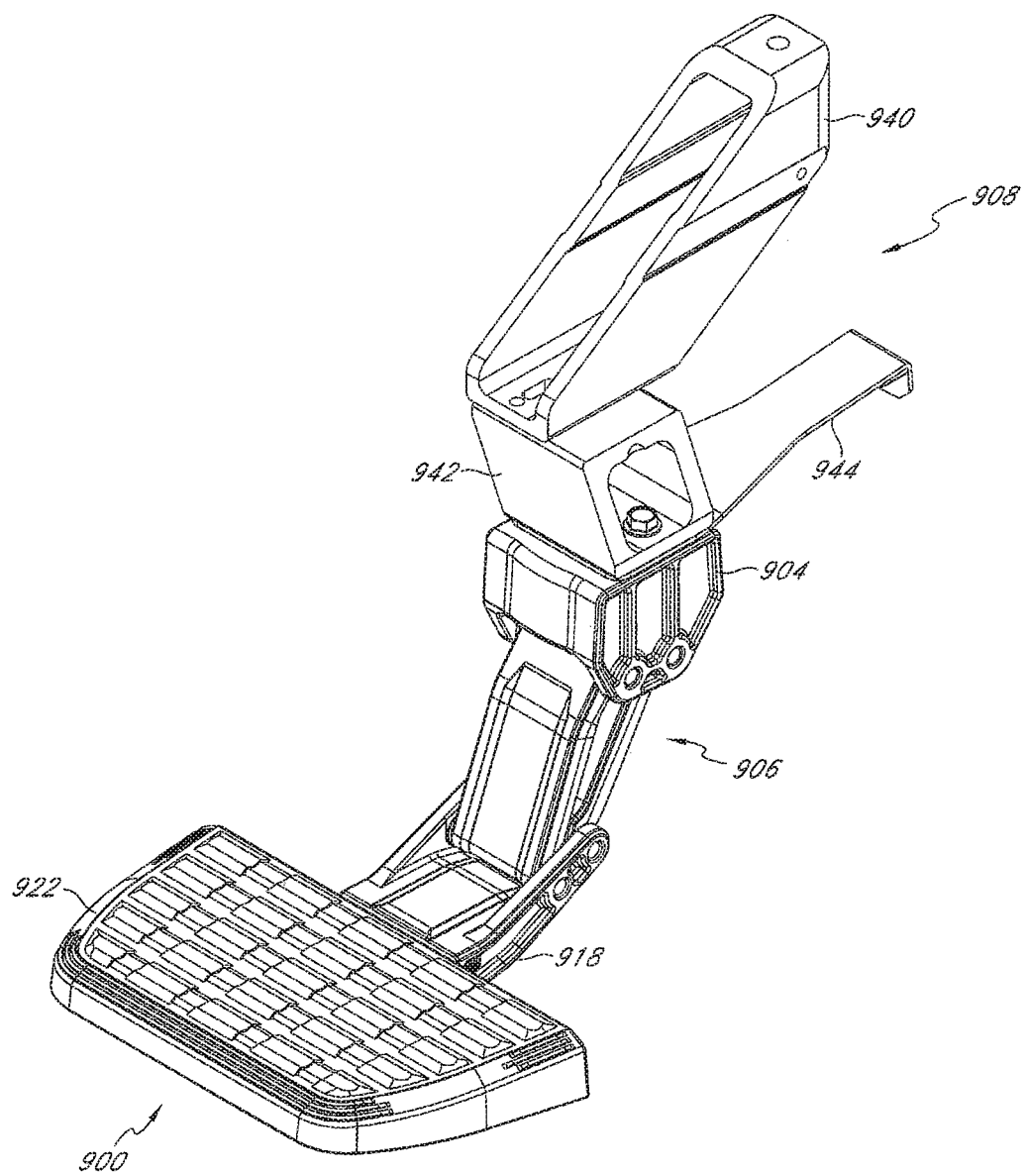
FIG. 22 is a perspective view of another embodiment of a retractable vehicle step illustrating features and advantages in accordance with some embodiments of the invention.

With reference to FIGS. 20 and 21 another embodiment of a retractable vehicle step is illustrated. The retractable vehicle step 700 is configured to be mounted to a vehicle such as the truck 650 shown in FIGS. 20 and 21. The retractable vehicle step 700 is further configured to have a first position and a second position. The first position comprises the vehicle step 700 in a retracted position and the second position comprises the vehicle step 700 to be in an extended position. In the retracted position as shown in FIG. 20, the retractable vehicle step 700 is preferably located in an in-board position relative to the side of the vehicle 650 and, in the extended position, as shown in FIG. 21 the retractable vehicle step 700 is in a substantially outboard position relative to the side of vehicle 650.

In some embodiments, the retractable vehicle step 700 can be positioned so that in a retracted position the vehicle step 700 resides substantially behind a portion of a vehicle body 656. That is the retractable vehicle step 700 is configured to retract behind the vehicle body 656 when in a retracted position so as to be unobtrusive. When the retractable vehicle step 700 transitions from a retracted position as shown in FIG. 20 to an extended position as shown in FIG. 21, in some embodiments the stepping member 702 of the retractable vehicle step 700 moves such that the stepping member 702 moves from a lower position to a raised position.

In some embodiments, the retractable vehicle step 700 preferably includes an upper mount 704, a stepping member 702 and connecting arms 706. Furthermore, the retractable vehicle step 700 preferably includes a biasing mechanism 719 including a biasing member 707, which in some embodiments may be substantially similar to the biasing member 507 of the embodiment of the retractable vehicle step 500 shown in FIG. 16 and described above.

The upper mount 704 is configured to preferably include a mounting portion 708 which is configured to secure the vehicle step 700 to a vehicle. In the particular embodiment of the retractable vehicle step 700 shown in FIGS. 20 and 21, the upper mount 704 is preferably a U-shaped mount which comprises pivotal connections P1' and P2'. The pivotal connections P1' and P2' are preferably configured to pivotally connect the arms 706 to the upper mount 704. In some embodiments, the mounting portion 708 includes multiple components to facilitate the attachment of the vehicle step 700 to one or more different vehicles.

With continued reference to FIGS. 20 and 21, the retractable vehicle step 700 further includes arms 706. The arms 706 further include a first arm 714 and a second arm 716. The arm 714 is preferably secured by pivotal connection P1' to the upper mount 704 and is secured to a step bracket 718 at pivotal mount P3'. The arm 716 is preferably secured to the upper mount 704 at pivotal mount P2' and is secured to the step bracket 718 at pivotal connection P4'. The lengths and mounting positions of the connecting arms 706 are preferably sized and shaped so as to move the stepping member 702 upwards and outboard when the retractable vehicle step 700 is moved from a retracted position to an extended position.

In some embodiments, it is advantageous to configure the vehicle step 700 such that in the retracted position, the stepping surface 722 of the stepping member 702 is at an angle to the horizontal. In the illustrated embodiment, the pivotal mount P1' is positioned slightly above and distal relative to the pivotal mount P2'. The positions of the pivotal mounts P1', P2' combined with the step bracket 718 including angled portion 719 facilitates positioning the stepping member 722 at an angle when in the retracted position.

With continued reference to FIGS. 20 and 21, the step bracket 718 is preferably connected to the arms 706 at pivotal mount P4' and pivotal mount P3'. The step bracket 718 is further configured to receive a stepping member 702. The stepping member 702 and the step bracket 718 in some embodiments may be secured to one another by fasteners so as to create a connection that may support the weight of a person stepping on the retractable vehicle step 700. The stepping member 702 may be configured as described above with respect to the stepping member 502 of FIGS. 13-19. Similarly, the vehicle step 700 may include the features described above with respect to the vehicle step 500, for example, the vehicle step 700 may be self-energized or locked when in the extended position. In addition, it may be operated by the foot or other appendage of a user as described in greater detail below.

In some embodiments, the retractable vehicle step is advantageously configured to permit manually operated retraction and extension. Manual operation may minimize the expense of manufacture and/or installation. In some embodiments, the retractable step is particularly configured to be moved between its retracted and extended positions by foot operation of a user. Advantageously, the vehicle step includes a mechanism to facilitate this operation. For example, in the embodiment shown in FIGS. 20 and 21, the vehicle step 700 includes biasing member 707, for example a spring. In the retracted position, shown in FIG. 8, biasing member 707 biases the stepping member 702 in the retracted position. The biasing member 707 compresses as the stepping member 702 is pulled outwards toward the extended position, thereby providing resistance to the movement outwards. As the stepping member 702 continues to move outwards, the biasing member 707 passes its inflection point and begins to expand rather than compress. The expansion of the biasing member 707 assists the continued extension of the stepping member 702. As described above with respect to the other embodiments, in the extended position, the vehicle step 700 may be self-energized or locked to prevent accidental retraction when weight is applied to the extended step.

To return a self-energized step to the retracted position, the stepping member 702 is partially lifted when in the extended position and pushed toward the vehicle and into the retracted position. The biasing member 707 again resists this movement inwards, for example, by compressing as the stepping member 702 moves inwards. If the vehicle step 700 is not self-energized, step may be moved toward the retracted position simply by pushing the step toward the retracted position. The resistance of the biasing member 707 to this movement helps resist unintended movement of the step 700 toward the retracted position when in use.

When the biasing member 707 passes its inflection point, it assists in the movement inwards and biases the stepping member 702 into the retracted position. In some embodiments, the biasing forces of the biasing member 707 are advantageously configured to allow the vehicle step 700 to be retracted and extended by the foot of a user, rather than a hand operated handle or lever or an automated system. In some embodiments, the vehicle step 700 is moved to the extended position by a user who hooks her foot onto the stepping member 702 and pulls it outwards toward the extended position. In some embodiments, an engagement portion may be provided on the step to facilitate the hooking of the foot. For example, a cavity on the underside of the step may be provided.

In some embodiments, biasing member or spring 707 engages a lower portion of upper mount 704 and is held in place at least at the end engaging the upper mount 704. For example, the spring 707 may rest in a cavity formed in upper mount 704 such that an upper portion of spring 707 is enclosed within the cavity and a lower portion of the spring 707 is outside of the cavity. The upper portion of the spring 707 is substantially prevented from moving along the X and Y directions as the stepping member 702 is moved from the retracted to the extended positions. The lower portion of the spring 707 outside of the cavity is not directly restrained by the cavity and is thereby allowed to move along the X and Y directions as the stepping member 702 moves from the retracted position to the extended portion. The lower portion of the spring 707 may engage a spring mount to facilitate rotational attachment to the arms as described above with respect to the embodiment shown in FIGS. 13-19. In some embodiments, the cavity encloses the entire spring 707 with an upper-most portion configured to restrain an upper portion of the spring 707 from moving while a lower portion of the cavity allows movement of a lower portion of the spring 707. In some embodiments, some or all of the spring 707 may be engaged with a cylinder extending downward from a lower portion of the upper mount 704. The cylinder may function in a similar manner as the cavity described above, preventing a portion of the spring 707 from moving in the X and Y directions while allowing another portion to move in those directions as the stepping member 702 is moved from the retracted to the extended positions.

With reference to FIGS. 22-31, another embodiment of a retractable vehicle step is illustrated. This embodiment may share substantially similar features, structures or components as those disclosed in the other embodiments above. However, the retractable vehicle step of FIGS. 22-31 also comprises different features, structures, or components not described in the embodiments discussed above. The retractable vehicle step 900 is configured to be mounted to a vehicle such as the truck 850 shown in FIG. 30. The retractable vehicle step 900 may be attached at several locations. In some embodiments, the retractable vehicle step 900 may be attached in a position that is forward of the rear wheel. In some embodiments, the retractable vehicle step 900 may be attached in a position that is rearward of the cabin door. The retractable vehicle step 900 is further configured to have a first position and a second position. The first position comprises the retractable vehicle step 900 in a retracted position and the second position comprises the retractable vehicle step 900 to be in an extended position as in the embodiments discussed above.

In some embodiments, the retractable vehicle step 900 can be positioned such that in a retracted position the retractable vehicle step 900 resides substantially behind a portion of a vehicle body 856. That is the retractable vehicle step 900 is configured to retract behind the vehicle body 856 when in a retracted position so as to be unobtrusive. In some embodiments, the retractable vehicle step 900 may be configured to retract into in existing or custom made recess in the body panel, cabin door, or frame of the vehicle.

As discussed in more detail later herein, the retractable vehicle step 900 may be attached to a body, underbody, bed support, chassis, reinforcement rail or frame of the vehicle using, in certain embodiments, already existing connection members (e.g., trailer hitch bolts 19*a*, 19*b*, bumper bolts, other existing apertures, holes, connection members or the like) on the vehicle. However, in some embodiments, the retractable vehicle step 900 may be mounted to a subframe which is then mounted to a vehicle as discussed above. Also, in other embodiments, the retractable vehicle step 900 may be constructed to permit custom installation, as needed or desired to various parts of the vehicle, for example the frame or bumper of a vehicle as discussed above.

In some embodiments, the retractable vehicle step 900 preferably comprises an upper mount 904, a stepping member 902 and connecting arms 906. Furthermore, the retractable vehicle step 900 preferably includes a biasing mechanism 919 including a biasing member 907, which in some embodiments may be substantially similar to the biasing members 26, 307, 507 and 707 in the embodiments of the retractable vehicle steps described above. The stepping member 902 may be configured as described above with respect to the other stepping members also discussed above in the other embodiments. Similarly, the vehicle step 900 may include the features described above with respect to the vehicle steps in the other embodiments, for example, the vehicle step 900 may be self-energized or locked when in the extended position or be operated by the foot or other appendage of a user as discussed above. However, the vehicle step 900, biasing mechanism 919, biasing member 907, and stepping member 902 may also include additional or different features, components, and structures not described above.

In some embodiments, the upper mount 904 is configured to preferably include a mounting portion 908 which is configured to secure the retractable vehicle step 900 to a vehicle. In the particular embodiment of the retractable vehicle step 900 shown in FIG. 28, the upper mount 904 may be a U-shaped, L-shaped, angular or other shaped mount which comprises pivotal connections P1 and P2. The pivotal connections P1 and P2 are preferably configured to pivotally connect the arms 906 to the upper mount 904.

In some embodiments, the mounting portion 908 includes multiple components to facilitate the attachment of the retractable vehicle step 900 to one or more different vehicles or vehicle locations. As shown in FIGS. 22-31, these multiple components may include a first mounting portion 940, a second mounting portion 942, and a third mounting portion 944. These mounting portions may be secured together in various ways. In some embodiments, as shown in FIGS. 22-31, the first mounting portion 940 may be secured to the second mounting portion 942. The first mounting portion 940 may be configured to secure the vehicle step 900 to a vehicle. As described above, in some embodiments, the securing of the retractable vehicle step to the vehicle via the first mounting portion 940 may use already existing connection members on the vehicle. The second mounting portion 942 may be secured to a surface of the third mounting portion 944. The third mounting portion 944 may be secured to the upper mount 904 and to a vehicle location different from that of the first mounting portion 940, but also using already existing connection members. FIG. 31 shows one embodiment of the retractable vehicle step 900 with mounting portions securing it to a vehicle location using already existing connection members 858. In other embodiments, there may be only one mounting portion, two mounting portions or more than three mounting portions. In some embodiments, the third mounting portion 944 may be mounted directly to the first mounting portion 940. The mounting portions allow the retractable vehicle step 900 to be configured into different arrangements for attaching the step 900 to one or more different vehicles or vehicle locations. In some embodiments, the second mounting portion 942 may be configured to be attached to the first mounting portion 940 in at least first and second arrangements. In some embodiments, the third mounting portion 944 is attachable to a vehicle location different from that of the first mounting portion 940 and may provide support for the retractable vehicle step 900.

Figure 29B:
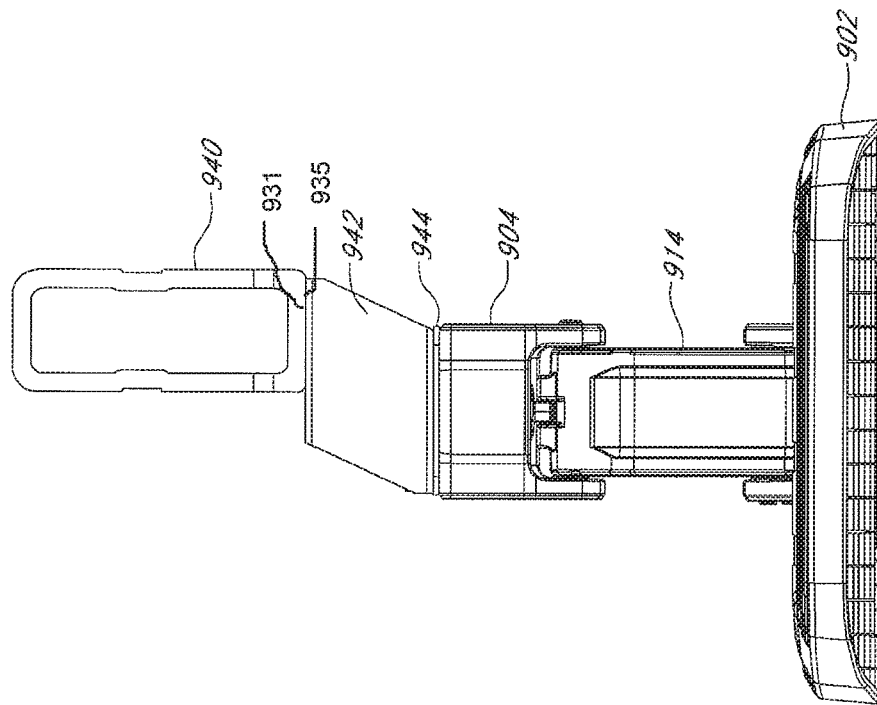
FIG. 29b is a a front view of the retractable vehicle step of FIG. 22 in a second arrangement illustrating features and advantages in accordance with some embodiments of the invention.
Figure 29A:
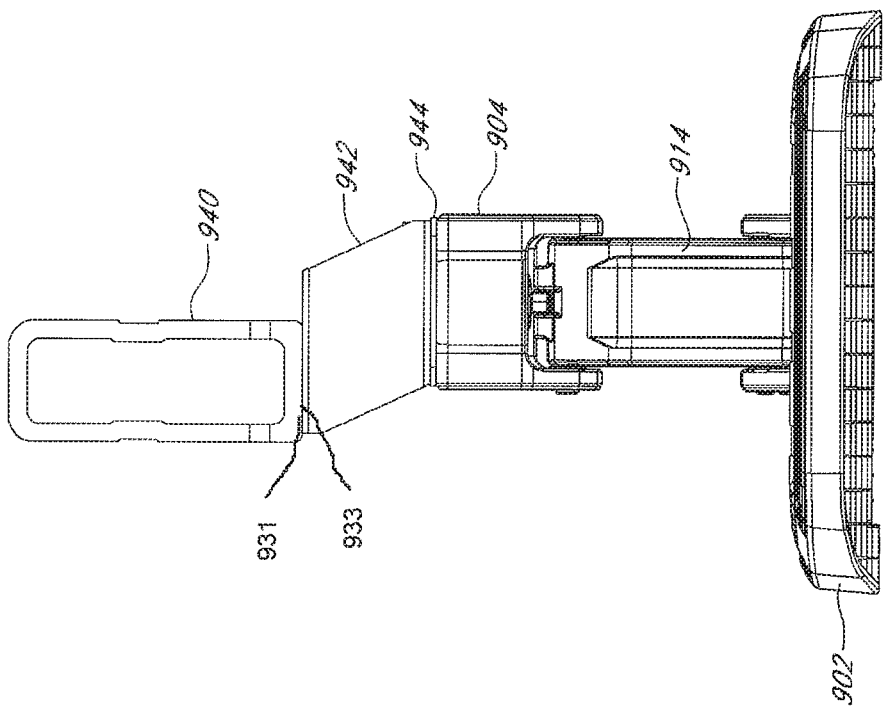
FIG. 29a is a front view of the retractable vehicle step of FIG. 22 in a first arrangement illustrating features and advantages in accordance with some embodiments of the invention.
Figure 32:
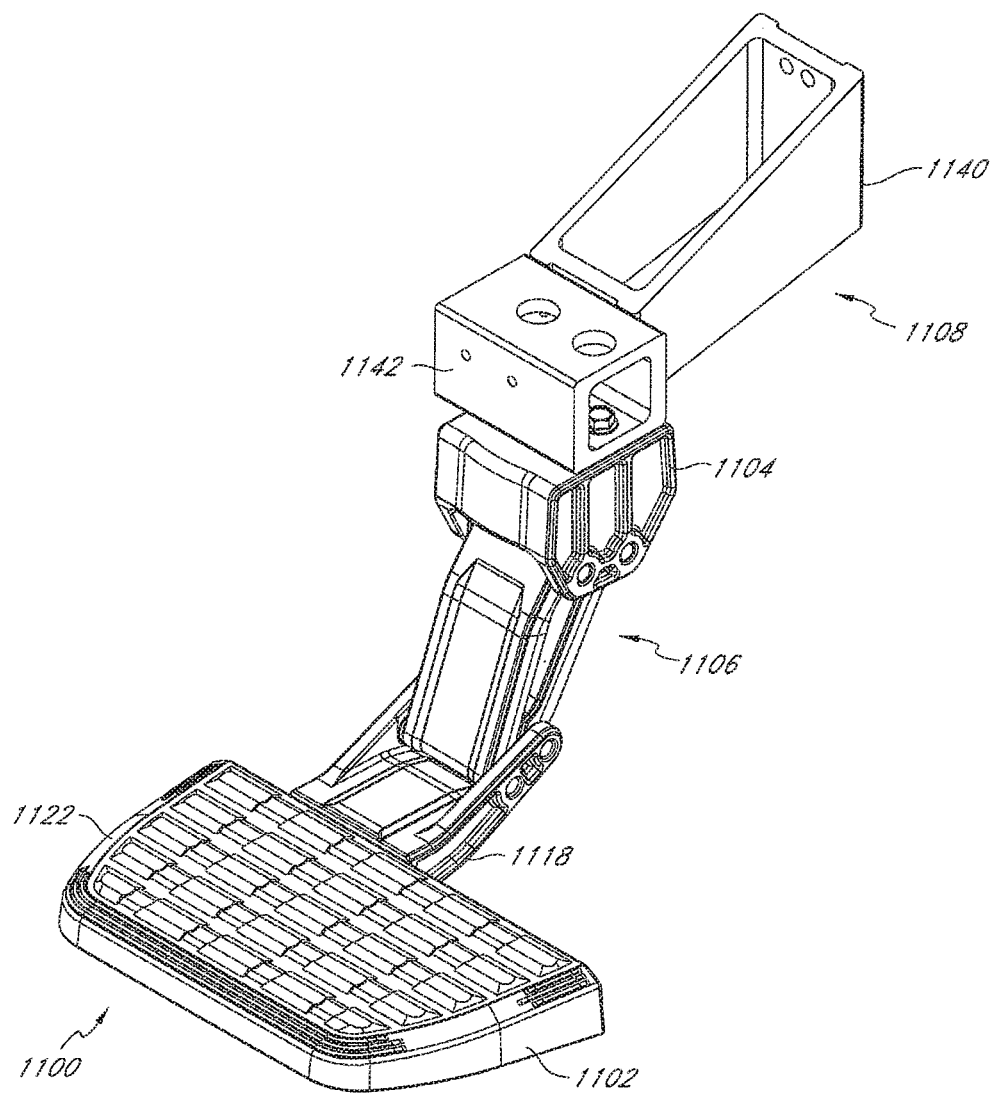
FIG. 32 is a perspective view of another embodiment of a retractable vehicle step illustrating features and advantages in accordance with some embodiments of the invention.

In some embodiments, as shown in FIGS. 29*a* and 29*b*, the retractable vehicle step 900 may be configured into at least a first and a second arrangement. In some embodiments, the first arrangement is attachable to a first location on a vehicle and the second arrangement is attachable to a second location on a vehicle that is on the opposite side of the first location respectively. For example, if there were two retractable vehicle steps with one attached at the same location of the vehicle but on opposite sides, the arrangements of these retractable vehicle steps would be mirror images of each other as shown in FIGS. 29*a* and 29*b*. In some embodiments, the retractable vehicle step may be configured into more than two different arrangements using the same components but different configurations.

As shown in FIGS. 22-31, in some embodiments, the mounting components of the mounting portion 908 and the upper mount 904 may be attached to each other using various types of fasteners or screws and corresponding holes and apertures substantially similar to embodiments described above. In some embodiments, upper mount 904 includes two apertures 974, 976. Third mounting portion 944 may comprise a proximal and a distal end. Third mounting portion 944 includes corresponding apertures 978 and 980 on its proximal end for alignment with the apertures of the upper mount 904 and second mounting portion 942 and an aperture 981 on its distal end to allow alignment and attachment with an already existing connection member of the vehicle. Apertures 978 and 980 of the third mounting portion 944 may be shaped such that they are oblong or elongated longitudinally to allow the third mounting portion 944 to slide distally or proximally toward or away from the vehicle so that in various positions, the apertures of the third mounting portion 944 may still be aligned with the apertures of the upper mount 904 and second or first mounting portions. This allows its apertures 978 and 980 at various vehicle locations to be positioned so that they are aligned with the corresponding apertures 984 and 982 of the second mounting portion 942 and the apertures 974 and 976 of the upper mount 904, while the aperture 981 of the third mounting portion 944 may be aligned with the already existing connection members of the vehicle. Thus, the mounting portions may be secured together and the third mounting portion secured to the vehicle at various vehicle locations. Second mounting portion 942 includes apertures 982 and 984. Screws or fasteners 990 and 998 may be used to secure the second mounting portion 942, third mounting portion 944 and upper mount 904 together via their aligned apertures. Various screws or fasteners may also be used to secure the mounting portions to already existing connection members of the vehicle. Second mounting portion 942 is generally rectangular shaped but may be square, round or angular.

Figure 24:
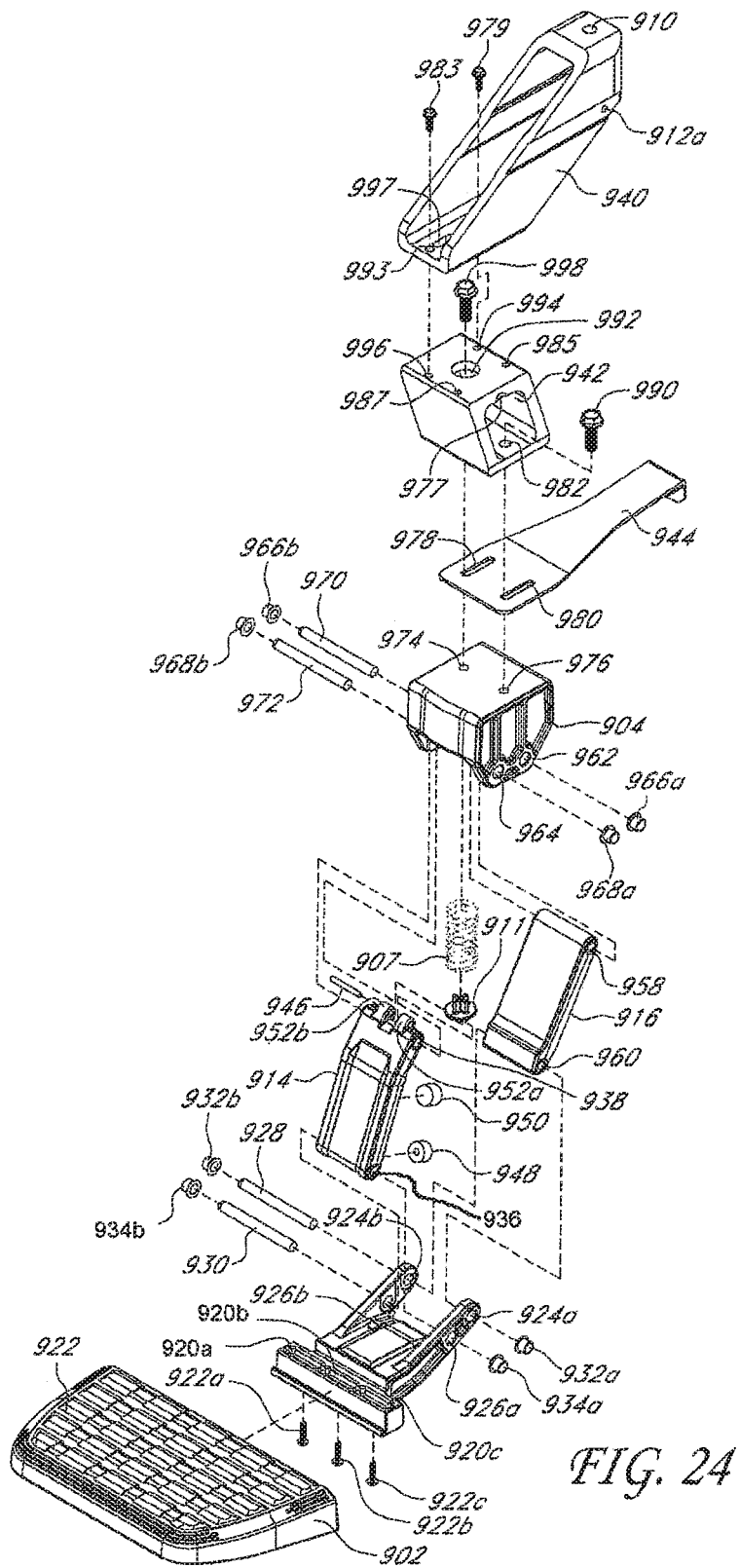
FIG. 24 is an exploded perspective view of the retractable vehicle step of FIG. 22 illustrating features and advantages in accordance with some embodiments of the invention.
Figure 25:
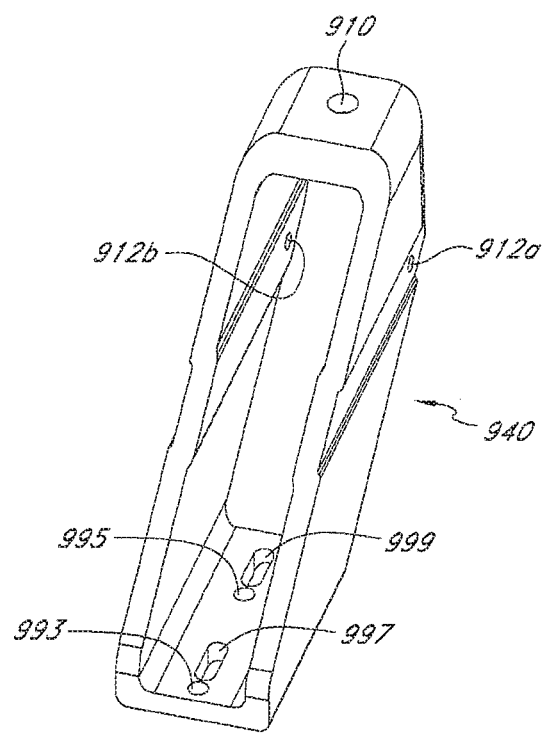
FIG. 25 is a perspective view of a first mounting component of FIG. 22 illustrating features and advantages in accordance with some embodiments of the invention.
Figure 26:
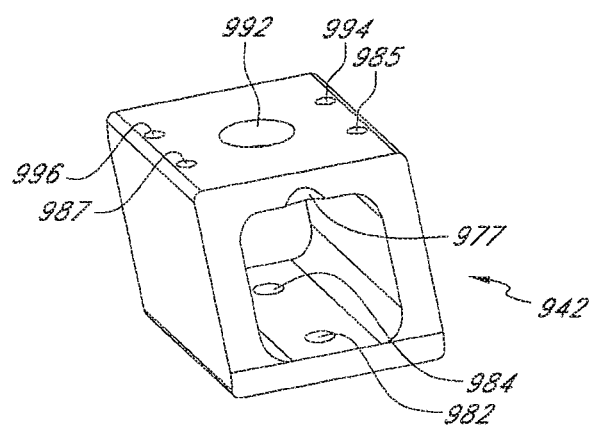
FIG. 26 is a perspective view of a second mounting component of FIG. 22 illustrating features and advantages in accordance with some embodiments of the invention.
Figure 27:
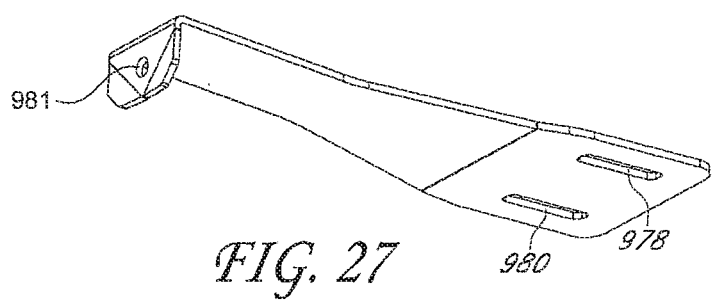
FIG. 27 is a perspective view of a third mounting component of FIG. 22 illustrating features and advantages in accordance with some embodiments of the invention.

In some embodiments, second mounting portion 942 also includes a larger aperture 992 on a top surface to provide access, depending on the arrangement of the retractable vehicle step, for either screw 998 or 990 into the second mounting portion 942 to secure the second mounting portion 942 to the third mounting portion 944 and the upper mount 904. Second mounting portion also includes an aperture or passage through its main body that allows screw 990 or 998 access to be received in aperture 982 or 984. A cut-away 977 at either side of the top of the passage further facilitates access for the top or heads of screws 990 or 998 to be received in apertures 982 or 984, depending on the arrangement of the retractable vehicle step. Additionally, second mounting portion includes two other pairs of apertures 996, 994 and 987, 985 on the top surface to allow it to be secured to the first mounting portion 940 in at least two different arrangements. As shown in FIGS. 24 and 25, first mounting portion 940 is angularly shaped and includes round apertures 993 and 995 that may be aligned with either pair of apertures 996, 994 or 987, 985 depending on what arrangement is selected. Screws or fasteners 983 and 979 may be used to secure the two mounting portions together via their aligned apertures. First mounting portion 940 also may include additional elongated longitudinally or oblong apertures 997 and 999 to further facilitate the connection of the first mounting portion 940 with the second mounting portion 942. The first mounting portion 940 may slide away or towards the vehicle such that the apertures 997 and 999 may still be aligned with either apertures 996, 994 or 987, 985 depending on the arrangement while apertures 912a, 912b and 910 may be aligned with already existing connection members of the vehicle. Therefore, the first mounting portion 940 may be positioned such that it is connectable to both the second mounting portion 942 and the vehicle using already existing connection members, for different vehicles and vehicle locations in at least two different arrangements. The at least two different arrangements allow a manufactures, retailer, wholesaler or other seller to use only one SKU for the at least two different potential configurations or arrangements of the retractable vehicle step because all the components of each arrangement are the same.

Various configurations and arrangements of the retractable vehicle step are possible depending on the location of the apertures of the mounting portions and the orientation of mating surface portions of the mounting portions. As shown in FIGS. 29a and 29b, in some embodiments, in a first arrangement, first mounting portion 940 has a first mating surface portion 931 which mates with a second mating surface portion 933 of second mounting portion 942 when the two mounting portions are secured together at apertures 993, 995 and 996, 994. In a second arrangement, the first mating surface portion 931 of first mounting portion 940 mates with a third mating surface portion 935 of second mounting portion 942, when the two mounting portions are secured together at apertures 993, 995 and 987, 985. Other arrangements and configurations are possible depending on where the mounting portions are secured together and the location of the apertures on the mounting portions. In some embodiments, second mounting portion 942 may be rotated 180 degrees and result in at least a third and fourth arrangement. In the third arrangement, the first mating surface portion 931 mates with the second mating surface portion 933 of second mounting portion 942 when the two mounting portions are secured together at apertures 993, 995 and 996, 994 as in the first arrangement but with the second mounting portion 942 rotated 180 degrees. In the fourth arrangement, the first mating surface portion 931 mates with the third mating surface portion 935 of second mounting portion 942 when the two mounting portions are secured together at apertures 993, 995 and 987, 985 as in the second arrangement but with the second mounting portion 942 rotated 180 degrees. In some embodiments, other arrangements may be possible depending on the orientation that the first mounting portion 940 is secured to the pairs of apertures in the second mounting portion 942. For example, the first mounting portion may also be rotated 180 degrees and be secured to either pairs of apertures 996, 994 or 987, 985. In some embodiments, the first mounting portion may be rotated 90 degrees in either direction and be secured to either pairs of apertures 996, 987 or 994, 985. A different amount or number of apertures on the mounting portions may be positioned or located on different surfaces (i.e. side, back, front, bottom, top) in different orientations on the mounting portions to allow the mounting portions to be secured together in various configurations thereby allowing the retractable vehicle step to be configured into many different arrangements using the same components.

In some embodiments, as shown in FIG. 24, pins or axles 930, 928 may secure the step bracket 918 to lower portions of arms 914 and 916. The pins or axles may be received within corresponding through holes or apertures 926a, 926b, 936 and 924a, 924b, 960 in the step bracket 918 and lower portions of the arms 914 and 916 respectively. End caps or the like 932a, 932b, 934a and 934b may be used to secure the pins in their respective locations by fitting over the ends of the pins. The upper portions of arms 914, 916 are similarly attached to the upper mount 904. Pins 972 and 970 received in aligned through holes or apertures 938, 964 and 958, 962 of the upper portions of the arms 914, 916 and the lower portion of the upper mount 904 and are respectively secured in their location with end caps 968a, 968b, 966a, 966b.

Figure 28:
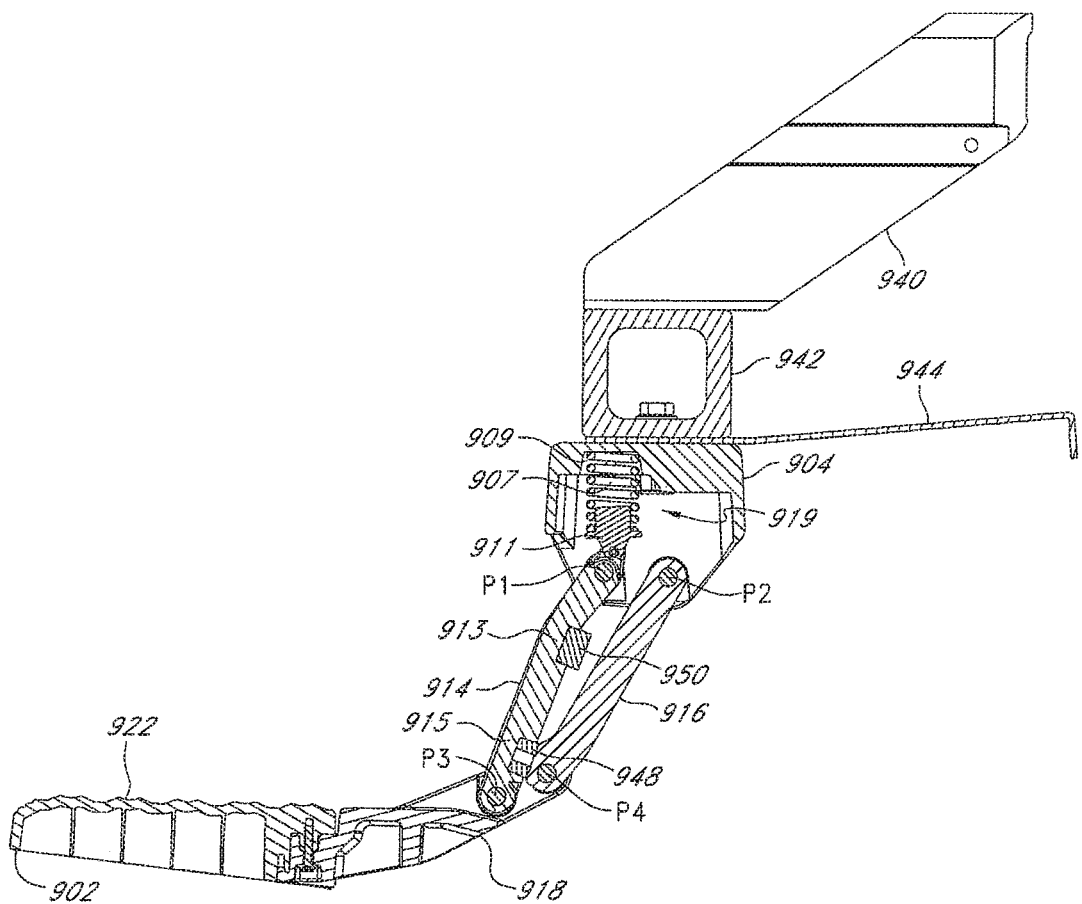
FIG. 28 is a side view of the retractable vehicle step of FIG. 22 illustrating features and advantages in accordance with some embodiments of the invention.

With continued reference to FIGS. 22-31, in some embodiments, the connecting arm 914 may further include two recesses 915 and 913 which are configured to receive biasing members 948 and 950. As shown in FIG. 28 the biasing members 948 and 950 are preferably configured to cushion the potential contact between the arms 914 and 916 when the vehicle step 900 in retracted or extended position. The biasing member 950 to be located in the recess 913 is configured to cushion the potential contact between the arms 914 and 916 when the vehicle step 900 is in a retracted position and the biasing member 948 to be located in the recess 915 is configured to cushion the potential contact between the arms 914 and 916 when the vehicle step 900 is in an extended position. Furthermore, the biasing members may assist the biasing member 907 when the retractable vehicle step 900 is moved from a retracted position to an extended position.

In some embodiments, with continued reference to FIG. 28, a step bracket 918 is preferably connected to the arms 906 at pivotal mount P4 and pivotal mount P3. The step bracket 918 is further configured to receive a stepping member 902. The stepping member 902 and the step bracket 918 in some embodiments may be secured to one another by fasteners so as to create a connection that may support the weight of a person stepping on the retractable vehicle step 900.

Figure 23:
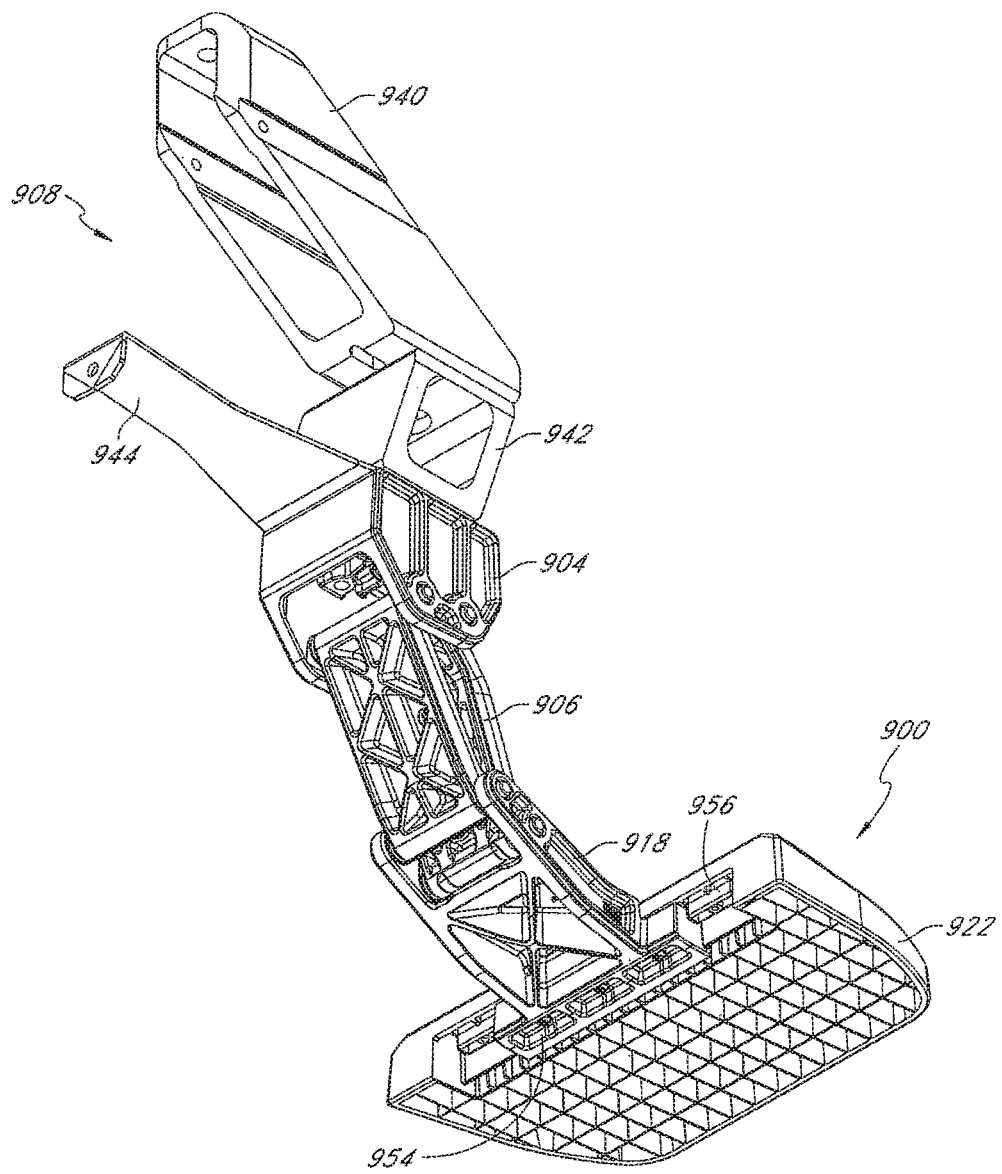
FIG. 23 is a bottom perspective view of the retractable vehicle step of FIG. 22 illustrating features and advantages in accordance with some embodiments of the invention.
Figure 33:
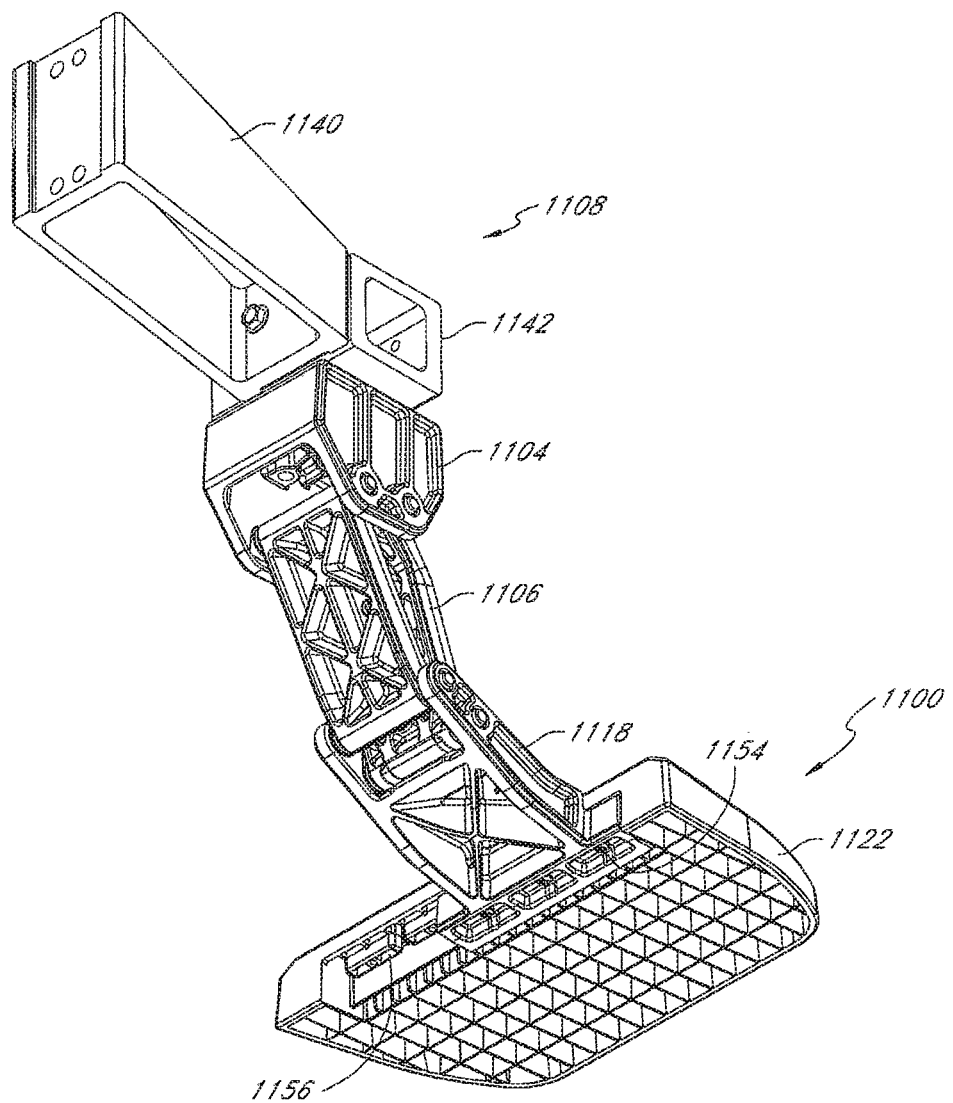
FIG. 33 is a bottom perspective of the retractable vehicle step of FIG. 32 illustrating features and advantages in accordance with some embodiments of the invention.
Figure 34:
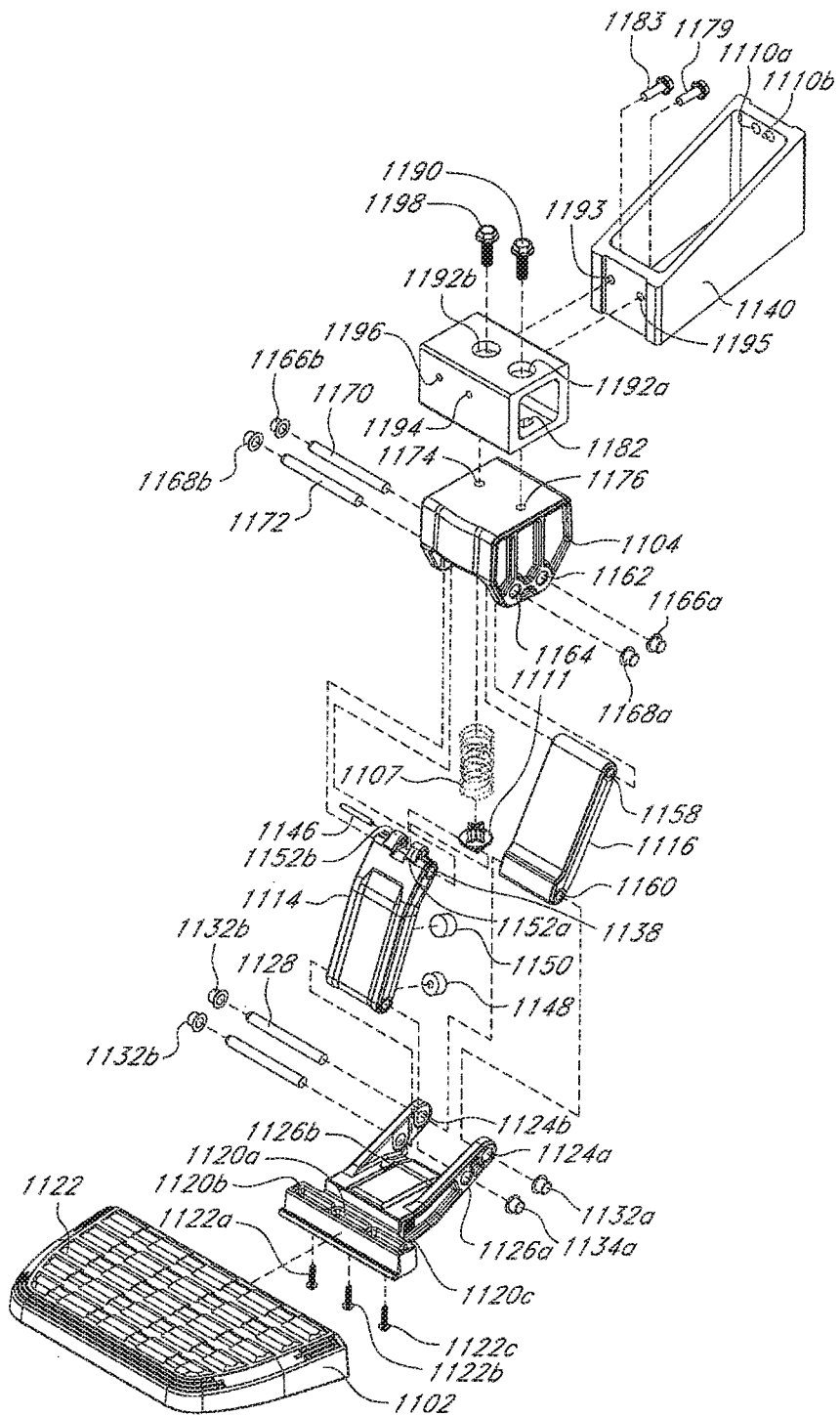
FIG. 34 is a perspective is an exploded perspective view of the retractable vehicle step of FIG. 32 illustrating features and advantages in accordance with some embodiments of the invention.
Figure 35:
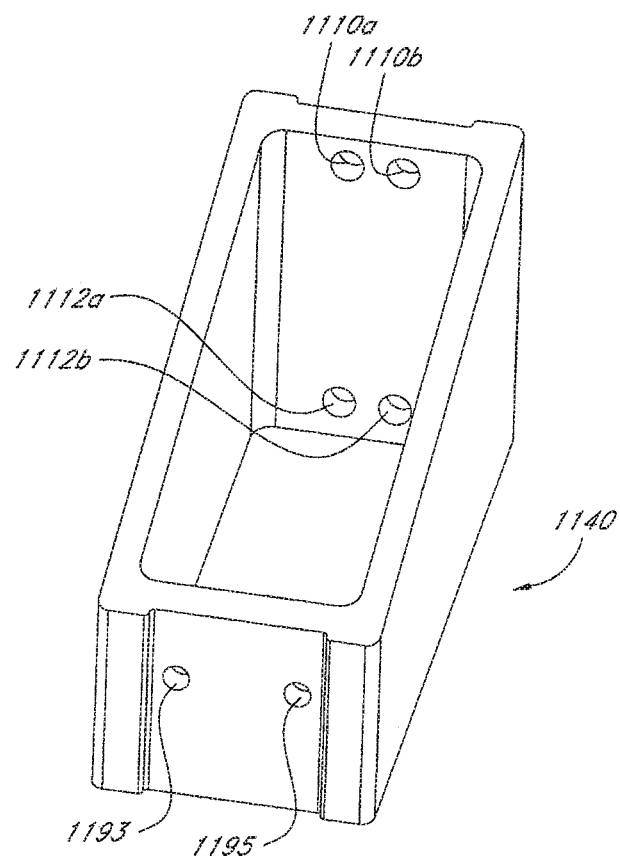
FIG. 35 is a perspective view of a first mounting component of FIG. 32 illustrating features and advantages in accordance with some embodiments of the invention.
Figure 36:
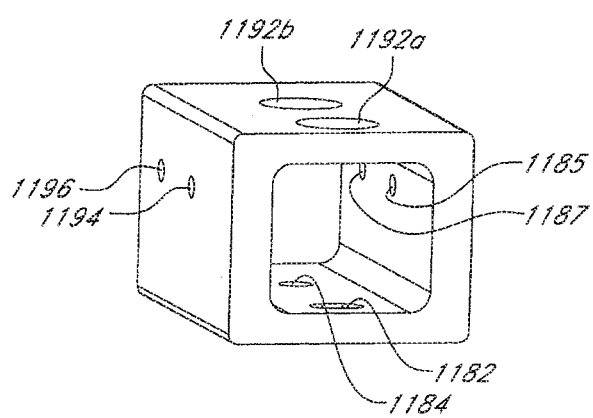
FIG. 36 is a perspective view of a second mounting component of FIG. 32 illustrating features and advantages in accordance with some embodiments of the invention.
Figure 37:
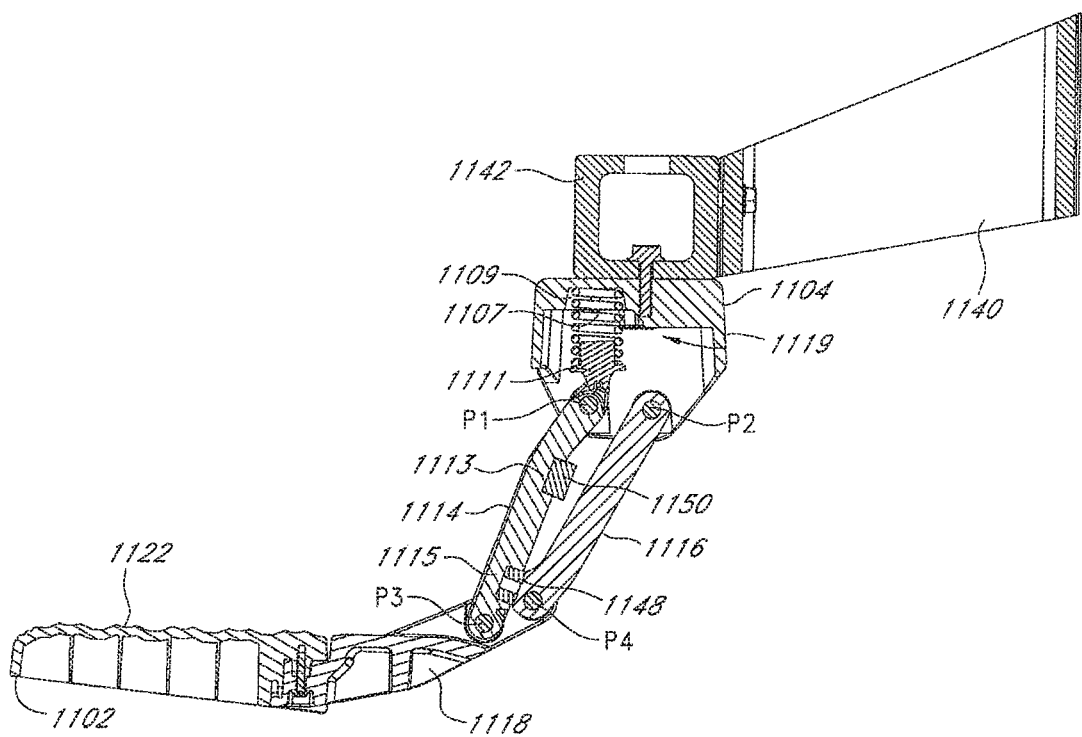
FIG. 37 is a side view of the retractable vehicle step of FIG. 32 illustrating features and advantages in accordance with some embodiments of the invention.

In some embodiments as shown in FIG. 24 and FIG. 23, the step bracket 918 has connector elements 954, that correspond to connector elements 956 of the stepping member 902 and may be engaged with each other. In FIG. 23 and FIG. 24 the connector elements 954 comprise three step bracket connector elements 920a-920c. Stepping member 902 has five corresponding connector elements 956 that are adjacent to one another in a series. The three step bracket connector elements 920a-920c can therefore fit up with three out of the five corresponding connector elements 956 of the stepping member 902 in three different arrangements. The three step bracket connector elements 920a-920c can fit up with the left three, middle three, or right three of the five connector elements 956 of the step bracket 918. Two of the possible arrangements are shown in FIG. 23 and FIG. 33. Screws 922a-922c or other fasteners may be used to secure the connector elements of the stepping member 902 and bracket 918 together. In some embodiments, the stepping bracket 918 may include more than three or less than three connector elements in a series, adjacent to one another or spaced apart. Similarly, the stepping member 902 may also include a different number of connector elements in a series, adjacent to each other or spaced apart. Various shapes and sizes may be used for the connector elements.

In some embodiments, biasing member or spring 907 engages a lower portion of upper mount 904 and is held in place at least at the end engaging the upper mount 904. For example, the spring 907 may rest in a cavity or recess 909 formed in upper mount 904 such that an upper portion of spring 907 is enclosed within the cavity 909 and a lower portion of the spring 907 is outside of the cavity 909 as shown in FIG. 28. The upper portion of the spring 907 is substantially prevented from moving along the X and Y directions as the stepping member 902 is moved from the retracted to the extended positions. The lower portion of the spring 907 outside of the cavity 909 is not directly restrained by the cavity 909 and is thereby allowed to move along the X and Y directions as the stepping member 902 moves from the retracted position to the extended portion. As shown in FIG. 28, the lower portion of the spring 907 may engage a spring mount 911 to facilitate rotational attachment to the arms 906 as described above with respect to the embodiment shown in FIGS. 13-19. The spring mount 911 may engage a pin or axle 946 that is received in the apertures 952a and 952b of arm 914. In some embodiments, the cavity 909 encloses the entire spring 907 with an upper-most portion configured to restrain an upper portion of the spring 907 from moving while a lower portion of the cavity allows movement of a lower portion of the spring 907. In some embodiments, some or all of the spring 907 may be engaged with a cylinder extending downward from a lower portion of the upper mount 904. The cylinder may function in a similar manner as the cavity described above, preventing a portion of the spring 907 from moving in the X and Y directions while allowing another portion to move in those directions as the stepping member 902 is moved from the retracted to the extended positions.

Figure 38A:
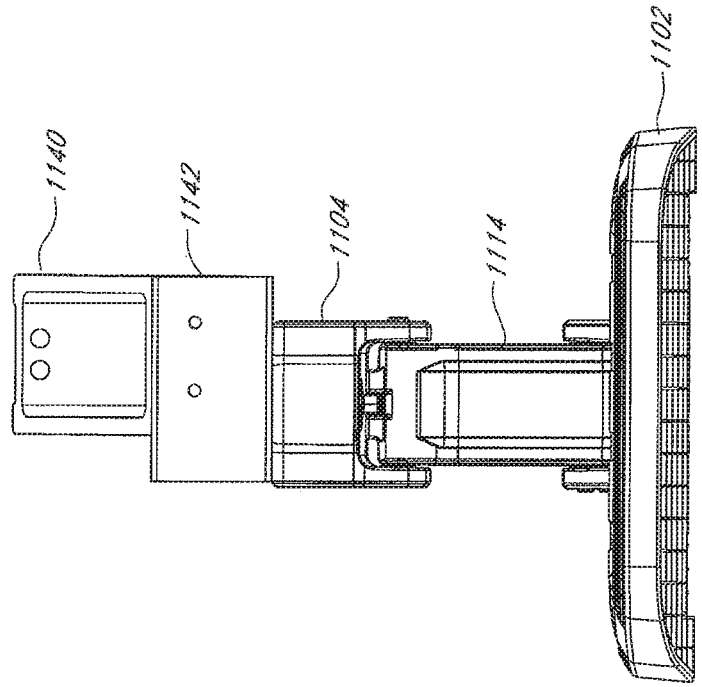
FIG. 38a is a front view of the retractable vehicle step of FIG. 32 in a first arrangement illustrating features and advantages in accordance with some embodiments of the invention.
Figure 38B:
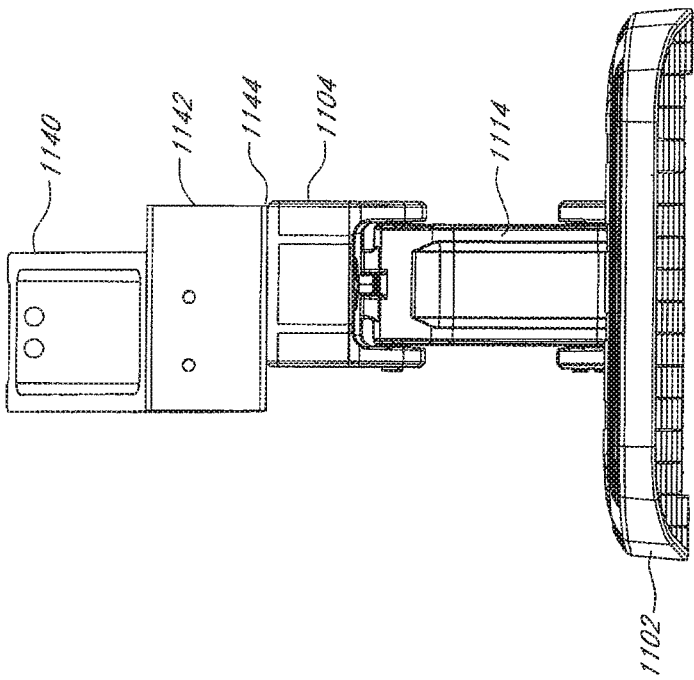
FIG. 38b is a front view of the retractable vehicle step of FIG. 32 in a second arrangement illustrating features and advantages in accordance with some embodiments of the invention.

With reference to FIGS. 32-38b another embodiment of a retractable vehicle step is illustrated. This embodiment of a retractable vehicle step 1100 comprises substantially similar basic features, components, and structures as those described above in the other embodiments and also functions in a substantially similar way. For example, the retractable vehicle step 1100 may comprise a stepping member 1102, stepping surface 1122, arms 1114 and 1116, an upper mount 1104, a mounting portion 1108, a biasing member 1107, and various screw, pins, fasteners, nuts, bolts, end caps and connection members for securing the components of the retractable vehicle step 1100 together and to securely mount it to a vehicle in various locations. In some embodiments, this retractable vehicle step 1100 may also be configured into at least two arrangements (as shown in FIGS. 38a and 38b). In some embodiments, the retractable vehicle step 1100 may be mounted to a vehicle using already existing connection members.

In some embodiments, with reference to FIGS. 32-38b, the retractable vehicle step 1100 may comprise a mounting portion 1108 which includes a first mounting portion 1140 and a second mounting portion 1142. The first mounting portion 1140 includes mounting apertures or holes 1110a, 1110b, 1112a, 1112b on a back side to allow for mounting to a vehicle. They may be mounted to already existing connection members and secured with fasteners. On the front side, first mounting portion 1140 may include two apertures or holes 1193, 1195 that may be aligned with either corresponding pairs of apertures 1194,1196 or 1187,1185 of second mounting portion 1142 such that the two portions may be secured together with fasteners in at least two different arrangements depending on which apertures they are secured to as shown in FIGS. 38a,38b. In order to be configured into the second arrangement of the retractable vehicle step as shown in FIG. 38b, second mounting portion 1142 may be rotated 180 degrees such that apertures 1194, 1196 are facing towards the vehicle and may be aligned with the apertures 1193, 1195 of the first mounting portion 1140. As discussed above, this allows a manufactures, retailer, wholesaler or other seller to use only one SKU for the at least two different potential configurations or arrangements of the retractable vehicle step. In some embodiments, pairs of apertures 1196,1194 and 1187,1185 of second mounting portion 1142 are on opposite sides of the rectangular shaped mounting portion. As discussed in the embodiments above, apertures may be located on different surfaces, i.e. on a top surface of the mounting portion as in retractable vehicle step 902 to provide different configurations and arrangements. These apertures may be located in various locations (e.g. on top, bottom, front, back, or side surfaces) on the mounting portions to provide various possible configurations and arrangements for the retractable vehicle step using the same components. Screws, nut and bolts, or other fasteners 1183, 1179 may be received in the aligned apertures of the mounting portions to secure the two portions together.

As in the embodiments discussed above, the second mounting portion 1142 may be secured to the upper mount 1104 by aligning apertures 1182, 1184 of the second mounting portion 1142 with the pair of apertures 1176, 1174 of the upper mount 1104. Screws or other fasteners 1190, 1198 received in the aligned apertures may secure the second mounting portion 1142 to the upper mount 1104. Larger apertures 1192a,1192b in the top surface of the second mounting portion 1142 allow access for the screws 1190, 1198 to be received in the aligned apertures of the upper mount and the second mounting portion.

The upper mount 1104 may be secured or attached to the arms 1106 in a substantially similar way as the embodiments discussed above. Similarly, the arms 1106 may be secured to the step bracket 1118 and the step bracket 1118 secured to the stepping member 1102 in substantially the same way as discussed above.

As discussed, the retractable vehicle step may be securely mounted to a vehicle using already existing connection members. However, in some embodiments, the retractable vehicle step 1100 may be mounted to a subframe which is then mounted to a vehicle as discussed above. Also, in other embodiments, the retractable vehicle step 1100 may be constructed to permit custom installation, as needed or desired to various parts of the vehicle, for example the frame or bumper of a vehicle as discussed above.

The methods which are described and illustrated herein are not limited to the sequence of acts described, nor are they necessarily limited to the practice of all of the acts set forth. Other sequences of acts, or less than all of the acts, or simultaneous occurrence of the acts, may be utilized in practicing embodiments of the invention.

Accordingly, it will be appreciated that there is disclosed a retractable step or step assist designed to be mounted to a vehicle. The step assist desirably includes a first support arm, a second support arm and a step member. The step member desirably includes an upper stepping surface defining a support plane, the first support arm and the second support arm connected to the step member so that the first support arm and the second support arm are pivotable with respect to the step member about a third axis and a fourth axis, respectively. The first support arm and the second support arm allow the step member to move between a retracted position and a deployed position outward from the retracted position.

In some embodiments, when the step member is in the deployed position, the arms and step member act to self-energize the step assist. In some embodiments, the step assist is not self-energized when in the retracted position, but may be held in place by a biasing member or cam assembly.

In some embodiments, the step member is angled with respect to the horizontal when in a retracted position. In some embodiments, the step member is angled downward in an outboard direction when the step assist is in a retracted position. In some embodiments, the outboard end of the stepping surface may be vertically spaced no more than approximately ½ inch, no more than approximately 1 inch, no more than approximately 2 inches, no more than approximately 3 inches, or no more than approximately 4 inches below the bottom edge of the vehicle bumper when the step assist is in a retracted position. In some embodiments, the bottom of the stepping member may be vertically spaced no more than approximately ½ inch, no more than approximately 1 inch, no more than approximately 2 inches, no more than approximately 3 inches, or no more than approximately 4 inches below the bumper of the vehicle when in a retracted position. In some embodiments, the top of the stepping surface may be vertically spaced at least approximately ½ inch, at least approximately 1 inch, at least approximately 2 inches, at least approximately 3 inches, or at least approximately 4 inches below the bumper of the vehicle when in a deployed position. In some embodiments, the stepping member will extend no more than approximately 12 inches, no more than approximately 8 inches, or no more than approximately 6 inches below the bumper. In some embodiments, the arms of the step assist contact each other when the step assist is in a deployed position. In some embodiments, a biasing member serves to hold the step assist in a retracted position and upon movement of the step assist from the retracted position, the biasing member helps to deploy the step assist.

Unless otherwise stated, it is to be understood that any range of values disclosed, taught or suggested herein comprises all values and sub-ranges therebetween. For example, a range from 1 to 100 will comprise all integer and non-integer numerical values between 1 and 100; and all sub-ranges between 1 and 100 including all integer and non-integer numerical values of the range limits and numbers therebetween.

From the foregoing description, it will be appreciated that a novel approach for providing and using a retractable vehicle step assist with enhanced clearance features has been disclosed. While the components, techniques and aspects of the invention have been described with a certain degree of particularity, it is manifest that many changes may be made in the specific designs, constructions and methodology herein above described without departing from the spirit and scope of this disclosure.

While a number of preferred embodiments of the invention and variations thereof have been described in detail, other modifications and methods of using, and other vehicular, automobile and/or mechanical applications for the same will be apparent to those of skill in the art. Accordingly, it should be understood that various applications, modifications, and substitutions may be made of equivalents.

Various modifications and applications of the invention may occur to those who are skilled in the art, without departing from the true spirit or scope of the invention. It should be understood that the invention is not limited to the embodiments set forth herein for purposes of exemplification.

What is claimed is:

1. A retractable vehicle step, comprising:
a mounting portion configured to mount to a vehicle;
a stepping member comprising a stepping surface; and
a linkage comprising at least one arm, the linkage being configured to move the stepping member with respect to the mounting portion between a retracted position and a deployed position,
wherein the mounting portion comprises:
a first mounting component configured to attach to a first portion of the vehicle, the first portion of the vehicle comprising a downward facing portion of an underside of the vehicle; and
a second mounting component removably attachable to the first mounting component, the second mounting component configured to attach to a second portion of the vehicle, the second portion of the vehicle comprising a lateral facing portion of the underside of the vehicle.

2. The retractable vehicle step of claim 1, wherein the second portion of the vehicle is below the first portion of the vehicle.

3. The retractable vehicle step of claim 1, wherein the second mounting component comprises a proximal end and a distal end, the proximal end being rigidly mountable to a lower portion of the first mounting component, and the distal end extending in an inboard direction for attachment to the second portion of the vehicle.

4. The retractable vehicle step of claim 3, wherein the mounting portion further comprises a third mounting component, and the proximal end of the second mounting component is rigidly mountable to the lower portion of the first mounting component through the third mounting component.

5. The retractable vehicle step of claim 3, wherein the proximal end of the second mounting component is rigidly mountable to the lower portion of the first mounting component in at least two positions to adjust a distance the distal end extends in the inboard direction.

6. A retractable vehicle step, comprising:
a mounting portion configured to mount to a vehicle;
a stepping member comprising a stepping surface the extends along a longitudinal direction; and
a linkage comprising at least one arm, the linkage being configured to move the stepping member with respect to the mounting portion between a retracted position and a deployed position, the deployed position being laterally outward of the retracted position,
wherein the mounting portion comprises:
  a first mounting component configured to attach to a portion of the vehicle; and
  a second mounting component removably attachable to the first mounting component,
wherein the second mounting component is removably attachable to the first mounting component in at least a first position and a second position, wherein the first position comprises attaching the second mounting component to the first mounting component in a position that is laterally outward of the second position, and
wherein at least one of the first mounting component or the second mounting component comprises one or more oblong apertures extending in the lateral direction that enable the second mounting component to be removably attachable to the first mounting component in at least the first position and the second position.

7. The retractable vehicle step of claim 6, wherein the mounting portion further comprises a third mounting component, and the second mounting component is removably attachable to the first mounting component through the third mounting component.

8. The retractable vehicle step of claim 7, wherein each of the first mounting component and the second mounting component comprises one or more oblong apertures extending in the lateral direction that enable the third mounting component to be positioned in different lateral positions with respect to the first mounting component and the second mounting component.

9. The retractable vehicle step of claim 7, wherein at least one of the first, second, or third mounting components is repositionable along the longitudinal direction with respect to at least one other of the first, second, or third mounting components.

10. The retractable vehicle step of claim 6, wherein the second mounting component is configured to attach to a second portion of the vehicle.

11. A retractable vehicle step, comprising:
a mounting portion configured to mount to a vehicle;
a stepping member comprising a stepping surface; and
a linkage comprising at least one arm, the linkage being configured to move the stepping member with respect to the mounting portion between a retracted position and a deployed position,
wherein the mounting portion comprises:
  a first mounting component configured to attach to a first portion of the vehicle; and
  a second mounting component removably attachable to the first mounting component, the second mounting component configured to attach to a second portion of the vehicle, and
wherein the second mounting component comprises a proximal end and a distal end, the proximal end being rigidly mountable to a lower portion of the first mounting component, and the distal end extending in an inboard direction for attachment to the second portion of the vehicle.

12. The retractable vehicle step of claim 11, wherein the first portion of the vehicle comprises a downward facing portion of an underside of the vehicle, and the second portion of the vehicle comprises a lateral facing portion of the underside of the vehicle, wherein the second portion of the vehicle is below the first portion of the vehicle.

13. The retractable vehicle step of claim 11, wherein the mounting portion further comprises a third mounting component, and the proximal end of the second mounting component is rigidly mountable to the lower portion of the first mounting component through the third mounting component.

14. The retractable vehicle step of claim 11, wherein the proximal end of the second mounting component is rigidly mountable to the lower portion of the first mounting component in at least two positions to adjust a distance the distal end extends in the inboard direction.

15. A retractable vehicle step, comprising:
a mounting portion configured to mount to a vehicle;
a stepping member comprising a stepping surface the extends along a longitudinal direction; and
a linkage comprising at least one arm, the linkage being configured to move the stepping member with respect to the mounting portion between a retracted position and a deployed position, the deployed position being laterally outward of the retracted position,
wherein the mounting portion comprises:
  a first mounting component configured to attach to a portion of the vehicle; and
  a second mounting component removably attachable to the first mounting component,
wherein the second mounting component is removably attachable to the first mounting component in at least a first position and a second position, wherein the first position comprises attaching the second mounting component to the first mounting component in a position that is laterally outward of the second position, and
wherein the mounting portion further comprises a third mounting component, and the second mounting component is removably attachable to the first mounting component through the third mounting component.

16. The retractable vehicle step of claim 15, wherein each of the first mounting component and the second mounting component comprises one or more oblong apertures extending in the lateral direction that enable the third mounting component to be positioned in different lateral positions with respect to the first mounting component and the second mounting component.

17. The retractable vehicle step of claim 15, wherein at least one of the first, second, or third mounting components is repositionable along the longitudinal direction with respect to at least one other of the first, second, or third mounting components.

18. The retractable vehicle step of claim 15, wherein the second mounting component is configured to attach to a second portion of the vehicle.

* * * * *

UNITED STATES PATENT AND TRADEMARK OFFICE
CERTIFICATE OF CORRECTION

PATENT NO. : 11,926,286 B2
APPLICATION NO. : 16/890562
DATED : March 12, 2024
INVENTOR(S) : Horst Leitner et al.

It is certified that error appears in the above-identified patent and that said Letters Patent is hereby corrected as shown below:

In the Specification

In Column 14, Line 41, delete "$ch_{at}$." and insert --$d_{lateral}$--.

Signed and Sealed this
Eleventh Day of June, 2024

Katherine Kelly Vidal
*Director of the United States Patent and Trademark Office*